US012506881B2

(12) United States Patent

Kim et al.

(10) Patent No.: US 12,506,881 B2

(45) Date of Patent: Dec. 23, 2025

(54) VIDEO SIGNAL PROCESSING METHOD USING INTRA PREDICTION AND DEVICE THEREFOR

(71) Applicant: WILUS INSTITUTE OF STANDARDS AND TECHNOLOGY INC., Gyeonggi-do (KR)

(72) Inventors: Kyungyong Kim, Gyeonggi-do (KR); Dongcheol Kim, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 0 days.

(21) Appl. No.: 18/574,310

(22) PCT Filed: Jun. 28, 2022

(86) PCT No.: PCT/KR2022/009241

§ 371 (c)(1),
(2) Date: Dec. 27, 2023

(87) PCT Pub. No.: WO2023/277535

PCT Pub. Date: Jan. 5, 2023

(65) Prior Publication Data

US 2024/0373036 A1 Nov. 7, 2024

(30) Foreign Application Priority Data

Jun. 28, 2021 (KR) ........................ 10-2021-0084308
Jul. 13, 2021 (KR) ........................ 10-2021-0091752
(Continued)

(51) Int. Cl.
*H04N 19/70* (2014.01)
*H04N 19/105* (2014.01)
(Continued)

(52) U.S. Cl.
CPC ......... *H04N 19/159* (2014.11); *H04N 19/105* (2014.11); *H04N 19/107* (2014.11);
(Continued)

(58) Field of Classification Search
None
See application file for complete search history.

(56) References Cited

U.S. PATENT DOCUMENTS 11,563,957 B2 1/2023 Wang et al.
11,671,589 B2 6/2023 Li et al.
(Continued)

FOREIGN PATENT DOCUMENTS

KR 10-2023-0149297 10/2023
WO 2019/245260 12/2019

OTHER PUBLICATIONS

Zhao et al.: "EE2-Related: Improvements of Decoder-Side Intra Mode Derivation", doc.: JWET-V0087, Joint Video Experts Team (JVET) of ITU-T SG 16 WP 3 and ISO/IEC JTC 1/SC 29. 22nd Meeting, by teleconference, Apr. 20, 2021, pp. 1-6 (Year: 2021).*
(Continued)

*Primary Examiner* — Christopher G Findley
(74) *Attorney, Agent, or Firm* — WOMBLE BOND DICKINSON (US) LLP

(57) ABSTRACT

A video signal processing method comprises the steps of: parsing a first syntax element indicating whether to activate a DIMD mode, wherein the first syntax element is signaled on a sequence parameter set (SPS) raw byte sequence payload (RBSP) syntax; when the first syntax element indicates activation of the DIMD mode, parsing a second syntax element indicating whether the DIMD mode is applied to a current block; and when the second syntax
(Continued)

element indicates that the DIMD mode is applied to the current block, reconstructing the current block on the basis of the DIMD mode.

17 Claims, 20 Drawing Sheets

(30) Foreign Application Priority Data

Jan. 13, 2022 (KR) ........................ 10-2022-0005561
Jan. 14, 2022 (KR) ........................ 10-2022-0006122

(51) Int. Cl.
*H04N 19/107* (2014.01)
*H04N 19/159* (2014.01)
*H04N 19/176* (2014.01)
*H04N 19/196* (2014.01)
*H04N 19/52* (2014.01)

(52) U.S. Cl.
CPC ......... *H04N 19/176* (2014.11); *H04N 19/196* (2014.11); *H04N 19/52* (2014.11); *H04N 19/70* (2014.11)

(56) References Cited

U.S. PATENT DOCUMENTS

2019/0166370 A1* 5/2019 Xiu ...................... H04N 19/176
2022/0201281 A1* 6/2022 Li ........................ H04N 19/176
2022/0329800 A1 10/2022 Ray et al.
2022/0394269 A1 12/2022 Cao et al.
2022/0417511 A1 12/2022 Li et al.

OTHER PUBLICATIONS

Wang et al.: "EE2-related: Template-based intra mode derivation using MPMs", doc.: JVET-V0098-v2, Joint Video Experts Team (JVET) of ITU-T SG 16 WP 3 and ISO/IEC JTC 1/SC 29. 22nd Meeting. by teleconference. Apr. 22, 2021. pp. 1-4 (Year: 2021).*

International Search Report for PCT/KR2022/009241 mailed on Oct. 12, 2022 and its English translation from WIPO (now published as WO 2023/277535).

Written Opinion of the International Searching Authority for PCT/KR2022/009241 mailed on Oct. 12, 2022 and its English translation by Google Translate (now published as WO 2023/277535).

Zhao, Jie et al.: "EE2-Related: Improvements of Decoder-Side Intra Mode Derivation", doc.: JVET-V0087, Joint Video Experts Team (JVET) of ITU-T SG 16 WP 3 and ISO/IEC JTC 1/SC 29. 22nd Meeting, by teleconference, Apr. 20, 2021, pp. 1-6.

Wang, Yang et al.: "EE2-related: Template-based intra mode derivation using MPMs", doc.: JVET-V0098-v2, Joint Video Experts Team (JVET) of ITU-T SG 16 WP 3 and ISO/IEC JTC 1/SC 29. 22nd Meeting, by teleconference, Apr. 22, 2021, pp. 1-4.

Kim, Jae-Min et al.: "Efficient Coding Technique for 4x4 Intra Prediction Modes using the Statistical Distribution of Intra Modes of Adjacent Intra Blocks", The Journal of the Korea Contents Association, Dec. 31, 2019, pp. 1-7.

Xie, Z et al.: "AHG 12: On Signaling of Intra Template matching", Joint Video Experts Team (JVET) of ITU-T SG 16 WP 3 and ISO/IEV JTC 1/SC 29, doc.: JVET-X0124-v2, 24th Meeting: Teleconference, Oct. 6-15, 2021, pp. 1-76.

* cited by examiner

| | |
|---|---|
| if( sh_slice_type != I \|\| sps_ibc_enabled_flag ) { | |
| if( treeType != DUAL_TREE_CHROMA && ( ( !( cbWidth = = 4 && cbHeight = = 4 ) && modeType != MODE_TYPE_INTRA ) \|\| ( sps_ibc_enabled_flag && cbWidth <= 64 && cbHeight <= 64 ) ) ) | |
| **cu_skip_flag**[ x0 ][ y0 ] | ae(v) |
| if( cu_skip_flag[ x0 ][ y0 ] = = 0 && sh_slice_type != I && !( cbWidth = = 4 && cbHeight = = 4 ) && modeType = = MODE_TYPE_ALL ) | |
| **pred_mode_flag** | ae(v) |
| … | |
| if( CuPredMode[ chType ][ x0 ][ y0 ] = = MODE_INTRA && sps_dimd_enabled_flag && cu_skip_flag[ x0 ][ y0 ] = = 0 && modeType != MODE_TYPE_INTER && treeType != DUAL_TREE_CHROMA ) | |
| **cu_dimd_flag** | ae(v) |
| … | |

*FIG. 12*

| | |
|---|---|
| if( sps_mip_enabled_flag && !cu_dimd_flag) | |
| **intra_mip_flag**[ x0 ][ y0 ] | ae(v) |
| if( intra_mip_flag[ x0 ][ y0 ] ) { | |
| **intra_mip_transposed_flag**[ x0 ][ y0 ] | ae(v) |
| **intra_mip_mode**[ x0 ][ y0 ] | ae(v) |
| } else { | |
| if( sps_mrl_enabled_flag && ( ( y0 % CtbSizeY ) > 0 ) && !cu_dimd_flag ) | |
| **intra_luma_ref_idx**[ x0 ][ y0 ] | ae(v) |
| if( sps_isp_enabled_flag && intra_luma_ref_idx[ x0 ][ y0 ] = = 0 && ( cbWidth <= MaxTbSizeY && cbHeight <= MaxTbSizeY ) && ( cbWidth * cbHeight > MinTbSizeY * MinTbSizeY ) && !cu_act_enabled_flag && !cu_dimd_flag ) | |
| **intra_subpartitions_mode_flag**[ x0 ][ y0 ] | ae(v) |
| if( intra_subpartitions_mode_flag[ x0 ][ y0 ] = = 1 ) | |
| **intra_subpartitions_split_flag**[ x0 ][ y0 ] | ae(v) |
| if( !cu_dimd_flag) { | |
| if( intra_luma_ref_idx[ x0 ][ y0 ] = = 0 ) | |
| **intra_luma_mpm_flag**[ x0 ][ y0 ] | ae(v) |
| if( intra_luma_mpm_flag[ x0 ][ y0 ] ) { | |
| if( intra_luma_ref_idx[ x0 ][ y0 ] = = 0 ) | |
| **intra_luma_not_planar_flag**[ x0 ][ y0 ] | ae(v) |
| if( intra_luma_not_planar_flag[ x0 ][ y0 ] ) | |
| **intra_luma_mpm_idx**[ x0 ][ y0 ] | ae(v) |
| } else | |
| **intra_luma_mpm_remainder**[ x0 ][ y0 ] | ae(v) |
| } | |
| } | |

*FIG. 13*

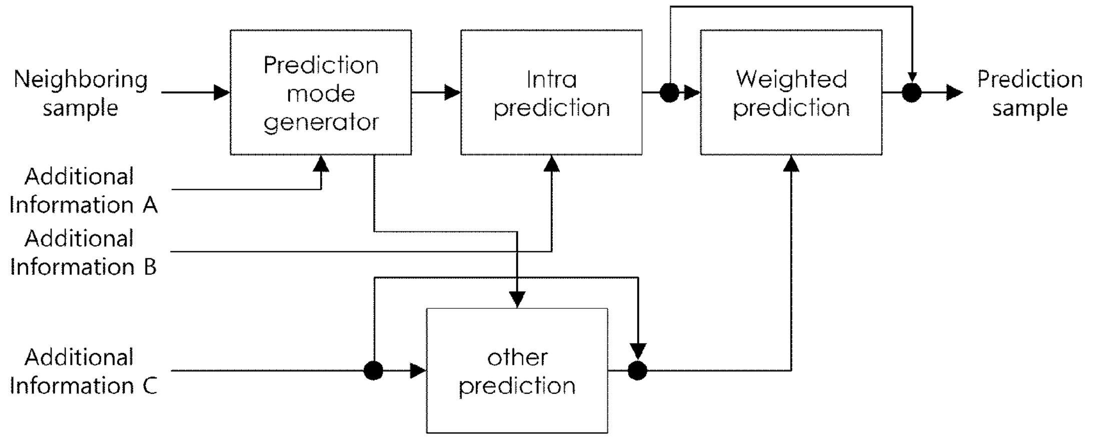

FIG. 14

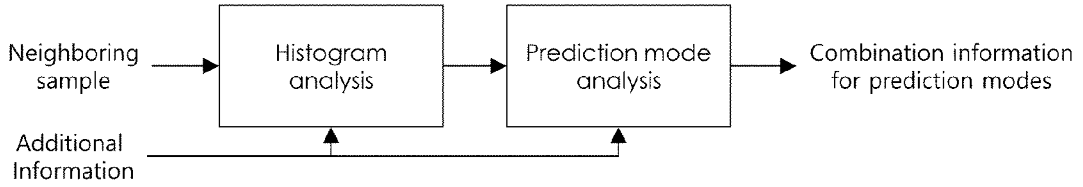

FIG. 15

| | |
|---|---|
| if( sh_slice_type != I \|\| sps_ibc_enabled_flag ) { | |
| if( treeType != DUAL_TREE_CHROMA && ( ( !( cbWidth = = 4 && cbHeight = = 4 ) && modeType != MODE_TYPE_INTRA ) \|\| ( sps_ibc_enabled_flag && cbWidth <= 64 && cbHeight <= 64 ) ) ) | |
| **cu_skip_flag**[ x0 ][ y0 ] | ae(v) |
| if( cu_skip_flag[ x0 ][ y0 ] = = 0 && sh_slice_type != I && !( cbWidth = = 4 && cbHeight = = 4 ) && modeType = = MODE_TYPE_ALL ) | |
| **pred_mode_flag** | ae(v) |
| … | |
| if( CuPredMode[ chType ][ x0 ][ y0 ] = = MODE_INTRA && sps_dimd_enabled_flag && cu_skip_flag[ x0 ][ y0 ] = = 0 && modeType != MODE_TYPE_INTER && treeType != DUAL_TREE_CHROMA ) | |
| **cu_dimd_flag** | ae(v) |
| if(cu_dimd_flag) | |
| **cu_dimd_mode** | ae(v) |
| … | |

FIG. 16

| | Case 1 Similar direction Similar weight | Case 2 Different direction Different weight | Case 3 Similar direction Different weight | Case 4 Different direction Similar weight |
|---|---|---|---|---|
| ModeA | 56 ↗ | 18 ← | 3 ↙ | 45 ↖ |
| WeightA | 0.34 | 0.5 | 0.65 | 0.36 |
| ModeB | 58 ↗ | 31 ↖ | 5 ↙ | 21 ↖ |
| WeightB | 0.25 | 0.2 | 0.10 | 0.34 |
| ... | ... | ... | ... | ... |
| ModeX | - | - | - | - |
| WeightX | - | - | - | - |
*FIG. 17*
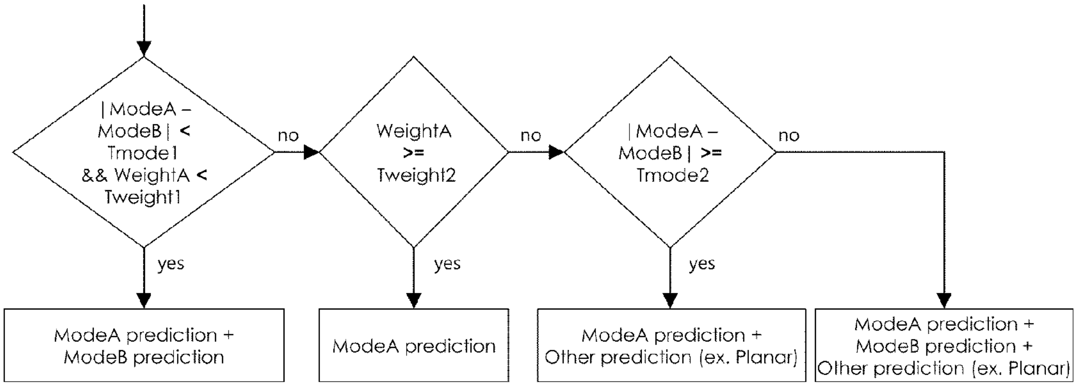
*FIG. 18*
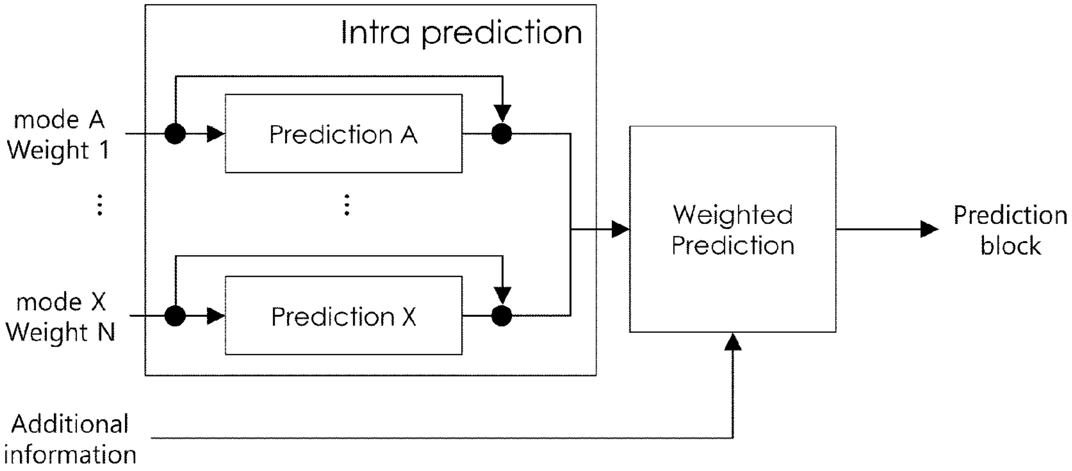
*FIG. 19*

| | Intra prediction mode | Prediction method | Position of neighboring block | Coding mode |
|---|---|---|---|---|
| 1 | DIMD | multiple prediction | Left | MIP mode |
| 2 | Mode A | Uni prediction | Above | Intra directional mode |
| 3 | Mode A + X | Uni prediction | - | - |
| 4 | Mode A – Y | Uni prediction | - | - |
| 5 | DC | Uni prediction | - | - |

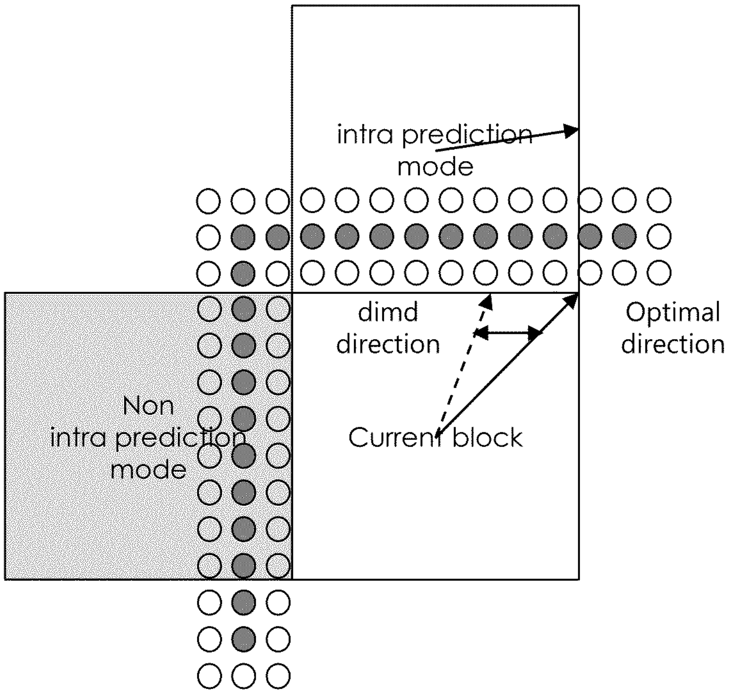

FIG. 23

| | |
|---|---|
| if( sps_mip_enabled_flag) | |
| **intra_mip_flag**[ x0 ][ y0 ] | ae(v) |
| if( intra_mip_flag[ x0 ][ y0 ] ) { | |
| **intra_mip_transposed_flag**[ x0 ][ y0 ] | ae(v) |
| **intra_mip_mode**[ x0 ][ y0 ] | ae(v) |
| } else { | |
| if( sps_mrl_enabled_flag && ( ( y0 % CtbSizeY ) > 0 )) | |
| **intra_luma_ref_idx**[ x0 ][ y0 ] | ae(v) |
| if( sps_isp_enabled_flag && intra_luma_ref_idx[ x0 ][ y0 ] = = 0 && ( cbWidth <= MaxTbSizeY && cbHeight <= MaxTbSizeY ) && ( cbWidth * cbHeight > MinTbSizeY * MinTbSizeY ) && !cu_act_enabled_flag) | |
| **intra_subpartitions_mode_flag**[ x0 ][ y0 ] | ae(v) |
| if( intra_subpartitions_mode_flag[ x0 ][ y0 ] = = 1 ) | |
| **intra_subpartitions_split_flag**[ x0 ][ y0 ] | ae(v) |
| if( intra_luma_ref_idx[ x0 ][ y0 ] = = 0 ) | |
| **intra_luma_mpm_flag**[ x0 ][ y0 ] | ae(v) |
| if( intra_luma_mpm_flag[ x0 ][ y0 ] ) { | |
| if( intra_luma_ref_idx[ x0 ][ y0 ] = = 0 ) | |
| **intra_luma_not_planar_flag**[ x0 ][ y0 ] | ae(v) |
| if( intra_luma_not_planar_flag[ x0 ][ y0 ] ) | |
| **intra_luma_mpm_idx**[ x0 ][ y0 ] | ae(v) |
| if(intra_luma_mpm_idx == DIMD) { | |
| **dimd_distance_idx** | ae(v) |
| **dimd_sign_flag** | ae(v) |
| } | |
| } else | |
| **intra_luma_mpm_remainder**[ x0 ][ y0 ] | ae(v) |
| } | |

FIG. 24

| intra_chroma_pred_mode | bin string | chroma intra mode |
|---|---|---|
| 0 | 1100 | list[0] |
| 1 | 1101 | list[1] |
| 2 | 1110 | list[2] |
| 3 | 1111 | list[3] |
| 4 | 10 | DM |
| 5 | 0 | DIMD/TIMD chroma |

| cclm_mode_flag | cclm_mode_idx | intra_chroma_pred_mode | lumaIntraPredMode | | | | |
|---|---|---|---|---|---|---|---|
| | | | 0 | 50 | 18 | 1 | X ( 0 <= X <= 66 ) |
| 0 | - | 0 | 66 | 0 | 0 | 0 | 0 |
| 0 | - | 1 | 50 | 66 | 50 | 50 | 50 |
| 0 | - | 2 | 18 | 18 | 66 | 18 | 18 |
| 0 | - | 3 | 1 | 1 | 1 | 66 | 1 |
| 0 | - | 4 | 0 | 50 | 18 | 1 | X |
| 0 | - | 5 | 84 | 84 | 84 | 84 | DIMD/TIMD Chroma |
| 1 | 0 | - | 81 | 81 | 81 | 81 | 81 |
| 1 | 1 | - | 82 | 82 | 82 | 82 | 82 |
| 1 | 2 | - | 83 | 83 | 83 | 83 | 83 |

| cclm_mode_flag | cclm_mode_idx | intra_chroma_pred_mode | lumaIntraPredMode | | | | |
|---|---|---|---|---|---|---|---|
| | | | 0 | 50 | 18 | 1 | X ( 0 <= X <= 66 ) |
| 0 | - | 0 | 66 | 0 | 0 | 0 | 0 |
| 0 | - | 1 | 50 | 66 | 50 | 50 | 50 |
| 0 | - | 2 | 18 | 18 | 66 | 18 | 18 |
| 0 | - | 3 | 1 | 1 | 1 | 66 | 1 |
| 0 | - | 4 | 0 | 50 | 18 | 1 | X |
| 1 | 0 | - | 81 | 81 | 81 | 81 | 81 |
| 1 | 1 | - | 82 | 82 | 82 | 82 | 82 |
| 1 | 2 | - | 83 | 83 | 83 | 83 | 83 |
| **1** | **3** | - | **84** | **84** | **84** | **84** | **84** |

| | coding_unit( x0, y0, cbWidth, cbHeight, cqtDepth, treeType, modeType ) { | **Descriptor** |
|---|---|---|
| | | |
| | if( CuPredMode[ chType ][ x0 ][ y0 ] == MODE_INTRA && sps_palette_enabled_flag && … ) ) | |
| | **pred_mode_plt_flag** | ae(v) |
| | if( CuPredMode[ chType ][ x0 ][ y0 ] == MODE_INTRA && … ) | |
| | **cu_act_enabled_flag** | ae(v) |
| | … | |
| | if( treeType == SINGLE_TREE \|\| treeType == DUAL_TREE_LUMA ) { | |
| | if( pred_mode_plt_flag ) | |
| | palette_coding( x0, y0, cbWidth, cbHeight, treeType ) | |
| | else { | |
| | if( sps_bdpcm_enabled_flag && && cbWidth <= MaxTsSize && cbHeight <= MaxTsSize) | |
| | **intra_bdpcm_luma_flag** | ae(v) |
| | if( intra_bdpcm_luma_flag ) | |
| | **intra_bdpcm_luma_dir_flag** | ae(v) |
| | else { | |
| | if( sps_tmp_enable_flag && cbWidth <= TMP_MaxSize && cbHeight <= TMP_MaxSize) | |
| | intra_tmp_flag | ae(v) |
| | if ( !intra_tmp_flag) { | |
| | if( sps_mip_enabled_flag ) | |
| | **intra_mip_flag** | ae(v) |
| | if( intra_mip_flag ) { | |
| | **intra_mip_transposed_flag**[ x0 ][ y0 ] | ae(v) |
| | **intra_mip_mode**[ x0 ][ y0 ] | ae(v) |
| | } else { | |
| 32-1 | if (sps_dimd_enable_flag && ( ( y0 % CtbSizeY ) > 0 ) ) | |
| | **intra_dimd_flag** | |
| 32-2 | if (**!intra_dimd_flag**) **{** | |
| | if ( sps_timd_enable_flag && (sh_slice_type != I \|\| (sh_slice_type == I && cbWidth * cbHeight <=1024 )) && ( ( y0 % CtbSizeY ) > 0 )) | |
| | **intra_timd_flag** | ae(v) |
| | if( sps_mrl_enabled_flag && ( ( y0 % CtbSizeY ) > 0 ) ) | |
| | **intra_luma_ref_idx** | ae(v) |
| | if( sps_isp_enabled_flag && …) | |
| | **intra_subpartitions_mode_flag** | ae(v) |
| | } | |
| | if (**!intra_timd_flag && !intra_dimd_flag**) **{** | |
| | if( intra_luma_ref_idx == 0 ) | |
| | **intra_luma_mpm_flag[ x0 ][ y0 ]** | ae(v) |
| | … | |
| | } | |
| | } | |

FIG. 32

| | coding_unit( x0, y0, cbWidth, cbHeight, cqtDepth, treeType, modeType ) { | **Descriptor** |
|---|---|---|
| | | |
| | if( CuPredMode[ chType ][ x0 ][ y0 ] = = MODE_INTRA && sps_palette_enabled_flag && … ) ) | |
| | **pred_mode_plt_flag** | ae(v) |
| | if( CuPredMode[ chType ][ x0 ][ y0 ] = = MODE_INTRA && … ) | |
| | **cu_act_enabled_flag** | ae(v) |
| | … | |
| | if( treeType = = SINGLE_TREE \|\| treeType = = DUAL_TREE_LUMA ) { | |
| | if( pred_mode_plt_flag ) | |
| | palette_coding( x0, y0, cbWidth, cbHeight, treeType ) | |
| | else { | |
| | if( sps_bdpcm_enabled_flag && && cbWidth <= MaxTsSize && cbHeight <= MaxTsSize) | |
| | **intra_bdpcm_luma_flag** | ae(v) |
| | if( intra_bdpcm_luma_flag ) | |
| | **intra_bdpcm_luma_dir_flag** | ae(v) |
| | else { | |
| | if( sps_tmp_enable_flag && cbWidth <= TMP_MaxSize && cbHeight <= TMP_MaxSize) | |
| | intra_tmp_flag | ae(v) |
| | if ( !intra_tmp_flag) { | |
| | if( sps_mip_enabled_flag ) | |
| | **intra_mip_flag** | ae(v) |
| | if( intra_mip_flag ) { | |
| | **intra_mip_transposed_flag**[ x0 ][ y0 ] | ae(v) |
| | **intra_mip_mode**[ x0 ][ y0 ] | ae(v) |
| | } else { | |
| | **non_general_intra_mode_flag** | ae(v) |
| 33-1 | if (sps_dimd_timd_enable_flag && non_general_intra_mode_flag && ( ( y0 % CtbSizeY ) > 0 ) ) { | |
| 33-2 | if ( (sh_slice_type != I \|\| (sh_slice_type == I && cbWidth * cbHeight <=1024 ))) | |
| | **intra_timd_flag**} | ae(v) |
| 33-3 | else<{ | |
| | if( sps_mrl_enabled_flag && ( ( y0 % CtbSizeY ) > 0 ) ) | |
| | **intra_luma_ref_idx** | ae(v) |
| | if( sps_isp_enabled_flag && …) | |
| | **intra_subpartitions_mode_flag** | ae(v) |
| | } | |
| | if( intra_luma_ref_idx = = 0 ) | |
| | **intra_luma_mpm_flag[ x0 ][ y0** | ae(v) |
| | … | |
| | } | |
| | ... | |
| | } | |
| | } | |

*FIG. 33*

| | coding_unit( x0, y0, cbWidth, cbHeight, cqtDepth, treeType, modeType ) { | **Descriptor** |
|---|---|---|
| | | |
| | if( CuPredMode[ chType ][ x0 ][ y0 ] == MODE_INTRA && sps_palette_enabled_flag && … ) ) | |
| | **pred_mode_plt_flag** | ae(v) |
| | if( CuPredMode[ chType ][ x0 ][ y0 ] == MODE_INTRA && … ) | |
| | **cu_act_enabled_flag** | ae(v) |
| | … | |
| | if( treeType == SINGLE_TREE \|\| treeType == DUAL_TREE_LUMA ) { | |
| | if( pred_mode_plt_flag ) | |
| | palette_coding( x0, y0, cbWidth, cbHeight, treeType ) | |
| | else { | |
| | if( sps_bdpcm_enabled_flag && && cbWidth <= MaxTsSize && cbHeight <= MaxTsSize) | |
| | **intra_bdpcm_luma_flag** | ae(v) |
| | if( intra_bdpcm_luma_flag ) | |
| | **intra_bdpcm_luma_dir_flag** | ae(v) |
| | else { | |
| | if( sps_tmp_enable_flag && cbWidth <= TMP_MaxSize && cbHeight <= TMP_MaxSize) | |
| | intra_tmp_flag | ae(v) |
| | if ( !intra_tmp_flag) { | |
| | if( sps_mip_enabled_flag ) | |
| | **intra_mip_flag** | ae(v) |
| | if( intra_mip_flag ) { | |
| | **intra_mip_transposed_flag**[ x0 ][ y0 ] | ae(v) |
| | **intra_mip_mode**[ x0 ][ y0 ] | ae(v) |
| | } else { | |
| 34-1 | **non_general_intra_mode_flag** | ae(v) |
| 34-1 | if (sps_dimd_timd_enable_flag && non_general_intra_mode_flag && ( ( y0 % CtbSizeY ) > 0 ) ) { | |
| 34-1 | **intra_timd_flag**} | ae(v) |
| 34-2 | else<{ | |
| 34-2 | if( sps_mrl_enabled_flag && ( ( y0 % CtbSizeY ) > 0 ) ) | |
| 34-2 | **intra_luma_ref_idx** | ae(v) |
| 34-2 | if( sps_isp_enabled_flag && …) | |
| 34-2 | **intra_subpartitions_mode_flag** | ae(v) |
| 34-2 | } | |
| 34-2 | if( intra_luma_ref_idx == 0 ) | |
| 34-2 | **intra_luma_mpm_flag[ x0 ][ y0** | ae(v) |
| 34-2 | … | |
| 34-2 | } | |
| 34-2 | ... | |
| | } | |
| | } | |

*FIG. 34*

VIDEO SIGNAL PROCESSING METHOD USING INTRA PREDICTION AND DEVICE THEREFOR

CROSS-REFERENCE TO RELATED APPLICATIONS

This application is the U.S. National Phase of pending PCT International Application No. PCT/KR2022/009241, which was filed on Jun. 28, 2022, and which claims priority under 35 U.S.C 119 (a) to Korean Patent Application No. 10-2021-0084308 filed with the Korean Intellectual Property Office on Jun. 28, 2021, Korean Patent Application No. 10-2021-0091752 filed with the Korean Intellectual Property Office on Jul. 13, 2021, Korean Patent Application No. 10-2022-0005561 filed with the Korean Intellectual Property Office on Jan. 13, 2022, and Korean Patent Application No. 10-2022-0006122 filed with the Korean Intellectual Property Office on Jan. 14, 2022. The disclosures of the above patent applications are incorporated herein by reference in their entirety.

TECHNICAL FIELD

The present disclosure relates to a video signal processing method and device and, more specifically, to a video signal processing method and device by which a video signal is encoded or decoded.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with the recent development of various media and data transmission media, a more efficient video signal processing method and apparatus are required.

DISCLOSURE OF INVENTION

Technical Problem

An aspect of the present specification to provide a video signal processing method and a device therefor to increase the coding efficiency of a video signal.

Solution to Problem

The present specification provides a video signal processing method and a device therefor.

In the present specification, a video signal decoding device includes a processor, wherein the processor is configured to parse a first syntax element indicating whether a DIMD mode is enabled, the first syntax element being signaled on a sequence parameter set (SPS) raw byte sequence payload (RBSP) syntax, parse, in case that the first syntax element indicates enabling of the DIMD mode, a second syntax element indicating whether the DIMD mode is applied to a current block, and reconstruct the current block based on the DIMD mode in case that the second syntax element indicates that the DIMD mode is applied to the current block.

The processor is configured to obtain directional information of neighboring blocks of the current block, select, from the directional information, first directional information which most frequently occurs and second directional information which second most frequently occurs, and reconstruct the current block based on the first directional information and the second directional information.

Furthermore, in the present specification, a video signal encoding device includes a processor, wherein the processor is configured to obtain a bitstream that is decoded by a decoding method, and the decoding method a first syntax element indicating includes: parsing whether a DIMD mode is enabled, the first syntax element being signaled on a sequence parameter set (SPS) raw byte sequence payload (RBSP) syntax; parsing, in case that the first syntax element indicates enabling of the DIMD mode, a second syntax element indicating whether the DIMD mode is applied to a current block; and reconstructing the current block based on the DIMD mode in case that the second syntax element indicates that the DIMD mode is applied to the current block.

The reconstructing of the current block based on the DIMD mode includes: obtaining directional information of neighboring blocks of the current block; selecting, from the directional information, first directional information which most frequently occurs and second directional information which second most frequently occurs; and reconstructing the current block based on the first directional information and the second directional information.

Also, in the present specification, a non-transitory computer-readable storage medium storing a bitstream, wherein the bitstream is decoded by a decoding method, and the decoding method includes: parsing first syntax element indicating whether a DIMD mode is enabled, the first syntax element being signaled on a sequence parameter set (SPS) raw byte sequence payload (RBSP) syntax; parsing, in case that the first syntax element indicates enabling of the DIMD mode, a second syntax element indicating whether the DIMD mode is applied to a current block; and reconstructing the current block based on the DIMD mode in case that the second syntax element indicates that the DIMD mode is applied to the current block.

The reconstructing of the current block based on the DIMD mode includes: obtaining directional information of neighboring blocks of the current block; selecting, from the directional information, first directional information which most frequently occurs and second directional information which second most frequently occurs; and reconstructing the current block based on the first directional information and the second directional information.

Furthermore, in the present specification, a video signal processing method includes: parsing a first syntax element indicating whether a DIMD mode is enabled, the first syntax element being signaled on a sequence parameter set (SPS) raw byte sequence payload (RBSP) syntax; parsing, in case that the first syntax element indicates enabling of the DIMD mode, a second syntax element indicating whether the DIMD mode is applied to a current block; and reconstructing the current block based on the DIMD mode in case that the second syntax element indicates that the DIMD mode is applied to the current block.

The current block is reconstructed based on a weight value corresponding to the first directional information and a weight value corresponding to the second directional information.

The current block is reconstructed using a first prediction mode and a derived intra-prediction mode generated based on the first directional information and the second directional information, wherein the first prediction mode is a planar mode.

The second syntax element is parsed in case that the current block is a luma component block and that no inter prediction is applied to the current block.

The current block is reconstructed based on prediction modes included in an MPM list, and the MPM list is constructed based on directional information of neighboring blocks of the current block.

The current block is reconstructed based on a combination of the derived intra-prediction mode and any one of the prediction modes included in the MPM list.

Advantageous Effects of Invention

The present disclosure provides a method for efficiently processing a video signal.

The effects obtainable from the present specification are not limited to the effects mentioned above, and other effects not mentioned may be clearly understood by to those skilled in the art, to which the present disclosure belongs, from the description below.

BRIEF DESCRIPTION OF DRAWINGS

FIG. 12 illustrates a method for signaling a DIMD mode.

FIG. 13 illustrates a method for signaling a syntax element related to an intra-prediction mode based on whether a DIMD mode is used.

FIG. 14 illustrates a method for generating a prediction sample for reconstructing a current block.

FIG. 15 illustrates a method for determining an intra-prediction mode.

FIG. 16 illustrates a syntax structure including syntax elements related to DIMD.

FIG. 17 illustrates intra-prediction directional modes for a neighboring block of a current block and weight information.

FIG. 18 illustrates a method for determining DIMD combination information.

FIG. 19 illustrates a method for generating a prediction sample by using intra-prediction directional mode information and weights.

FIG. 23 illustrates a method for transmitting a difference value of a directional mode by using a directional mode derived by a DIMD mode as a prediction value.

FIG. 24 illustrates a syntax structure for parsing a difference value when a DIMD mode is applied.

FIGS. 32 to 34 illustrate syntax structures related to a DIMD mode and a TIMD mode.

BEST MODE FOR CARRYING OUT THE INVENTION

Figure 1:
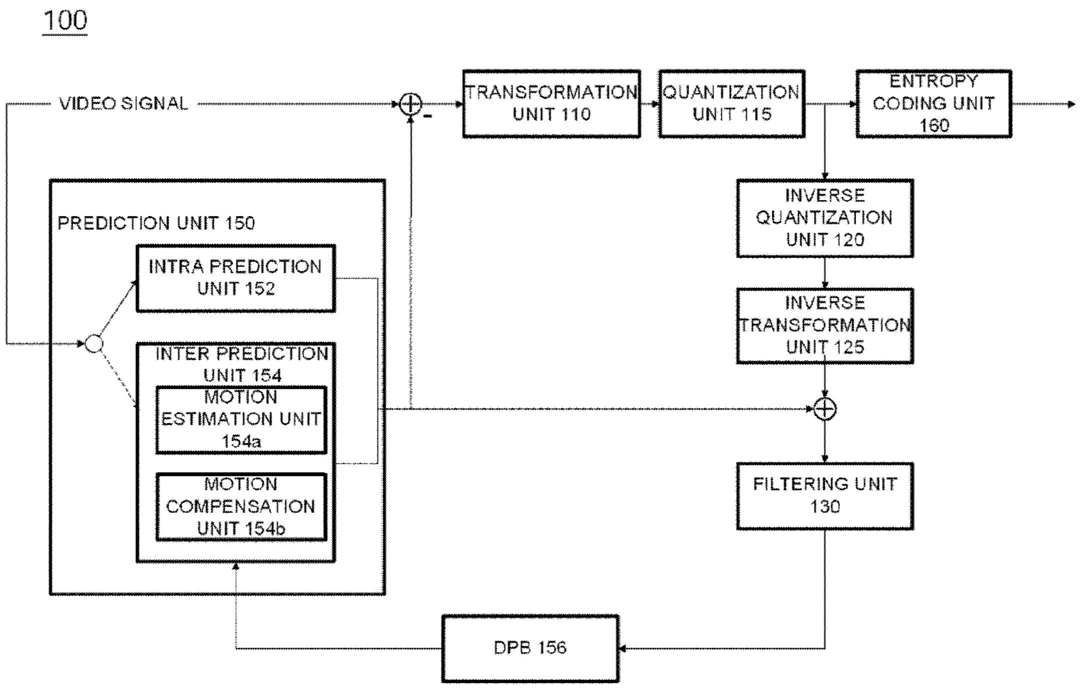
FIG. 1 is a schematic block diagram of a video signal encoding apparatus according to an embodiment of the present invention.

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and in this case, their meanings are described in a corresponding description part of the present invention. Accordingly, terms used in this specification should be interpreted based on the substantial meanings of the terms and contents over the whole specification.

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. 'Unit' is used as a meaning to refer to a basic unit of image processing or a specific position of a picture, and refers to an image region including both a luma component and a chroma component. Furthermore, a "block" refers to a region of an image that includes a particular component of a luma component and chroma components (i.e., Cb and Cr). However, depending on the embodiment, the terms "unit", "block", "partition", "signal", and "region" may be used interchangeably. Also, in the present specification, the term "current block" refers to a block that is currently scheduled to be encoded, and the term "reference block" refers to a block that has already been encoded or decoded and is used as a reference in a current block. In addition, the terms "luma", "luminance", "Y", and the like may be used interchangeably in this specification. Additionally, in the present specification, the terms "chroma", "chrominance", "Cb or Cr", and the like may be used interchangeably, and chroma components are classified into two components, Cb and Cr, and thus each chroma component may be distinguished and used. Additionally, in the present specification, the term "unit" may be used as a concept that includes a coding unit, a prediction unit, and a transform unit. A "picture" refers to a field or a frame, and depending on embodiments, the terms may be used interchangeably. Specifically, when a captured video is an interlaced video, a single frame may be separated into an odd (or cardinal or top) field and an even (or even-numbered or bottom) field, and each field may be configured in one picture unit and encoded or decoded. If the captured video is a progressive video, a single frame may be configured as a picture and encoded or decoded. In addition, in the present specification, the terms "error signal", "residual signal", "residue signal", "remaining signal", and "difference signal" may be used interchangeably. Also, in the present specification, the terms "intra-prediction mode", "intra-prediction directional mode", "intra-picture prediction mode", and "intra-picture prediction directional mode" may be used interchangeably. In addition, in the present specification, the terms "motion", "movement", and the like may be used interchangeably. Also, in the present specification, the terms "left", "left above", "above", "right above", "right", "right below", "below", and "left below" may be used interchangeably with "leftmost", "top left", "top", "top right", "right", "bottom right", "bottom", and "bottom left". Also, the terms "element" and "member" may be used interchangeably. Picture order count (POC) represents temporal position information of pictures (or frames), and may be the playback order in which displaying is performed on a screen, and each picture may have unique POC.

FIG. 1 is a schematic block diagram of a video signal encoding apparatus according to an embodiment of the present invention. Referring to FIG. 1, the encoding apparatus 100 of the present t invention includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a Discrete Cosine Transform (DCT), a Discrete Sine Transform (DST), or a Wavelet Transform can be used." perform transformation by splitting the input picture signal into blocks. In the transformation, coding efficiency may vary according to the distribution and characteristics of values in the transformation region. A transform kernel used for the transform of a residual block may has characteristics that allow a vertical transform and a horizontal transform to be separable. In this case, the transform of the residual block may be performed separately as a vertical transform and a horizontal transform. For example, an encoder may perform a vertical transform by applying a transform kernel in the vertical direction of a residual block. In addition, the encoder may perform a horizontal transform by applying the transform kernel in the horizontal direction of the residual block. In the present disclosure, the transform kernel may be used to refer to a set of parameters used for the transform of a residual signal, such as a transform matrix, a transform array, a transform function, or transform. For example, a transform kernel may be any one of multiple available kernels. Also, transform kernels based on different transform types may be used for the vertical transform and the horizontal transform, respectively.

The transform coefficients are distributed with higher coefficients toward the top left of a block and coefficients closer to "0" toward the bottom right of the block. As the size of a current block increases, there are likely to be many coefficients of "0" in the bottom-right region of the block. To reduce the transform complexity of a large-sized block, only a random top-left region may be kept and the remaining region may be reset to "0".

In addition, error signals may be present in only some regions of a coding block. In this case, the transform process may be performed on only some random regions. In an embodiment, in a block having a size of 2N×2N, an error signal may be present only in the first 2N×N block, and the transform process may be performed on the first 2N×N block. However, the second 2N×N block may not be transformed and may not be encoded or decoded. Here, N may be any positive integer.

The encoder may perform an additional transform before transform coefficients are quantized. The above-described transform method may be referred to as a primary transform, and the additional transform may be referred to as a secondary transform. The secondary transform may be selective for each residual block. According to an embodiment, the encoder may improve coding efficiency by performing a secondary transform for regions where it is difficult to focus energy in a low-frequency region by using a primary transform alone. For example, a secondary transform may be additionally performed for blocks where residual values appear large in directions other than the horizontal or vertical direction of a residual block. Unlike a primary transform, a secondary transform may not be performed separately as a vertical transform and a horizontal transform. Such a secondary transform may be referred to as a low frequency non-separable transform (LFNST).

The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that can be used in the decoder should be used when performing prediction in the encoder. For this, the encoder performs a process of reconstructing the encoded current block again. The inverse quantization unit 120 inverse-quantizes the value of the transform coefficient, and the inverse transformation unit 125 reconstructs the residual value using the inverse quantized transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

The deblocking filter is a filter for removing intra-block distortions generated at the boundaries between blocks in a reconstructed picture. Through the distribution of pixels included in several columns or rows based on random edges in a block, the encoder may determine whether to apply a deblocking filter to the edges. When applying a deblocking filter to the block, the encoder may apply a long filter, a strong filter, or a weak filter depending on the strength of deblocking filtering. Additionally, horizontal filtering and vertical filtering may be processed in parallel. The sample adaptive offset (SAO) may be used to correct offsets from an original video on a pixel-by-pixel basis with respect to a residual block to which a deblocking filter has been applied. To correct offset for a particular picture, the encoder may use a technique that divides pixels included in the picture into a predetermined number of regions, determines a region in which the offset correction is to be performed, and applies the offset to the region (Band Offset). Alternatively, the encoder may use a method for applying an offset in consideration of edge information of each pixel (Edge Offset). The adaptive loop filter (ALF) is a technique of dividing pixels included in a video into predetermined groups and then determining one filter to be applied to each group, thereby performing filtering differently for each group. Information about whether to apply ALF may be signaled on a per-coding unit basis, and the shape and filter coefficients of an ALF to be applied may vary for each block. In addition, an ALF filter having the same shape (a fixed shape) may be applied regardless of the characteristics of a target block to which the ALF filter is to be applied.

The prediction unit 150 includes an intra-prediction unit 152 and an inter-prediction unit 154. The intra-prediction unit 152 performs intra prediction within a current picture, and the inter-prediction unit 154 performs inter prediction to predict the current picture by using a reference picture stored in the decoded picture buffer 156. The intra-prediction unit 152 performs intra prediction from reconstructed regions in the current picture and transmits intra encoding information to the entropy coding unit 160. The intra encoding information may include at least one of an intra-prediction mode, a most probable mode (MPM) flag, an MPM index, and information regarding a reference sample. The inter-prediction unit 154 may again include a motion estimation unit 154*a* and a motion compensation unit 154*b*. The motion estimation unit 154*a* finds a part most similar to a current region with reference to a specific region of a reconstructed reference picture, and obtains a motion vector value which is the distance between the regions. Reference region-related motion information (reference direction indication information (L0 prediction, L1 prediction, or bidirectional prediction), a reference picture index, motion vector information, etc.) and the like, obtained by the motion estimation unit 154*a*, are transmitted to the entropy coding unit 160 so as to be included in a bitstream. The motion compensation unit 154B performs inter-motion compensation by using the motion information transmitted by the motion estimation unit 154*a*, to generate a prediction block for the current block. The inter-prediction unit 154 transmits the inter encoding information, which includes motion information related to the reference region, to the entropy coding unit 160.

According to an additional embodiment, the prediction unit 150 may include an intra block copy (IBC) prediction unit (not shown). The IBC prediction unit performs IBC prediction from reconstructed samples in a current picture and transmits IBC encoding information to the entropy coding unit 160. The IBC prediction unit references a specific region within a current picture to obtain a block vector value that indicates a reference region used to predict a current region. The IBC prediction unit may perform IBC prediction by using the obtained block vector value. The IBC prediction unit transmits the IBC encoding information to the entropy coding unit 160. The IBC encoding information may include at least one of reference region size information and block vector information (index information for predicting the block vector of a current block in a motion candidate list, and block vector difference information).

When the above picture prediction is performed, the transform unit 110 transforms a residual value between an original picture and a predictive picture to obtain a transform coefficient value. At this time, the transform may be performed on a specific block basis in the picture, and the size of the specific block may vary within a predetermined range. The quantization unit 115 quantizes the transform coefficient value generated by the transform unit 110 and transmits the quantized transform coefficient to the entropy coding unit 160.

The quantized transform coefficients in the form of a two-dimensional array may be rearranged into a one-dimensional array for entropy coding. In relation to methods for scanning a quantized transform coefficient, the size of a transform block and an intra-picture prediction mode may determine which scanning method is used. In an embodiment, diagonal, vertical, and horizontal scans may be applied. This scan information may be signaled on a block-by-block basis, and may be derived based on predetermined rules.

The entropy coding unit 160 generates a video signal bitstream by entropy coding information indicating a quantized transform coefficient, intra encoding information, and inter encoding information. The entropy coding unit 160 may use variable length coding (VLC) and arithmetic coding. The variable length coding (VLC) is a technique of transforming input symbols into consecutive codewords, wherein the length of the codewords is variable. For example, frequently occurring symbols are represented by shorter codewords, while less frequently occurring symbols are represented by longer codewords. As the variable length coding, context-based adaptive variable length coding (CAVLC) may be used. The arithmetic coding uses the probability distribution of each data symbol to transform consecutive data symbols into a single decimal number. The arithmetic coding allows acquisition of the optimal decimal bits needed to represent each symbol. As the arithmetic coding, context-based adaptive binary arithmetic coding (CABAC) may be used.

CABAC is a binary arithmetic coding technique using multiple context models generated based on probabilities obtained from experiments. First, when symbols are not in binary form, the encoder binarizes each symbol by using exp-Golomb, etc. The binarized value, 0 or 1, may be described as a bin. A CABAC initialization process is divided into context initialization and arithmetic coding initialization. The context initialization is the process of initializing the probability of occurrence of each symbol, and is determined by the type of symbol, a quantization parameter (QP), and slice type (I, P, or B). A context model having the initialization information may use a probability-based value obtained through an experiment. The context model provides information about the probability of occurrence of Least Probable Symbol (LPS) or Most Probable Symbol (MPS) for a symbol to be currently coded and about which of bin values 0 and 1 corresponds to the MPS (valMPS). One of multiple context models is selected via a context index (ctxIdx), and the context index may be derived from information in a current block to be encoded or from information about neighboring blocks. Initialization for binary arithmetic coding is performed based on a probability model selected from the context models. In the binary arithmetic coding, encoding is performed through the process in which division into probability intervals is made through the probability of occurrence of 0 and 1, and then a probability interval corresponding to a bin to be processed becomes the entire probability interval for the next bin to be processed. Information about a position within the last bin in which the last bin has been processed is output. However, the probability interval cannot be divided indefinitely, and thus, when the probability interval is reduced to a certain size, a renormalization process is performed to widen the probability interval and the corresponding position information is output. In addition, after each bin is processed, a probability update process may be performed, wherein information about a processed bin is used to set a new probability for the next to be processed.

The generated bitstream is encapsulated in network abstraction layer (NAL) unit as basic units. The NAL units are classified into video a coding layer (VCL) NAL unit, which includes video data, and a non-VCL NAL unit, which includes parameter information for decoding video data. There are various types of VCL or non-VCL NAL units. A NAL unit includes NAL header information and raw byte sequence payload (RBSP) which is data. The NAL header information includes summary information about the RBSP. The RBSP of a VCL NAL unit includes an integer number of encoded coding tree units. In order to decode a bitstream in a video decoder, it is necessary to separate the bitstream into NAL units and then decode each of the separate NAL units. Information required for decoding a video signal bitstream may be included in a picture parameter set (PPS), a sequence parameter set (SPS), a video parameter set (VPS), etc., and transmitted.

The block diagram of FIG. 1 illustrates the encoding device 100 according to an embodiment of the present disclosure, wherein the separately shown blocks logically distinguish the elements of the encoding device 100. Accordingly, the above-described elements of the encoding device 100 may be mounted as a single chip or multiple chips, depending on the design of the device. According to an embodiment, the above-described operation of each element of the encoding device 100 may be performed by a processor (not shown).

Figure 2:
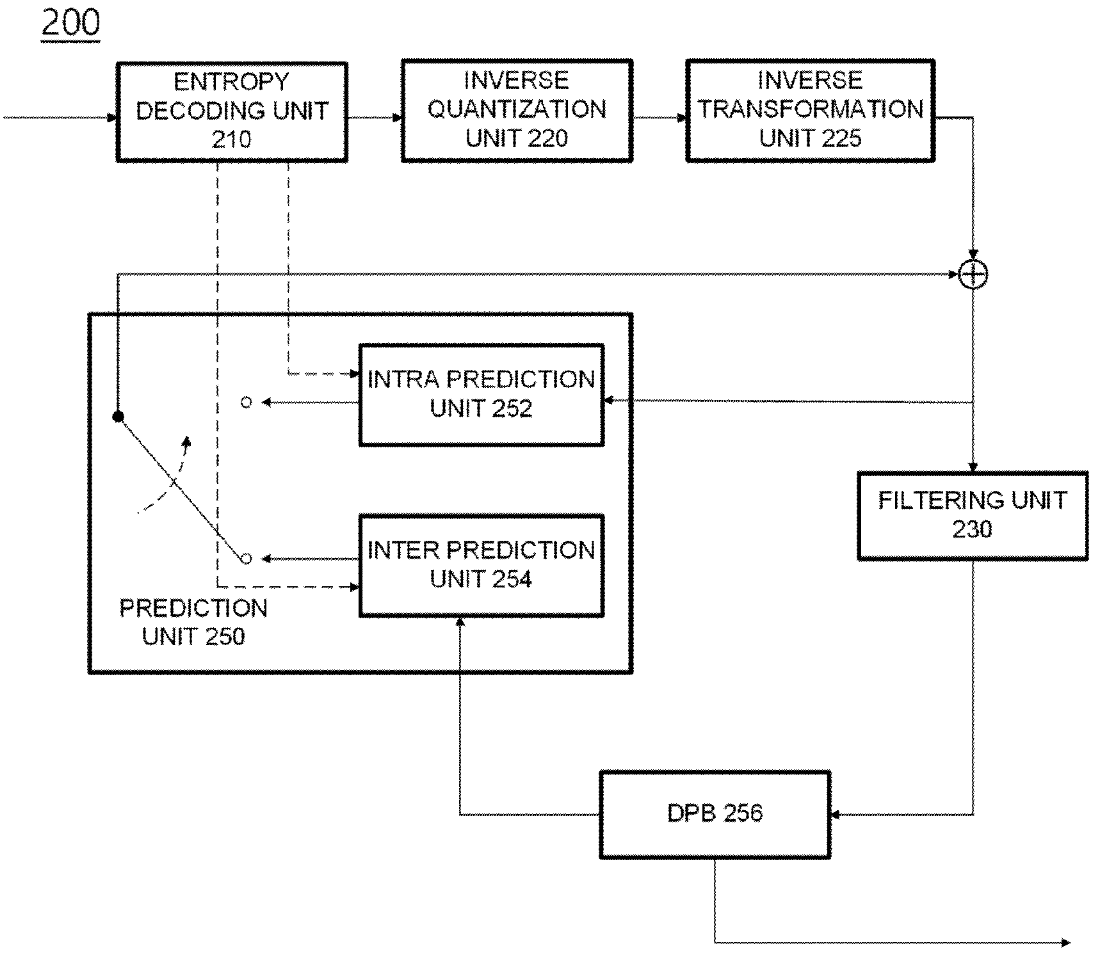
FIG. 2 is a schematic block diagram of a video signal decoding apparatus according to an embodiment of the present invention.

FIG. 2 is a schematic block diagram of a video signal decoding apparatus 200 according to an embodiment of the present invention. Referring to FIG. 2, the decoding apparatus 200 of the present invention includes an entropy decoding unit 210, an inverse quantization unit 220, an inverse transformation unit 225, a filtering unit 230, and a prediction unit 250.

The entropy decoding unit 210 entropy-decodes a video signal bitstream to extract transform coefficient information, intra encoding information, inter encoding information, and the like for each region. For example, the entropy decoding unit 210 may obtain a binarization code for transform coefficient information of a specific region from the video signal bitstream. The entropy decoding unit 210 obtains a quantized transform coefficient by inverse-binarizing a binary code. The inverse quantization unit 220 inverse-quantizes the quantized transform coefficient, and the inverse transformation unit 225 restores a residual value by using the inverse-quantized transform coefficient. The video signal processing device 200 restores an original pixel value by summing the residual value obtained by the inverse transformation unit 225 with a prediction value obtained by the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. In a reconstruction, only a current picture, that is, a picture (or, tile/slice) that performs intra prediction or intra BC prediction, is called an intra picture or an I picture (or, tile/slice), and a picture (or, tile/slice) that can perform all of intra prediction, inter prediction, and intra BC prediction is called an inter picture (or, tile/slice). In order to predict sample values of each block among inter pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or tile/slice). In other words, the P picture (or, tile/slice) uses up to one motion information set to predict each block, and the B picture (or, tile/slice) uses up to two motion information sets to predict each block. Here, the motion information set includes one or more motion vectors and one reference picture index.

The intra prediction unit 252 generates a prediction block using the intra encoding information and reconstructed samples in the current picture. As described above, the intra encoding information may include at least one of an intra prediction mode, a Most Probable Mode (MPM) flag, and an MPM index. The intra prediction unit 252 predicts the sample values of the current block by using the reconstructed samples located on the left and/or upper side of the current block as reference samples. In this disclosure, reconstructed samples, reference samples, and samples of the current block may represent pixels. Also, sample values may represent pixel values.

According to an embodiment, the reference samples may be samples included in a neighboring block of the current block. For example, the reference samples may be samples adjacent to a left boundary of the current block and/or samples may be samples adjacent to an upper boundary. Also, the reference samples may be samples located on a line within a predetermined distance from the left boundary of the current block and/or samples located on a line within a predetermined distance from the upper boundary of the current block among the samples of neighboring blocks of the current block. In this case, the neighboring block of the current block may include the left (L) block, the upper (A) block, the below left (BL) block, the above right (AR) block, or the above left (AL) block.

The inter prediction unit 254 generates a prediction block using reference pictures and inter encoding information stored in the DPB 256. The inter coding information may include motion information set (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may exist in the same reference picture or may exist in different pictures. That is, in the bi-prediction method, up to two sets of motion information (e.g., a motion vector and a reference picture index) may be used and two motion vectors may correspond to the same reference picture index or different reference picture indexes. In this case, the reference pictures are pictures located temporally before or after the current picture, and may be pictures for which reconstruction has already been completed. According to an embodiment, two reference regions used in the bi-prediction scheme may be regions selected from picture list L0 and picture list L1, respectively.

The inter prediction unit 254 may obtain a reference block of the current block using a motion vector and a reference picture index. The reference block is in a reference picture corresponding to a reference picture index. Also, a sample value of a block specified by a motion vector or an interpolated value thereof can be used as a predictor of the current block. For motion prediction with sub-pel unit pixel accuracy, for example, an 8-tap interpolation filter for a luma signal and a 4-tap interpolation filter for a chroma signal can be used. However, the interpolation filter for motion prediction in sub-pel units is not limited thereto. In this way, the inter prediction unit 254 performs motion compensation to predict the texture of the current unit from motion pictures reconstructed previously. In this case, the inter prediction unit may use a motion information set.

According to an additional embodiment, the prediction unit 250 may include an IBC prediction unit (not shown). The IBC prediction unit may reconstruct the current region by referring to a specific region including reconstructed samples in the current picture. The IBC prediction unit obtains IBC encoding information for the current region from the entropy decoding unit 210. The IBC prediction unit obtains a block vector value of the current region indicating the specific region in the current picture. The IBC prediction unit may perform IBC prediction by using the obtained block vector value. The IBC encoding information may include block vector information.

The reconstructed video picture is generated by adding the predict value outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 obtained from the inverse transformation unit 225.

Meanwhile, the block diagram of FIG. 2 shows a decoding apparatus 200 according to an embodiment of the present invention, and separately displayed blocks logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

The technology proposed in the present specification may be applied to a method and a device for both an encoder and a decoder, and the wording signaling and parsing may be for convenience of description. In general, signaling may be described as encoding each type of syntax from the perspective of the encoder, and parsing may be described as interpreting each type of syntax from the perspective of the decoder. In other words, each type of syntax may be included in a bitstream and signaled by the encoder, and the decoder may parse the syntax and use the syntax in a reconstruction process. In this case, the sequence of bits for each type of syntax arranged according to a prescribed hierarchical configuration may be called a bitstream.

One picture may be partitioned into sub-pictures, slices, tiles, etc. and encoded. A sub-picture may include one or more slices or tiles. When one picture is partitioned into multiple slices or tiles and encoded, all the slices or tiles within the picture must be decoded before the picture can be output a screen. On the other hand, when one picture is encoded into multiple subpictures, only a random subpicture may be decoded and output on the screen. A slice may include multiple tiles or subpictures. Alternatively, a tile may include multiple subpictures or slices. Subpictures, slices, and tiles may be encoded or decoded independently of each other, and thus are advantageous for parallel processing and processing speed improvement. However, there is the disadvantage in that a bit rate increases because encoded information of other adjacent subpictures, slices, and tiles is not available. A subpicture, a slice, and a tile may be partitioned into multiple coding tree units (CTUs) and encoded.

Figure 3:
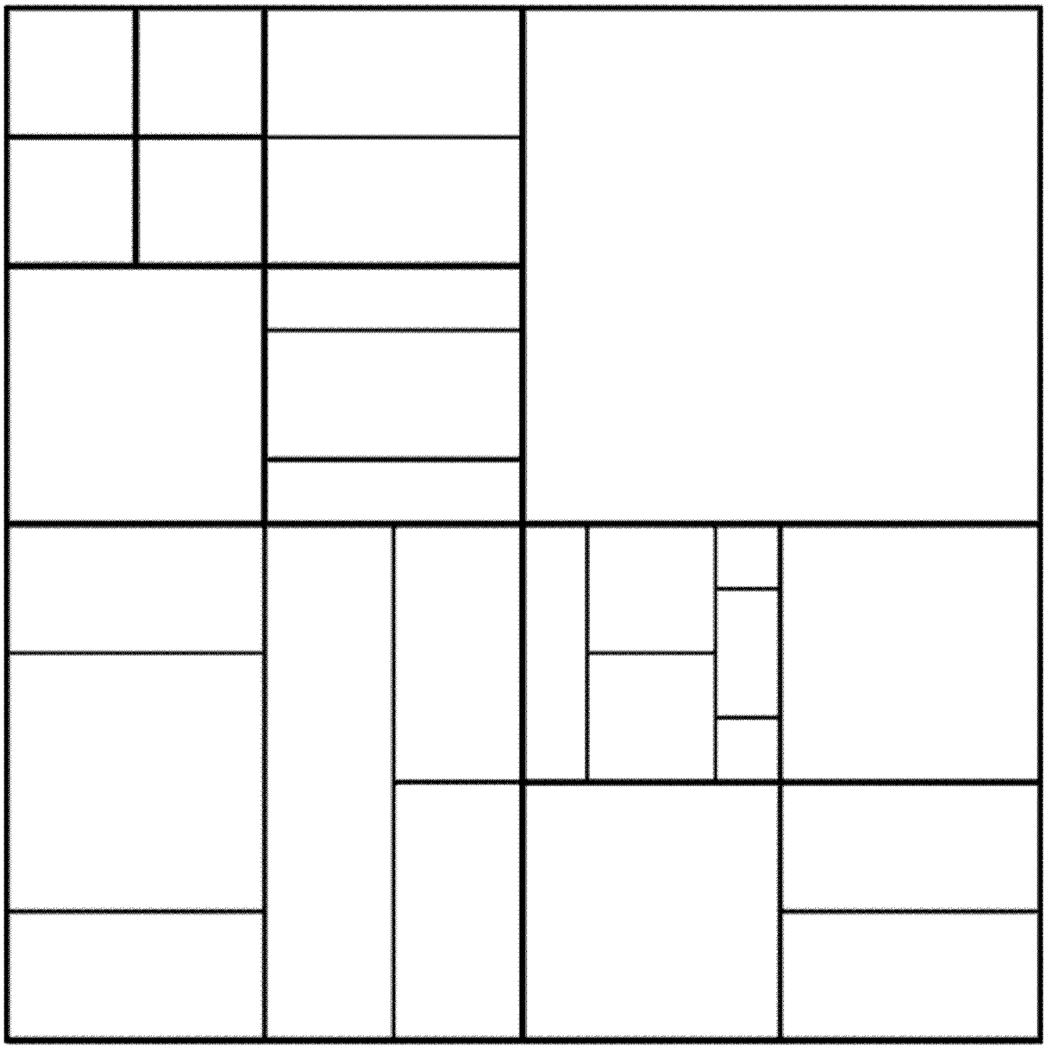
FIG. 3 shows an embodiment in which a coding tree unit is divided into coding units in a picture.

FIG. 3 illustrates an embodiment in which a coding tree unit (CTU) is divided into coding units (CUs) within a picture. In the process of coding a video signal, a picture may be divided into a sequence of coding tree units (CTUs). A coding tree unit may include a luma Coding Tree Block (CTB), two chroma coding tree blocks, and encoded syntax information thereof. One coding tree unit may include one coding unit, or one coding tree unit may be divided into multiple coding units. One coding unit may include a luma coding block (CB), two chroma coding blocks, and encoded syntax information thereof. One coding block may be partitioned into multiple sub-coding blocks. One coding unit may include one transform unit (TU), or one coding unit may be partitioned into multiple transform units. A transform unit may include a luma transform block (TB), two chroma transform blocks, and encoded syntax information thereof. A coding tree unit may be partitioned into multiple coding units. A coding tree unit may become a leaf node without being partitioned. In this case, the coding tree unit itself may be a coding unit.

The coding unit refers to a basic unit for processing a picture in the process of processing the video signal described above, that is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present invention is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split can be performed recursively, and not all nodes need to be split with the same depth.

Meanwhile, the leaf node of the above-described quad tree may be further split into a multi-type tree (MTT) structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)×2N, N×2N, and (N/2)×2N nodes by vertical ternary split, and split into 2N×(N/2), 2N×N, and 2N×(N/2) nodes by horizontal ternary split. This multi-type tree split can be performed recursively.

A leaf node of the multi-type tree can be a coding unit. When the coding unit is not greater than the maximum transform length, the coding unit can be used as a unit of prediction and/or transform without further splitting. As an embodiment, when the width or height of the current coding unit is greater than the maximum transform length, the current coding unit can be split into a plurality of transform units without explicit signaling regarding splitting. On the other hand, at least one of the following parameters in the above-described quad tree and multi-type tree may be predefined or transmitted through a higher level set of RBSPs such as PPS, SPS, VPS, and the like. 1) CTU size: root node size of quad tree, 2) minimum QT size MinQtSize: minimum allowed QT leaf node size, 3) maximum BT size MaxBtSize: maximum allowed BT root node size, 4) Maximum TT size MaxTtSize: maximum allowed TT root node size, 5) Maximum MTT depth MaxMttDepth: maximum allowed depth of MTT split from QT's leaf node, 6) Minimum BT size MinBtSize: minimum allowed BT leaf node size, 7) Minimum TT size MinTtSize: minimum allowed TT leaf node size.

Figure 4:
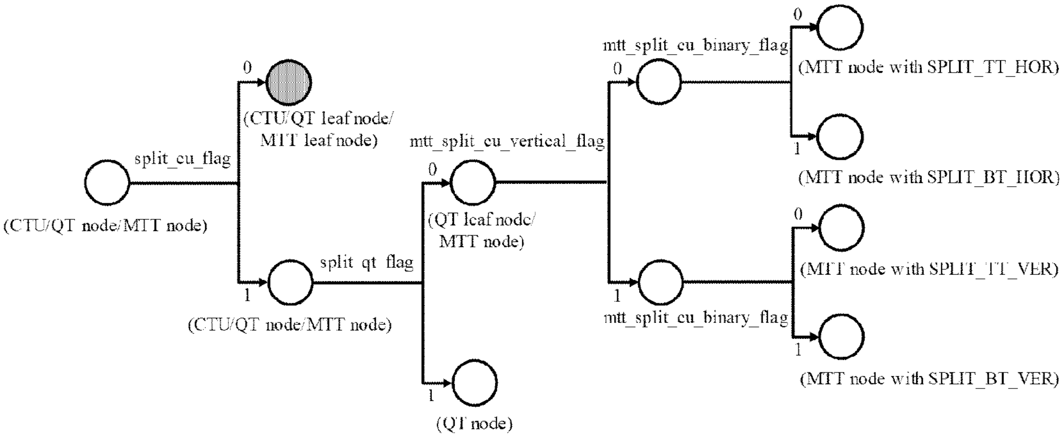
FIG. 4 shows an embodiment of a method for signaling a division of a quad tree and a multi-type tree.

FIG. 4 illustrates an embodiment of a method of signaling splitting of the quad tree and multi-type tree. Preset flags can be used to signal the splitting of the quad tree and multi-type tree described above. Referring to FIG. 4, at least one of a flag 'split_cu_flag' indicating whether or not to split a node, a flag 'split_qt_flag' indicating whether or not to split a quad tree node, a flag 'mtt_split_cu_vertical_flag' indicating a splitting direction of the multi-type tree node, or a flag 'mtt_split_cu_binary_flag' indicating a splitting shape of the multi-type tree node can be used.

According to an embodiment of the present invention, 'split_cu_flag', which is a flag indicating whether or not to split the current node, can be signaled first. When the value of 'split_cu_flag' is 0, it indicates that the current node is not split, and the current node becomes a coding unit. When the current node is the coating tree unit, the coding tree unit includes one unsplit coding unit. When the current node is a quad tree node 'QT node', the current node is a leaf node 'QT leaf node' of the quad tree and becomes the coding unit. When the current node is a multi-type tree node 'MTT node', the current node is a leaf node 'MTT leaf node' of the multi-type tree and becomes the coding unit.

When the value of 'split_cu_flag' is 1, the current node can be split into nodes of the quad tree or multi-type tree according to the value of 'split_qt_flag'. A coding tree unit is a root node of the quad tree, and can be split into a quad tree structure first. In the quad tree structure, 'split_qt_flag' is signaled for each node 'QT node'. When the value of 'split_qt_flag' is 1, the corresponding node is split into 4 square nodes, and when the value of 'qt_split_flag' is 0, the corresponding node becomes the 'QT leaf node' of the quad tree, and the corresponding node is split into multi-type nodes. According to an embodiment of the present invention, quad tree splitting can be limited according to the type of the current node. Quad tree splitting can be allowed when the current node is the coding tree unit (root node of the quad tree) or the quad tree node, and quad tree splitting may not be allowed when the current node is the multi-type tree node. Each quad tree leaf node 'QT leaf node' can be further split into a multi-type tree structure. As described above, when 'split_qt_flag' is 0, the current node can be split into multi-type nodes. In order to indicate the splitting direction and the splitting shape, 'mtt_split_cu_vertical_flag' and 'mtt_split_cu_binary_flag' can be signaled. When the value of 'mtt_split_cu_vertical_flag' is 1, vertical splitting of the node 'MTT node' is indicated, and when the value of 'mtt_split_cu_vertical_flag' is 0, horizontal splitting of the node 'MTT node' is indicated. In addition, when the value of 'mtt_split_cu_binary_flag' is 1, the node 'MTT node' is split into two rectangular nodes, and when the value of 'mtt_split_cu_binary_flag' is 0, the node 'MTT node' is split into three rectangular nodes.

In the tree partitioning structure, a luma block and a chroma block may be partitioned in the same form. That is, a chroma block may be partitioned by referring to the partitioning form of a luma block. When a current chroma block is less than a predetermined size, a chroma block may not be partitioned even if a luma block is partitioned.

In the tree partitioning structure, a luma block and a chroma block may have different forms. In this case, luma block partitioning information and chroma block partitioning information may be signaled separately. Furthermore, in addition to the partitioning information, luma block encoding information and chroma block encoding information may also be different from each other. In one example, the luma block and the chroma block may be different in at least one among intra encoding mode, encoding information for motion information, etc.

A node to be split into the smallest units may be treated as one coding block. When a current block is a coding block, the coding block may be partitioned into several sub-blocks (sub-coding blocks), and the sub-blocks may have the same prediction information or different pieces of prediction information. In one example, when a coding unit is in an intra mode, intra-prediction modes of sub-blocks may be the same or different from each other. Also, when the coding unit is in an inter mode, sub-blocks may have the same motion information or different pieces of the motion information. Furthermore, the sub-blocks may be encoded or decoded independently of each other. Each sub-block may be distinguished by a sub-block index (sbIdx). Also, when a coding unit is partitioned into sub-blocks, the coding unit may be partitioned horizontally, vertically, or diagonally. In an intra mode, a mode in which a current coding unit is partitioned into two or four sub-blocks horizontally or vertically is called intra sub-partitions (ISP). In an inter mode, a mode in which a current coding block is partitioned diagonally is called a geometric partitioning mode (GPM). In the GPM mode, the position and direction of a diagonal line are derived using a predetermined angle table, and index information of the angle table is signaled.

Picture prediction (motion compensation) for coding is performed on a coding unit that is no longer divided (i.e., a leaf node of a coding unit tree). Hereinafter, the basic unit for performing the prediction will be referred to as a "prediction unit" or a "prediction block".

Hereinafter, the term "unit" used herein may replace the prediction unit, which is a basic unit for performing prediction. However, the present disclosure is not limited thereto, and "unit" may be understood as a concept broadly encompassing the coding unit.

Figure 5:
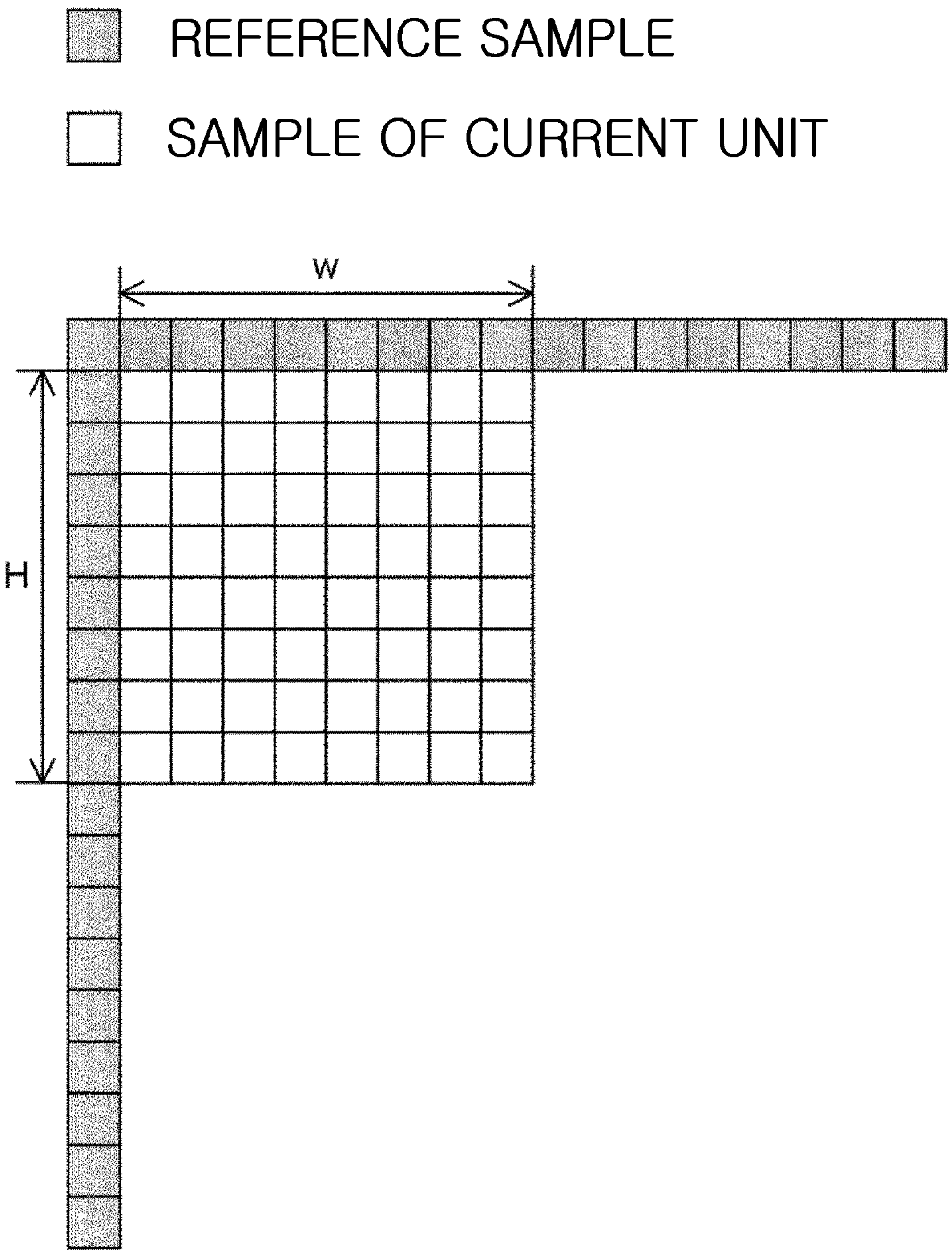
FIGS. 5 and 6 illustrate an intra-prediction method in more detail according to an embodiment of the present disclosure.
Figure 6:
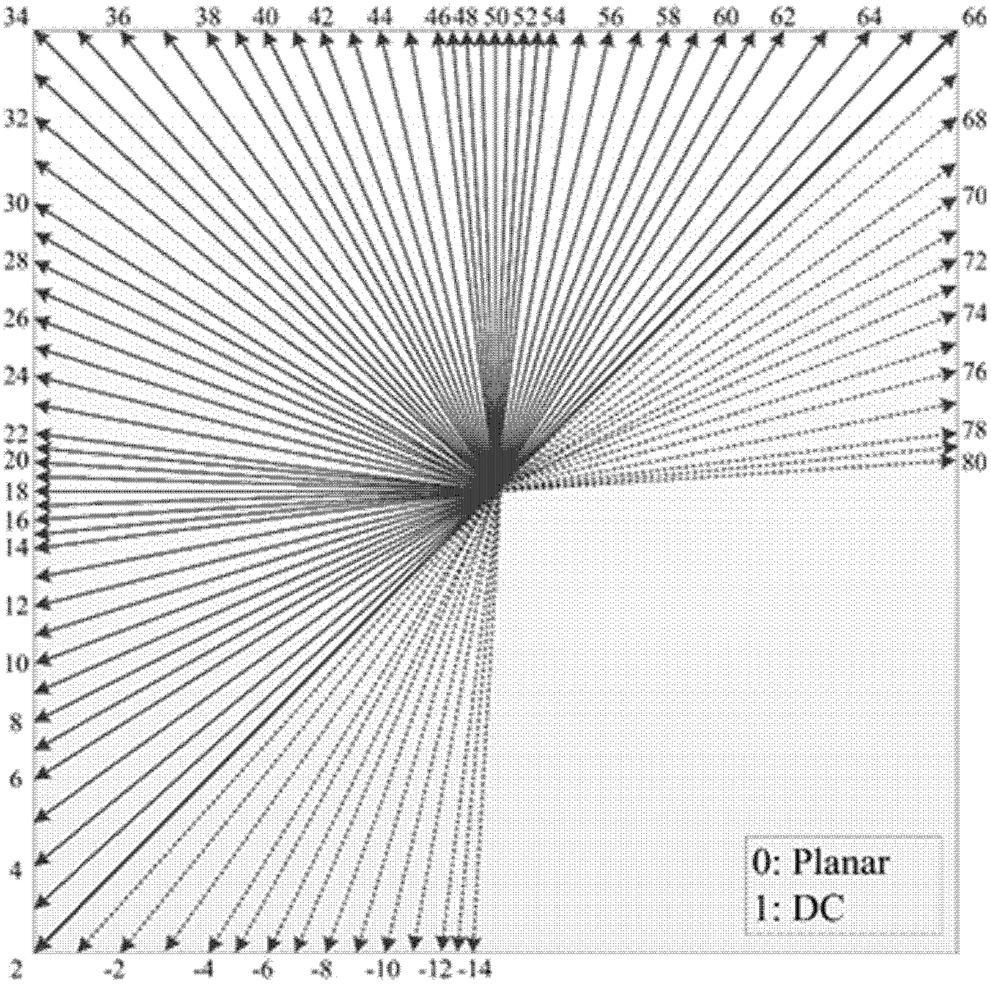

FIGS. 5 and 6 more specifically illustrate an intra prediction method according to an embodiment of the present invention. As described above, the intra prediction unit predicts the sample values of the current block by using the reconstructed samples located on the left and/or upper side of the current block as reference samples.

First, FIG. 5 shows an embodiment of reference samples used for prediction of a current block in an intra prediction mode. According to an embodiment, the reference samples may be samples adjacent to the left boundary of the current block and/or samples adjacent to the upper boundary. As shown in FIG. 5, when the size of the current block is W×H and samples of a single reference line adjacent to the current block are used for intra prediction, reference samples may be configured using a maximum of 2W+2H+1 neighboring samples located on the left and/or upper side of the current block.

Pixels from multiple reference lines may be used for intra prediction of the current block. The multiple reference lines may include n lines located within a predetermined range from the current block. According to an embodiment, when pixels from multiple reference lines are used for intra prediction, separate index information that indicates lines to be set as reference pixels may be signaled, and may be named a reference line index.

When at least some samples to be used as reference samples have not yet been restored, the intra prediction unit may obtain reference samples by performing a reference sample padding procedure. The intra prediction unit may perform a reference sample filtering procedure to reduce an error in intra prediction. That is, filtering may be performed on neighboring samples and/or reference samples obtained by the reference sample padding procedure, so as to obtain the filtered reference samples. The intra prediction unit predicts samples of the current block by using the reference samples obtained as in the above. The intra prediction unit predicts samples of the current block by using unfiltered reference samples or filtered reference samples. In the present disclosure, neighboring samples may include samples on at least one reference line. For example, the neighboring samples may include adjacent samples on a line adjacent to the boundary of the current block.

Next, FIG. 6 shows an embodiment of prediction modes used for intra prediction. For intra prediction, intra prediction mode information indicating an intra prediction direction may be signaled. The intra prediction mode information indicates one of a plurality of intra prediction modes included in the intra prediction mode set. When the current block is an intra prediction block, the decoder receives intra prediction mode information of the current block from the bitstream. The intra prediction unit of the decoder performs intra prediction on the current block based on the extracted intra prediction mode information.

According to an embodiment of the present invention, the intra prediction mode set may include all intra prediction modes used in intra prediction (e.g., a total of 67 intra prediction modes). More specifically, the intra prediction mode set may include a planar mode, a DC mode, and a plurality (e.g., 65) of angle modes (i.e., directional modes). Each intra prediction mode may be indicated through a preset index (i.e., intra prediction mode index). For example, as shown in FIG. 6, the intra prediction mode index 0 indicates a planar mode, and the intra prediction mode index 1 indicates a DC mode. Also, the intra prediction mode indexes 2 to 66 may indicate different angle modes, respectively. The angle modes respectively indicate angles which are different from each other within a preset angle range. For example, the angle mode may indicate an angle within an angle range (i.e., a first angular range) between 45 degrees and −135 degrees clockwise. The angle mode may be defined based on the 12 o'clock direction. In this case, the intra prediction mode index 2 indicates a horizontal diagonal (HDIA) mode, the intra prediction mode index 18 indicates a horizontal (Horizontal, HOR) mode, the intra prediction mode index 34 indicates a diagonal (DIA) mode, the intra prediction mode index 50 indicates a vertical (VER) mode, and the intra prediction mode index 66 indicates a vertical diagonal (VDIA) mode.

Meanwhile, the preset angle range can be set differently depending on a shape of the current block. For example, if the current block is a rectangular block, a wide angle mode indicating an angle exceeding 45 degrees or less than −135 degrees in a clockwise direction can be additionally used. When the current block is a horizontal block, an angle mode can indicate an angle within an angle range (i.e., a second angle range) between (45+offset1) degrees and (−135+offset1) degrees in a clockwise direction. In this case, angle modes 67 to 76 outside the first angle range can be additionally used. In addition, if the current block is a vertical block, the angle mode can indicate an angle within an angle range (i.e., a third angle range) between (45−offset2) degrees and (−135−offset2) degrees in a clockwise direction. In this case, angle modes −10 to −1 outside the first angle range can be additionally used. According to an embodiment of the present disclosure, values of offset1 and offset2 can be determined differently depending on a ratio between the width and height of the rectangular block. In addition, offset1 and offset2 can be positive numbers.

According to a further embodiment of the present invention, a plurality of angle modes configuring the intra prediction mode set can include a basic angle mode and an extended angle mode. In this case, the extended angle mode can be determined based on the basic angle mode.

According to an embodiment, the basic angle mode is a mode corresponding to an angle used in intra prediction of the existing high efficiency video coding (HEVC) standard, and the extended angle mode can be a mode corresponding to an angle newly added in intra prediction of the next generation video codec standard. More specifically, the basic angle mode can be an angle mode corresponding to any one of the intra prediction modes {2, 4, 6, . . . , 66}, and the extended angle mode can be an angle mode corresponding to any one of the intra prediction modes {3, 5, 7, . . . , 65}. That is, the extended angle mode can be an angle mode between basic angle modes within the first angle range. Accordingly, the angle indicated by the extended angle mode can be determined on the basis of the angle indicated by the basic angle mode.

According to another embodiment, the basic angle mode can be a mode corresponding to an angle within a preset first angle range, and the extended angle mode can be a wide angle mode outside the first angle range. That is, the basic angle mode can be an angle mode corresponding to any one of the intra prediction modes {2, 3, 4, . . . , 66}, and the extended angle mode can be an angle mode corresponding to any one of the intra prediction modes {−14, −13, −12, . . . , −1} and {67, 68, . . . , 80}. The angle indicated by the extended angle mode can be determined as an angle on a side opposite to the angle indicated by the corresponding basic angle mode. Accordingly, the angle indicated by the extended angle mode can be determined on the basis of the angle indicated by the basic angle mode. Meanwhile, the number of extended angle modes is not limited thereto, and additional extended angles can be defined according to the size and/or shape of the current block. Meanwhile, the total number of intra prediction modes included in the intra prediction mode set can vary depending on the configuration of the basic angle mode and extended angle mode described above In the embodiments described above, the spacing between the extended angle modes can be set on the basis of the spacing between the corresponding basic angle modes. For example, the spacing between the extended angle modes {3, 5, 7, . . . , 65} can be determined on the basis of the spacing between the corresponding basic angle modes {2, 4, 6, . . . , 66}. In addition, the spacing between the extended angle modes {−14, −13, . . . , −1} can be determined on the basis of the spacing between corresponding basic angle modes {53, 54, . . . , 66} on the opposite side, and the spacing between the extended angle modes {67, 68, . . . , 80} can be determined on the basis of the spacing between the corresponding basic angle modes {2, 3, 4, . . . , 15} on the opposite side. The angular spacing between the extended angle modes can be set to be the same as the angular spacing between the corresponding basic angle modes. In addition, the number of extended angle modes in the intra prediction mode set can be set to be less than or equal to the number of basic angle modes.

According to an embodiment of the present invention, the extended angle mode can be signaled based on the basic angle mode. For example, the wide angle mode (i.e., the extended angle mode) can replace at least one angle mode (i.e., the basic angle mode) within the first angle range. The basic angle mode to be replaced can be a corresponding angle mode on a side opposite to the wide angle mode. That is, the basic angle mode to be replaced is an angle mode that corresponds to an angle in an opposite direction to the angle indicated by the wide angle mode or that corresponds to an angle that differs by a preset offset index from the angle in the opposite direction. According to an embodiment of the present invention, the preset offset index is 1. The intra prediction mode index corresponding to the basic angle mode to be replaced can be remapped to the wide angle mode to signal the corresponding wide angle mode. For example, the wide angle modes {−14, −13, . . . , −1} can be signaled by the intra prediction mode indices {52, 53, . . . , 66}, respectively, and the wide angle modes {67, 68, . . . , 80} can be signaled by the intra prediction mode indices {2, 3, . . . , 15}, respectively. In this way, the intra prediction mode index for the basic angle mode signals the extended angle mode, and thus the same set of intra prediction mode indices can be used for signaling the intra prediction mode even if the configuration of the angle modes used for intra prediction of each block are different from each other. Accordingly, signaling overhead due to a change in the intra prediction mode configuration can be minimized.

Meanwhile, whether or not to use the extended angle mode can be determined on the basis of at least one of the shape and size of the current block. According to an embodiment, when the size of the current block is greater than a preset size, the extended angle mode can be used for intra prediction of the current block, otherwise, only the basic angle mode can be used for intra prediction of the current block. According to another embodiment, when the current block is a block other than a square, the extended angle mode can be used for intra prediction of the current block, and when the current block is a square block, only the basic angle mode can be used for intra prediction of the current block.

The intra-prediction unit determines reference samples and/or interpolated reference samples to be used for intra prediction of the current block, based on the intra-prediction mode information of the current block. When the intra-prediction mode index indicates a specific angular mode, a reference sample corresponding to the specific angle or an interpolated reference sample from current samples in the current block is used for prediction of a current pixel. Thus, different sets of reference samples and/or interpolated reference samples may be used for intra prediction depending on the intra-prediction mode. After the intra prediction of the current block is performed using the reference samples and the intra-prediction mode information, the decoder reconstructs sample values of the current block by adding the residual signal of the current block, which has been obtained from the inverse transform unit, to the intra-prediction value of the current block.

Motion information used for inter prediction may include reference direction indication information (inter_pred_idc), reference picture index (ref_idx_l0, ref_idx_l1), and motion vector (mvL0, mvL1). Reference picture list utilization information (predFlagL0, predFlagL1) may be set based on the reference direction indication information. In one example, for a unidirectional prediction using an L0 reference picture, predFlagL0=1 and predFlagL1=0 may be set. For a unidirectional prediction using an L1 reference picture, predFlagL0=0 and predFlagL1=1 may be set. For bidirectional prediction using both the L0 and L1 reference pictures, predFlagL0=1 and predFlagL1=1 may be set.

When the current block is a coding unit, the coding unit may be partitioned into multiple sub-blocks, and the sub-blocks have the same prediction information or different pieces of prediction information. In one example, when the coding unit is in an intra mode, intra-prediction modes of the sub-blocks may be the same or different from each other. Also, when the coding unit is in an inter mode, the sub-blocks may have the same motion information or different pieces of motion information. Furthermore, the sub-blocks may be encoded or decoded independently of each other. Each sub-block may be distinguished by a sub-block index (sbIdx).

The motion vector of the current block is likely to be similar to the motion vector of a neighboring block. Therefore, the motion vector of the neighboring block may be used as a motion vector predictor (MVP), and the motion vector of the current block may be derived using the motion vector of the neighboring block. Furthermore, to improve the accuracy of the motion vector, the motion vector difference (MVD) between the optimal motion vector of the current block and the motion predictor found by the encoder from an original video may be signaled.

The motion vector may have various resolutions, and the resolution of the motion vector may vary on a block-by-block basis. The motion vector resolution may be expressed in integer units, half-pixel units, ¼ pixel units, 1/16 pixel units, 4-integer pixel units, etc. A video, such as screen content, has a simple graphical form such as text, and does not require an interpolation filter to be applied. Thus, integer units and 4-integer pixel units may be selectively applied on a block-by-block basis. A block encoded using an affine mode, which represent rotation and scale, exhibit significant changes in form, so integer units, ¼ pixel units, and 1/16 pixel units may be applied selectively on a block-by-block basis. Information about whether to selectively apply motion vector resolution on a block-by-block basis is signaled by amvr_flag. If applied, information about a motion vector resolution to be applied to the current block is signaled by amvr_precision_idx.

In the case of blocks to which bidirectional prediction is applied, weights applied between two prediction blocks may be equal or different when applying the weighted average, and information about the weights is signaled via BCW_IDX.

In order to improve the accuracy of the motion vector predictor, a merge or AMVP method may be selectively used on a block-by-block basis. The merge method is a method that configures motion information of a current block to be the same as motion information of a neighboring block adjacent to the current block, and is advantageous in that the motion information is spatially propagated without change in a motion region with homogeneity, and thus the encoding efficiency of the motion information is increased. On the other hand, the AMVP method is a method for predicting motion information in L0 and L1 prediction directions respectively and signaling the most optimal motion information in order to represent accurate motion information. The decoder derives motion information for a current block by using the AMVP or merge method, and then uses a reference block, located in the motion information in a reference picture, as a prediction block for the current block.

A method of deriving motion information in Merge or AMVP involves a method for constructing a motion candidate list using motion predictors vector derived from neighboring blocks, and then signaling index information for the optimal motion candidate. In the case of AMVP, motion candidate lists are derived for L0 and L1, respectively, so the most optimal motion candidate indexes (mvp_l0_flag, mvp_l1_flag) for L0 and L1 are signaled, respectively. In the case of Merge, a single move candidate list is derived, so a single merge index (merge idx) is signaled. There may be various motion candidate lists derived from a single coding unit, and a motion candidate index or a merge index may be signaled for each motion candidate list. In this case, a mode in which there is no information about residual blocks in blocks encoded using the merge mode may be called a MergeSkip mode.

Symmetric MVD (SMVD) is a method which makes motion vector difference (MVD) values in the L0 and L1 directions symmetrical in the case of bi-directional prediction, thereby reducing the bit rate of motion information transmitted. The MVD information in the L1 direction that is symmetrical to the L0 direction is not transmitted, and reference picture information in the L0 and L1 directions is also not transmitted, but is derived during decoding. Overlapped block motion compensation (OBMC) is a method in which, when blocks have different pieces of motion information, prediction blocks for a current block are generated by using motion information of neighboring blocks, and the prediction blocks are then weighted averaged to generate a final prediction block for the current block. This has the effect of reducing the blocking phenomenon that occurs at the block edges in a motion-compensated video.

Generally, a merged motion candidate has low motion accuracy. To improve the accuracy of the merge motion candidate, a merge mode with MVD (MMVD) method may be used. The MMVD method is a method for correcting motion information by using one candidate selected from several motion difference value candidates. Information about a correction value of the motion information obtained by the MMVD method (e.g., an index indicating one candidate selected from among the motion difference value candidates, etc.) may be included in a bitstream and transmitted to the decoder. By including the information about the correction value of the motion information in the bitstream, a bit rate may be saved compared to including an existing motion information difference value in a bitstream.

A template matching (TM) method is a method for correcting motion information by constructing a template via neighboring pixels of a current block and finding a matching region with the highest similarity to the template.

A Decoder-side Motion Vector Refinement (DMVR) method is a method for correcting motion information through the correlation of already restored reference videos in order to find more accurate motion information. The DMVR method is a method which uses the bidirectional motion information of a current block to use, within predetermined regions of two reference pictures, a point with the best matching between reference blocks in the reference pictures as a new bidirectional motion. When the DMVR method is performed, the encoder may perform DMVR on one block to correct motion information, and then partition the block into sub-blocks and perform DMVR on each sub-block to correct motion information of the sub-block again, and this may be referred to as multi-pass DMVR (MP-DMVR).

A local illumination compensation (LIC) method is a method for compensating for changes in luma between blocks, and is a method which derives a linear model by using neighboring pixels adjacent to a current block, and then compensate for luma information of the current block by using the linear model.

Existing video encoding methods perform motion compensation by considering only parallel movements in upward, downward, leftward, and rightward directions, thus reducing the encoding efficiency when encoding videos that include movements such as zooming, scaling, and rotation that are commonly encountered in real life. To express the movements such as zooming, scaling, and rotation, affine model-based motion prediction techniques using four (rotation) or six (zooming, scaling, rotation) parameter models may be applied.

Bi-directional optical flow (BDOF) is used to correct a prediction block by estimating the amount of change in pixels on an optical-flow basis from a reference block of blocks with bi-directional motion. Motion information derived by the BDOF of VVC may be used to correct the motion of a current block.

Prediction refinement with optical flow (PROF) is a technique for improving the accuracy of affine motion prediction for each sub-block so as to be similar to the accuracy of motion prediction for each pixel. Similar to BDOF, PROF is a technique that obtains a final prediction signal by calculating a correction value for each pixel with respect to pixel values in which affine motion is compensated for each sub-block based on optical-flow.

The combined inter-/intra-picture prediction (CIIP) method is a method for generating a final prediction block by performing weighted averaging of a prediction block generated by an intra-picture prediction method and a prediction block generated by an inter-picture prediction method when generating a prediction block for the current block.

The intra block copy (IBC) method is a method for finding a part, which is most similar to a current block, in an already reconstructed region within current picture and using the reference block as a prediction block for the current block. In this case, information related to a block vector, which is the distance between the current block and the reference block, may be included in a bitstream. The decoder can parse the information related to the block vector contained in the bitstream to calculate or set the block vector for the current block.

The bi-prediction with CU-level weights (BCW) method is a method in which with respect to two motion-compensated prediction blocks from different reference pictures, weighted averaging of the two prediction blocks is performed by adaptively applying weights on a block-by-block basis without generating the prediction blocks using an average.

The multi-hypothesis prediction (MHP) method is a method for performing weighted prediction through various prediction signals by transmitting additional motion information in addition to unidirectional and bidirectional motion information during inter-picture prediction.

The cross-component linear model (CCLM) is a method that constructs a linear model by using the high correlation between a luma signal and a chroma signal at the same position as the luma signal, and then predict the chroma signal by using the linear model. A template is constructed using a block, which has been completely reconstructed, among neighboring blocks adjacent to a current block, and parameters for the linear model are derived through the template. Next, a current luma block, selectively reconstructed based on video formats so as to fit the size of a chroma block, is downsampled. Finally, the downsampled luma block and the corresponding linear model are used to predict a chroma block of the current block. In this case, a method using two or more linear models is referred to as multi-model linear mode (MMLM).

In independent scalar quantization, a reconstructed coefficient $t'_k$ for an input coefficient $t_k$ depends only on a related quantization index $q_k$. That is, a quantization index for a random reconstructed coefficient has a different value from quantization indexes for other reconstructed coefficients. Here, $t'_k$ may be a value that includes a quantization error in $t_k$, and may be different or the same depending on quantization parameters. Here, $t'_k$ may be called a reconstructed transform coefficient or a dequantized transform coefficient, and the quantization index may be called a quantized transform coefficient. In uniform reconstruction quantization (URQ), reconstructed coefficients have the characteristic of being arrangement at equal intervals. The distance between two adjacent reconstructed values may be called a quantization step size. The reconstructed values may include 0, and the entire set of available reconstructed values may be uniquely defined based on the quantization step size. The quantization step size may vary depending on quantization parameters.

In the existing methods, quantization reduces the set of acceptable reconstructed transform coefficients, and elements of the set may be finite. Thus, there are limitation in minimizing the average error between an original video and a reconstructed video. Vector quantization may be used as a method for minimizing the average error.

A simple form of vector quantization used in video encoding is sign data hiding. This is a method in which the encoder does not encode a sign for one non-zero coefficient and the decoder determines the sign for the coefficient based on whether the sum of absolute values of all the coefficients is even or odd. To this end, in the encoder, at least one coefficient may be incremented or decremented by "1", and the at least one coefficient may be selected and have a value adjusted so as to be optimal from the perspective of rate-distortion cost. In one example, a coefficient with a value close to the boundary between the quantization intervals may be selected.

Another vector quantization method is trellis-coded quantization, and, in video encoding, is used as an optimal path-searching technique to obtain optimized quantization values in dependent quantization. On a block-by-block basis, quantization candidates for all coefficients in a block are placed in a trellis graph, and the optimal trellis path between optimized quantization candidates is found by considering rate-distortion cost. Specifically, the dependent quantization applied to video encoding may be designed such that a set of acceptable reconstructed transform coefficients with respect to transform coefficients depends on the value of a transform coefficient that precedes a current transform coefficient in the reconstruction order. At this time, by selectively using multiple quantizers according to the transform coefficients, the average error between the original video and the reconstructed video is minimized, thereby increasing the encoding efficiency.

Among intra prediction encoding techniques, the matrix intra prediction (MIP) method is a matrix-based intra prediction method, and obtains a prediction signal by using a predefined matrix and offset values through pixels on the left and top of a neighboring block, unlike a prediction method having directionality from pixels of neighboring blocks adjacent to a current bloc.

To derive an intra-prediction mode for a current block, on the basis of a template which is a random reconstructed region adjacent to the current block, an intra-prediction mode for a template derived through neighboring pixels of the template may be used to reconstruct the current block. First, the decoder may generate a prediction template for the template by using neighboring pixels (references) adjacent to the template, and may use an intra-prediction mode, which has generated the most similar prediction template to an already reconstructed template, to reconstruct the current block. This method may be referred to as template intra mode derivation (TIMD).

In general, the encoder may determine a prediction mode for generating a prediction block and generate a bitstream including information about the determined prediction mode. The decoder may parse a received bitstream to set an intra-prediction mode. In this case, the bit rate of information about the prediction mode may be approximately 10% of the total bitstream size. To reduce the bit rate of information about the prediction mode, the encoder may not include information about an intra-prediction mode in the bitstream. Accordingly, the decoder may use the characteristics of neighboring blocks to derive (determine) an intra-prediction mode for reconstruction of a current block, and may use the derived intra-prediction mode to reconstruct the current block. In this case, to derive the intra-prediction mode, the decoder may apply a Sobel filter horizontally and vertically to each neighboring pixel adjacent to the current block to infer directional information, and then map the directional information to the intra-prediction mode. The method by which the decoder derives the intra-prediction mode using neighboring blocks may be described as decoder side intra mode derivation (DIMD).

Figure 7:
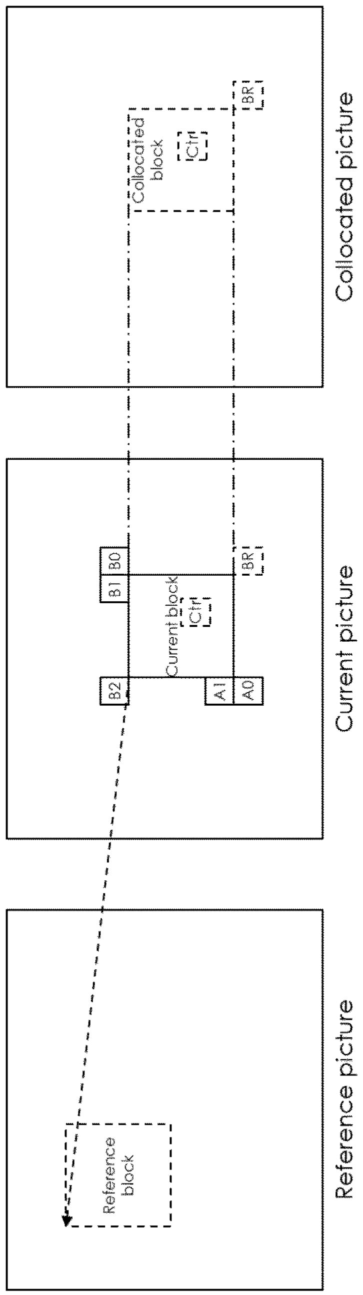
FIG. 7 illustrates the position of neighboring blocks used to construct a motion candidate list in inter prediction.

FIG. 7 illustrates the position of neighboring blocks used to construct a motion candidate list in inter prediction.

The neighboring blocks may be spatially located blocks or temporally located blocks. A neighboring block that is spatially adjacent to a current block may be at least one among a left (A1) block, a left below (A0) block, an above (B1) block, an above right (B0) block, or an above left (B2) block. A neighboring block that is temporally adjacent to the current block may be a block in a collocated picture, which includes the position of a top left pixel of a bottom right (BR) block of the current block. When a neighboring block temporally adjacent to the current block is encoded using an intra mode, or when the neighboring block temporally adjacent to the current block is positioned not to be used, a block, which includes a horizontal and vertical center (Ctr) pixel position in the current block, in the collocated picture corresponding to the current picture may be used as a temporal neighboring block. Motion candidate information derived from the collocated picture may be referred to as a temporal motion vector predictor (TMVP). Only one TMVP may be derived from one block. One block may be partitioned into multiple sub-blocks, and a TMVP candidate may be derived for each sub-block. A method for deriving TMVPs on a sub-block basis may be referred to as sub-block temporal motion vector predictor (sbTMVP).

Figure 8:
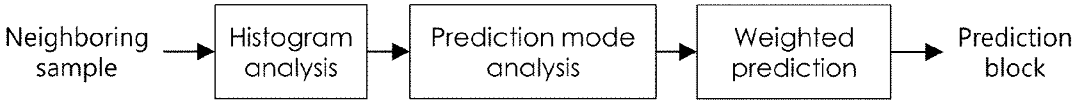
FIG. 8 illustrates the process of generating a prediction block by using DIMD.

FIG. 8 illustrates the process of generating a prediction block by using DIMD.

Referring to FIG. 8, a decoder may use a neighboring sample (a block or a pixel) to derive a prediction block. In this case, the neighboring sample may be a neighboring block (pixel) of a current block. Specifically, the decoder may determine intra-prediction modes and weight information for reconstruction of the current block through a histogram of directional information (angular information) by using a neighboring sample as input.

Figure 9:
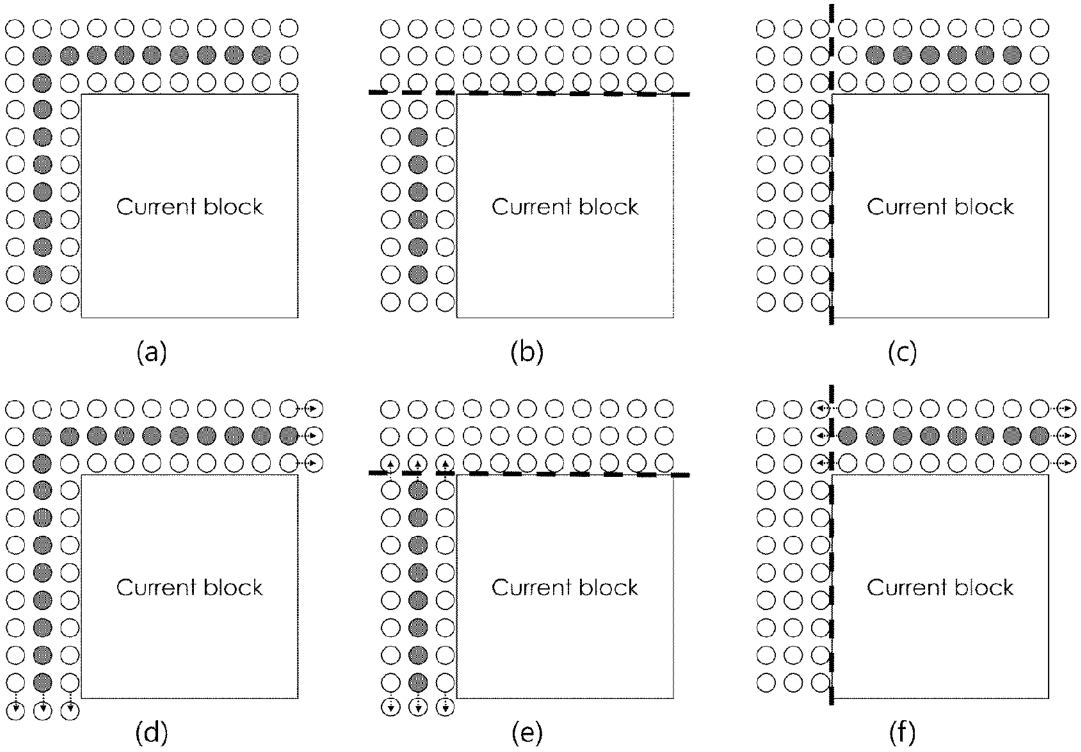
FIG. 9 illustrates the position of neighboring pixels used to derive directional information.

FIG. 9 illustrates the position of neighboring pixels used to derive directional information.

FIG. 9A shows when all neighboring blocks of current block are available to derive directional information, FIG. 9B shows when the top edge of a current block is a sub-picture, slice, tile, or CTU boundary, and FIG. 9C shows when the left edge of a current block is a sub-picture, slice, tile, or CTU boundary. When neighboring blocks and a current block do not belong to the same sub-picture, slice, tile, or CTU, the neighboring block may not be used to derive directional information. Gray dots in FIG. 9 indicate the positions of pixels that are used to derive actual directional information, and dashed lines indicate sub-picture, slice, tile, and CTU boundaries. Also, referring to FIGS. 9D to 9F, in order to derive directional information, pixels located at a boundary may be padded by one pixel outside the boundary. The padding enables more accurate directional information to be derived.

To derive directional information regarding a pixel at a specific position, a 3×3 Sobel filter in Equation 1 may be applied in the horizontal and vertical directions, respectively. "A" in Equation 1 may refer to pixel information (values) of restored neighboring blocks of the 3×3 current block. Directional information θ may be determined using Equation 2. To reduce the computational complexity of deriving the directional information, a decoder may derive the directional information θ by only calculating Gy/Gx in Equation 1 without calculating the a tan function in Equation 2.

$$G_x = \begin{bmatrix} -1 & 0 & 1 \\ -2 & 0 & 2 \\ -1 & 0 & 1 \end{bmatrix} * A \quad et \quad G_y = \begin{bmatrix} -1 & -2 & -1 \\ 0 & 0 & 0 \\ 1 & 2 & 1 \end{bmatrix} * A \qquad \text{[Equation 1]}$$

-continued $$\theta = \operatorname{atan}\left(\frac{G_y}{G_x}\right) \qquad \text{[Equation 2]}$$

Referring to FIG. 9, directional information may be calculated for all gray dots shown in FIG. 9, and the directional information may be mapped to an angle of an intra-prediction mode. An intra-prediction mode set may include a planar mode, a DC mode, and multiple (e.g., 65) angular modes (i.e., direction modes). There may be 67 intra-prediction modes, and the direction information (angle) θ calculated via Equation 2 may be a value in real numbers. Therefore, it is necessary to map the directional information to a specific intra-prediction direction mode. The directional mode described in the present specification may be the same as an angular mode.

Figure 10:
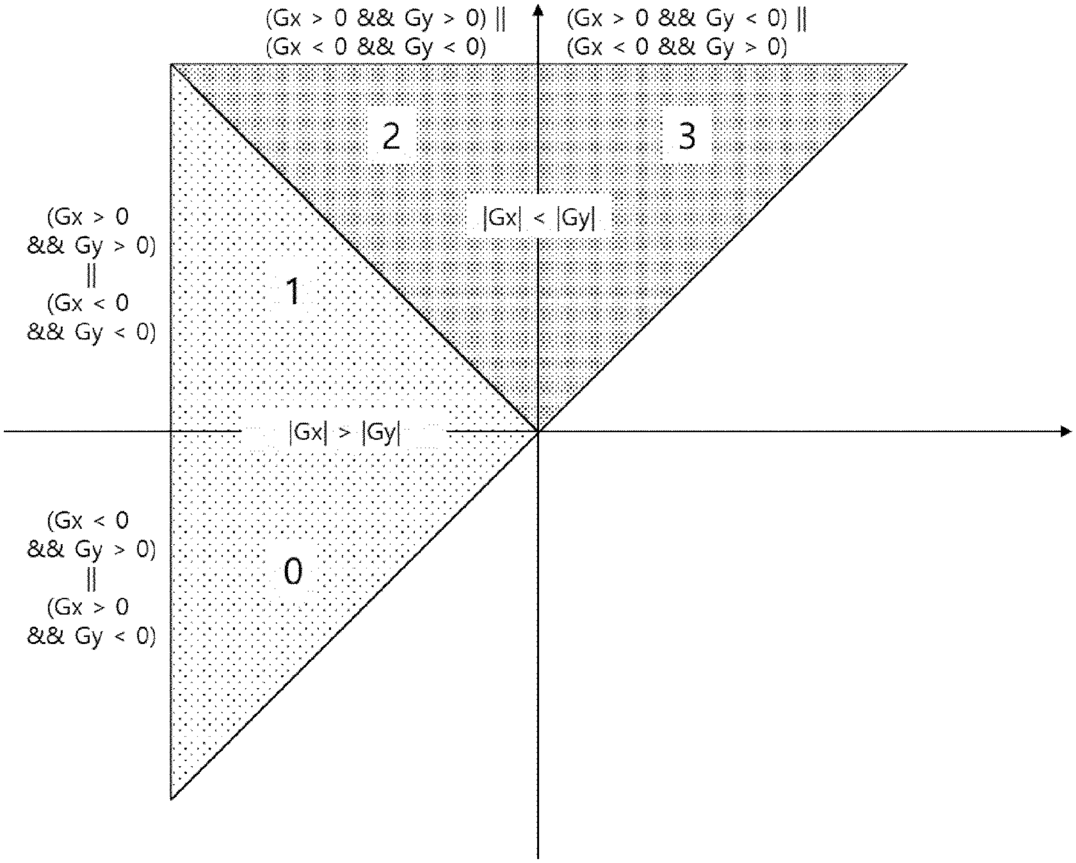
FIG. 10 illustrates a method for mapping a directional mode.

FIG. 10 illustrates a method for mapping a directional mode.

Referring to FIG. 10, intra-prediction directional modes may be divided into four intervals based on 0 degrees (index 18), 45 degrees (index 34), 90 degrees (index 50), and 135 degrees (index 66) (see FIG. 6). Referring to FIG. 10, the intervals for determining intra-prediction directional modes may be divided into four intervals, ranging from interval 0 to interval 3 Interval 0 may range from −45 degrees to 0 degrees, interval 1 may range from 0 degrees to 45 degrees, interval 2 may range from 45 degrees to 90 degrees, and interval 3 may range from 90 degrees to 135 degrees. Each interval may include 16 intra-prediction directional modes. In relation to the directional modes, one of the four intervals may be determined by comparing the signs and magnitudes of Gx and Gy calculated through Equation 1. For example, when Gx and Gy are positive numbers, and when the absolute value of Gx is greater than the absolute value of Gy, interval 1 may be selected. Intra-prediction directional modes mapped to each interval may be determined through the directional information θ calculated by Equation 2. Specifically, a decoder expands the value by multiplying the directional information (θ) by 2^16. The decoder may then compare the expanded value with values in a predefined table to find a value closest to the expanded value, and may determine intra-prediction directional modes based on the closest value. In this case, the predefined table may have 17 values. Specifically, the values in the predefined table may be {0, 2048, 4096, 6144, 8192, 12288, 16384, 20480, 24576, 28672, 32768, 36864, 40960, 47104, 53248, 59392, 65536}. In this case, the difference between the values in the predefined table may be set differently depending on the difference between angles of intra-prediction direction modes.

Meanwhile, when calculating a directional angle only using Gy/Gx without performing a tan calculation in order to reduce computational complexity, the difference between the predefined table values may not match the distance between angles of the intra-prediction directional modes. a tan has a feature wherein the slope gradually decreases as the input value increases. Therefore, values in the above-defined table should also be set in consideration of both the difference between angles of the intra-prediction directional modes and the non-linear characteristic of a tan. For example, the difference between the values in the above-defined table may be configured to decrease gradually. Conversely, the difference between the values in the above-defined table may be configured to increase gradually.

When the horizontal and vertical lengths of the current block are different, an available intra-prediction directional mode may vary. That is, when the horizontal and vertical lengths of the current block are different, the interval for deriving intra-prediction directional mode may vary. In other words, the interval for deriving an intra-prediction directional mode may change based on the horizontal and vertical lengths of the current block (e.g., the ratio of the horizontal length to the vertical length, etc.). For example, when the current block has a horizontal length longer than a vertical length, intra-prediction modes corresponding to 67 to 80 may be remapped, and intra-prediction modes corresponding to 2 to 15 in the opposite direction may be excluded. For example, when the horizontal length of the current block is n (integer) times (e.g. 2 times) longer than the vertical length thereof, intra-prediction modes {3, 4, 5, 6, 7, 8} may be reset (mapped) to {67, 68, 69, 70, 71, 72}, respectively. Also, when the horizontal length of the current block is longer than the vertical length thereof, intra-prediction modes may be reset to a value obtained by adding "65" to the intra-prediction modes. On the other hand, when the horizontal length of the current block is shorter than the vertical length thereof, intra-prediction modes may be reset to a value obtained by subtracting "67" from the intra-prediction mode.

A histogram may be used to derive an intra-prediction directional mode for reconstruction of the current block. When, as a result of acquiring directional information about neighboring blocks, there are more blocks without directionality than those with directionality, prediction modes for the block without directionality may have the highest cumulative value in the histogram. However, the directional modes must be derived for the reconstruction of the current block, and thus the prediction modes for the blocks without directionality may be excluded, even if the prediction modes have the highest cumulative value in the histogram. That is, smooth regions, in which there is no directionality or no gradient among neighboring pixels, may not be used to derive an intra-prediction directional mode. For example, a prediction mode for a block without directionality may be a planar mode or a DC mode. When a left neighboring block is in a planar or DC mode, the left neighboring block may not be used to derive directional information, and only an above neighboring block may be used to derive directional information. When neighboring blocks of the current block includes both a smooth region and a directional region, the decoder may generate a histogram by using a calculated G value as shown in Equation 3 in order to emphasize the directionality. In this case, the histogram may be a cumulative value in which the calculated G value is added to each occurring intra-prediction directional mode, rather than a frequency-based value to which "1" is added to each occurring intra-prediction directional mode.

$$G = |G_x| + |G_y| \quad \text{[Equation 3]}$$

Figure 11:
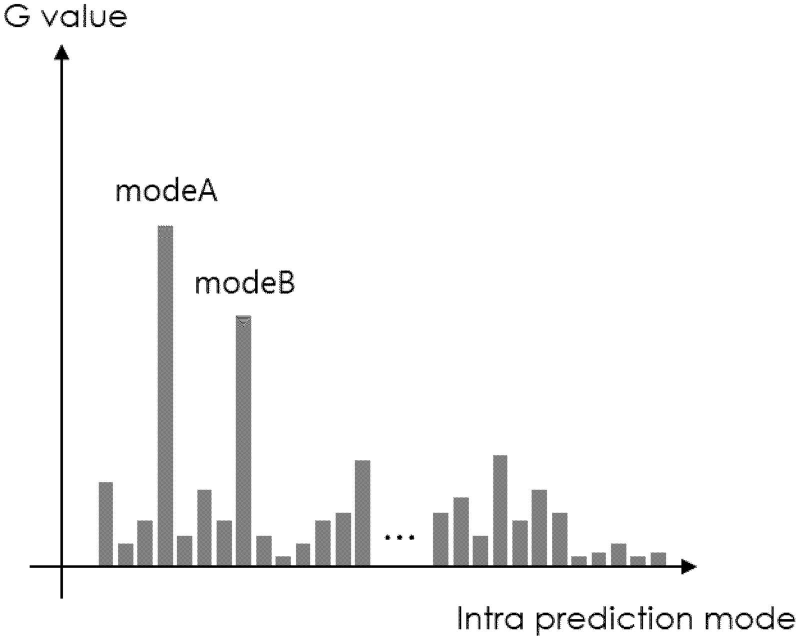
FIG. 11 illustrates a histogram for deriving an intra-prediction directional mode.

FIG. 11 illustrates a histogram for deriving an intra-prediction directional mode.

In FIG. 11, the x-axis represents the intra-prediction directional mode and the y-axis represents the cumulative value of G values. A decoder may select, from among intra-prediction directional modes, an intra-prediction directional mode with the largest cumulative value of the G values. In other words, the decoder may select, based on the cumulative value, an intra-prediction directional mode for a current block. Referring to FIG. 11, modeA with the largest cumulative value and modeB with the second largest cumulative value may be selected as intra-prediction directional modes. To generate a prediction block for the current block, the decoder may generate a final prediction block by performing weighted averaging of a prediction block generated by modeA, a prediction block generated by modeB, and finally prediction blocks generated by a planar mode. In this case, the weight value of each prediction block may be determined using cumulative values of modeA and modeB. For example, the weight value of the prediction block generated by the planar mode may be set to ⅓ of the total weight. The weight value of the prediction block generated by modeA may be set to a weight equal to a value obtained by dividing the sum of the cumulative values of modeA and modeB by the cumulative value of modeA. The weight value of the prediction block generated by modeB may be determined by subtracting the weight value of modeA and ⅓ of the total weight value from the total weight value. To calculate the weights more accurately, the decoder may multiply the weight value of the prediction block generated by modeA by a predetermined value to expand the range of weight values. The weight value of the prediction block generated by modeB and the weight value of the prediction block generated by the planar mode may be expanded in the same way.

FIG. 12 illustrates a method for signaling a DIMD mode.

Specifically, FIG. 12 illustrates a signaling method used to store a syntax element, which indicates whether DIMD mode is applied, in a bitstream and transmit the bitstream to a decoder. Referring to FIG. 12, a syntax element (cu_dimd_flag) regarding whether a DIMD mode is used to generate a prediction block for a current block may be parsed when the encoding mode of the current block is an intra mode, when a syntax element (sps_dimd_enabled_flag) regarding whether a DIMD mode which is set by SPS is enabled indicates that the DIMD mode is enabled (e.g., when sp_dimd_enabled_flag has a value of 1), when the encoding mode of the current block is not a SKIP mode, when the current block is a luma block, and when the current block is not inter encoding mode. In this case, cu_dimd_flag equal to "1" may indicate that the current block is decoded using the DIMD mode, and cu_dim_flag equal to "0" may indicate that the current block is not decoded using the DIMD mode. On the other hand, when cu_dimd_flag is not parsed, the value of cu_dimd_flag may be set to "0". Sps_dimd_enabled_flag may be controlled by syntax elements included in profile, tier, and level syntax. For example, sps_dimd_enabled_flag may be controlled by gci_no_dimd_constraint_flag, which is a syntax element included in general_conatraints_info( ) syntax. It may be defined to perform the following operations. gci_no_dimd_constraint_flag equal to 1 specifies that sps_dimd_enabled_flag for all pictures in OlsInScope shall be equal to 0. gci_no_dimd_constraint_flag equal to 0 does not impose such a constraint.

FIG. 13 illustrates a method for signaling a syntax element related to an intra-prediction mode based on whether a DIMD mode is used.

When a current block is decoded using a DIMD mode, additional information (syntax elements) related to an encoding mode may not be parsed. Referring to FIG. 13, when cu_dimd_flag has a value of 1, additional information (e.g., intra_mip_flag, intra_subpartitions_mode_flag, intra_luma_mpm_flag, intra_luma_not_planar_flag, intra_luma_mpm_idx, and intra_luma_mpm_remainder) related to the encoding mode of the current block may not be parsed. Then, when a residual signal is present, whether a transform coefficient for the residual signal is present and syntax elements related to the residual signal may be parsed.

FIG. 14 illustrates a method for generating a prediction sample for reconstructing a current block.

Specifically, FIG. 14 is a structural diagram illustrating a process of more effectively deriving an intra-prediction mode to improve encoding performance and generating a prediction sample by using the derived intra-prediction mode.

Referring to FIG. 14, in a "prediction mode generator" process, a decoder may derive intra-prediction directional modes for a current block by using samples of neighboring blocks adjacent to the current block. At this time, the decoder may derive at least one intra-prediction directional mode, and may derive a weight value for each mode. For example, to derive an intra-prediction directional mode, the decoder may use a histogram-based method that derives directional information of neighboring block samples through any filter and determines frequently occurring directional information to be the intra-prediction directional mode. In addition, as a method for deriving an intra-prediction directional mode, a method that generates intra-prediction pixels for left pixels adjacent to a current block by using only above pixels adjacent to the current block and determines the least distorted intra-prediction mode as an intra-prediction directional mode for the current block may be used.

Referring to FIG. 14, in an "intra prediction" process, prediction blocks for the current block may be generated using weights and the intra-prediction directional modes derived in the "prediction mode generator" process. The number of prediction blocks may be determined based on the number of intra-prediction directional modes derived in the prediction mode generator process. For example, when the number of derived intra-prediction directional modes is 2, the number of prediction blocks for the current block may be 2. Position dependent intra prediction combination (PDPC) filtering using a method to be described later may be applied to the prediction blocks generated in the "intra prediction" process.

Position dependent intra prediction combination (PDPC) filtering may be applied to each of the prediction blocks generated in the "intra prediction" process. When PDPC filtering is applied to each prediction block, complexity may increase in terms of the decoder. Thus, when a prediction block is predicted using a DIMD mode, PDPC filtering may not be applied to the prediction block. In addition, PDPC filtering may be applied to only either modeA, which has the largest cumulative value, or modeB, which has the second largest cumulative value. For example, PDPC filtering may be applied only to modeA. In addition, whether PDPC filtering is applied may be determined based on the weight of each directional mode. For example, whether PDPC will be applied to all or part of modeA and modeB may be determined based on the difference between a weight for modeA and a weight for modeB. For example, when the difference between the weight for modeA and the weight for modeB is less than a specific value, PDPC filtering may be applied to both modeA and modeB. In addition, whether PDPC filtering is applied to modeA and modeB may be determined by comparing each of the weight for modeA and the weight for modeB with the specific value. When a weight is greater than the specific value, PDPC filtering may be applied to a directional mode corresponding to the weight. For example, when the weight for modeA is greater than the specific value and the weight for modeB is less than the specific value, PDPC filtering may be applied to modeA, and PDPC filtering may not be applied to modeB. In addition, regardless of the directional mode, a predetermined type of PDPC filtering may be applied only to a final prediction block to which a weighted average has been applied through a weighted prediction process (see FIG. 14). In addition, PDPC filtering may be applied, using modeA, to the final prediction block to which the weighted average has been applied in the "weighted prediction" process. PDPC filtering may be applied, using modeB, to the final prediction block to which the weighted average has been applied in the "weighted prediction" process.

Referring to FIG. 14, in an "other prediction" process, the decoder may additionally generate a prediction block for the current block. For example, the decoder may generate an intra-prediction block by using at least one of a planar mode, a DC mode, and matrix intra prediction (MIP). Whether the "other prediction" process is performed may be determined using at least one among the intra-prediction directional modes derived in the "prediction mode generator" process, weight information corresponding to each of the prediction directional modes, quantization parameter information of the current block, the horizontal or vertical length of the current block, information about whether the current block is a luma component block or a chroma component block, intra-prediction modes around the current block, and information about whether there is a transform coefficient of a neighboring block of the current block (which may correspond to additional information A, B, and C in FIG. 14). Hereinafter, a method for determining whether the "other prediction" process is performed will be described.

Information about which mode (e.g., a planar, DC, or MIP mode) the decoder will use during the "other prediction" process may be pre-defined or signaled via SPS. For example, the decoder may determine a mode based on a syntax element (sps_dimd_default_mode) that indicates which mode to use. The decoder may determine which mode to use among a planar mode, a DC mode, and a MIP mode based on the value of sps_dimd_default_mode. For example, sps_dimd_default_mode equal to a value of "0" may indicate the use of the planar mode, sps_dimd_default_mode equal to a value of "1" may indicate the use of the DC mode, and sps_dimd_default_mode equal to values other than 0 and 10| may indicate the use of the MIP mode. Furthermore, when the current block is a luma block and when there is a transform coefficient of a neighboring block, the decoder may generate a prediction block by using at least one of the planar mode, the DC mode, and the MIP mode. When the current block is a chroma block and when there is no transform coefficient of the neighboring block, the decoder may generate a prediction block by using at least one of the planar mode, the DC mode, and the MIP mode. Also, when the weight values of the intra-prediction directional modes derived in the "prediction mode generator" process are similar to each other (e.g., when the difference between the weight values of the directional modes is less than a specific threshold value), the "other prediction" process may not be performed. When the intra-prediction directional modes derived in the "prediction mode generator" process have similar weight values, the decoder may generate a prediction block by using at least one of the planar mode, the DC mode, and the MIP mode (i.e., the "other prediction" process is performed). When the difference between the weight values of the intra-prediction directional modes derived in the "prediction mode generator" process is large (e.g., when the difference between the weight values of the directional modes is greater than the specific threshold value), this indicates that there are many changes between pixels in neighboring blocks, and thus the decoder may generate a prediction block by using at least one of the planar mode, the DC mode, and the MIP mode. Furthermore, when the horizontal and vertical lengths of the current block are different, the decoder may generate a prediction block by using at least one of the planar mode, the DC mode, and the MIP mode. Conversely, when the horizontal and vertical lengths of the current block are the same, the decoder may generate a prediction block by using at least one of planar mode, DC mode, and MIP mode.

In the "weighted prediction" process, the decoder may generate one prediction sample by performing weighted averaging of multiple intra-prediction blocks generated in the "intra prediction" and "other prediction" processes. A weight for each of the intra-prediction blocks may be determined based on at least one among: the intra-prediction directional modes derived in the "prediction mode generator" process and the weight information, quantization parameter information of the current block, the horizontal or vertical length of the current block, information about whether the current block is a luma component block or a chroma component block, intra-prediction mode around the current block, and information about whether there is a transform coefficient around the current block.

FIG. 15 illustrates a method for determining an intra-prediction mode.

FIG. 15 illustrates the "prediction mode generator" process of FIG. 14 in more detail. Referring to FIG. 15, in the "prediction mode generator" process of FIG. 14, histogram analysis may be used to derive intra-prediction directionality. Specifically, in a "histogram analysis" process of FIG. 15, a decoder may derive intra-prediction directionality by analyzing a histogram obtained using neighboring samples adjacent to a current block. At this time, the decoder may derive an intra-prediction directional mode and a weight value for the current block by using at least one among a horizontal length of the current block, a vertical length of the current block, quantization parameter information of the current block, information about intra-prediction directional modes available among neighboring blocks of the current block, information about whether there is a residual signal of a neighboring block of the current block, and information about whether the current block is a luma block or a chroma block. Hereinafter, a method for deriving an intra-prediction directional mode and a weight value of the current block will be described.

Intra-prediction directional modes may be set based on frequency. The decoder may obtain a histogram of intra-prediction directional modes for neighboring blocks, and analyze the histogram to select the most frequently occurring intra-prediction directional mode and the second most frequently occurring mode as prediction directional mode. Furthermore, intra-prediction directional modes may be set based on a cumulative value (e.g., the G value in FIG. 11). The decoder may analyze a histogram, obtained as a cumulative value in which the G value is added to each of intra-prediction directional modes, to select an intra-prediction directional mode having the highest weight value and a mode having the second highest weight value as prediction directional modes. In addition, the decoder may select an intra-prediction directional mode based on the distance between intra-prediction directional modes of neighboring blocks and a cumulative value to which the G value has been added. The distance between directional modes may be the index difference between the directional modes. For example, the distance between a directional mode of index 66 and a directional mode of index 2 may be 64. Alternatively, the last index of directional modes is index 66, and thus the distance between a directional mode of index 66 and the directional mode of index 2 may be 2. The decoder may obtain a histogram as the cumulative value in which the G value has been added to each intra-prediction directional mode for the neighboring blocks, analyze the histogram, and select an intra-prediction directional mode having the highest cumulative value first. Next, the decoder may use a mode, which has the smallest inter-directional mode distance (is closest) to the mode having the highest cumulative value, among modes corresponding to the remaining cumulative values except for the highest cumulative value (e.g., a mode having the second highest cumulative value, a mode having the third highest cumulative value, a mode having the fourth highest cumulative value, and so on). Meanwhile, the decoder may first select an intra-prediction directional mode having the highest cumulative value, and the decoder may use a mode which has the largest inter-directional mode distance (is farthest) from a mode having the highest cumulative value among modes corresponding to the remaining cumulative values except for the highest cumulative value (e.g., a mode having the second highest cumulative value, a mode having the third highest cumulative value, a mode having the fourth highest cumulative value, and so on). The cumulative values of the above intra-prediction directional modes may be used to determine weights of intra-prediction directional modes that are finally determined in the "histogram analysis" process.

There may be two or more intra-prediction directional modes for the current block, derived by the decoder of FIG. 15 in the "histogram analysis" process. When there are two or more intra-prediction directional modes derived in the "histogram analysis", the distances between the intra-prediction directional modes may be similar to or different from each other. In addition, cumulative values between the intra-prediction directional modes may be similar to or different from each other. Therefore, in order to derive an optimal prediction sample for the current block, the most optimal combination must be selected from among various mode combinations. In addition, to derive the optimal prediction sample for the current block, the decoder may combine not only the intra-prediction directional modes derived in the "prediction mode generator" process in FIG. 14 but also the encoding modes derived in the "other prediction". Information about these combinations may be included in a bitstream. A mode combination described in the present specification may imply use of one among mode A, mode B, a planar mode, a DC mode, and an MIP mode, or combinations of some or all thereof.

Next, referring to FIG. 15, in a "prediction mode analysis" process, the decoder may select an optimal combination, which derives an optimal prediction sample for the current block, by using the intra-prediction modes derived in the "histogram analysis" process and weight information corresponding to the derived intra-prediction modes. Specifically, the decoder may use the derived intra-prediction modes and the corresponding weight information to determine information about whether to use weighted averaging to generate a prediction sample for the current block, information about which intra-prediction modes to use, and information about how to set weights for the intra-prediction modes. Furthermore, in the "prediction mode analysis" process, the decoder may select an optimal combination for deriving a prediction sample for the current block by using at least one of the intra-prediction modes determined in the "histogram analysis" process, weight information corresponding to the determined intra-prediction modes, and intra-prediction modes of neighboring blocks. Specifically, the decoder may determine information about whether to use weighted averaging to generate a prediction sample for the current block, information about which intra-prediction mode to use, and information about how to set weights for the intra-prediction modes. In this case, optimal combination information for prediction modes for generating a prediction sample for the current block may be derived using at least one among a horizontal length or a vertical length of the current block, quantization parameter information, information about an intra-prediction mode available among neighboring blocks of the current block, information about whether there is a residual signal of a neighboring block of the current block, and information about whether the current block is a luma block or a chroma block. The combination information may include intra-prediction directional mode information and weight values for intra-prediction directional modes. For example, when the weight of a mode having the second highest weight, among two derived intra-prediction directional modes, is "0" or within a predetermined value, the decoder may not apply a weighted average when generating a prediction block for the current block, but may generate the prediction block by using only one intra-prediction directional mode having the highest weight. Here, the predetermine value is an integer greater than or equal to 1, and may be 10. Further, when at least one of the two derived intra-prediction directional modes is a DC mode, a planar mode, or an MIP mode (i.e., is not a directional mode), the decoder may not apply a weighted average when generating a prediction block for the current block, and may generate the prediction block by using only one intra-prediction directional mode having the highest weight. In addition, when at least one of the two derived intra-prediction modes is a DC mode, a planar mode, or an MIP mode (i.e., is not a directional mode), the decoder may apply a weighted average when generating a prediction block for the current block.

FIG. 16 illustrates a syntax structure including syntax elements related to DIMD.

Referring to FIG. 16, when a current block is encoded with DIMD (i.e., when cu_dimd_flag has a value of 1), a decoder may additionally a parse syntax element (cu_dimd_mode) regarding DIMD combination information (information about modes combined to obtain a prediction sample or mode combination information). In this case, cu_dimd_mode may be parsed in different ways depending on the number of prediction modes which are combined. For example, the decoder may parse only one bin when the number of prediction modes combined is "2". In this case, when the value of cu_dimd_mode is "0", the decoder may generate a prediction sample by using modeA and modeB. When the value of cu_dimd_mode is "1", the decoder may generate a prediction sample by using modeA, modeB, and a planar mode, may generate a prediction sample by using modeA and the planar mode, or may generate a prediction sample by using modeB and the planar mode. When the number of prediction modes combined is "4", the decoder may parse two bins. In this case, when the value of cu_dimd_ mode is "0", the decoder may use modeA and modeB to generate a prediction sample. When the value of cu_dimd_mode is "1", the decoder may generate a prediction sample by using modeA, modeB, and a planar mode. When the value of cu_dimd_mode is "2", the decoder may generate a prediction sample by using modeA and the planar mode. When the value of cu_dimd_mode is "3", the decoder may generate a prediction sample by using modeB and the planar mode.

When the syntax element regarding the DIMD combination information is included in a bitstream, the bit rate may be increased. To solve the above problem, the syntax element regarding the DIMD combination information may not be included in the bitstream, and the decoder may derive combination information from information t the current block and neighboring blocks. As described above, the decoder may derive optimal combination information to generate a prediction sample for the current block.

FIG. 17 illustrates intra-prediction directional modes for a neighboring block of a current block and weight information.

Specifically, FIG. 17 illustrates the intra-prediction directional mode for each block derived in the "histogram analysis" process and the corresponding weight information, described with reference to FIG. 15. Referring to FIG. 17, the magnitude of weights (WeightX) may be expressed in alphabetical order. For example, the highest weight may be represented by "WeightA", and the second highest weight may be represented by "WeightB". There may be as many pieces of weight information as the number (X) of derived intra-prediction directional modes. Furthermore, an intra-prediction mode corresponding to a weight, WeightA, may be modeA. Depending on the characteristics of neighboring blocks adjacent to the current block, the characteristics of intra-prediction directional modes and corresponding weight information may differ. Referring to FIG. 17, Case 1 represents a case in which intra-prediction directional modes, modeA and modeB, are similar to each other and corresponding pieces of weight information are similar to each other. Case 2 represents a case in which the intra-prediction directional modes, modeA and modeB, are significantly different and corresponding pieces of weight information are significantly different. Case 3 represents a case in which intra-prediction directional modes, modeA and modeB, are similar to each other, but corresponding pieces of weight information are significantly different. Case 4 represents case in which the intra-prediction directional modes, modeA and modeB, are significantly different, but corresponding pieces of weight information are similar to each other.

FIG. 18 illustrates a method for determining DIMD combination information.

Specifically, FIG. 18 illustrates a method for determining optimal DIMD combination information by using the difference between intra-prediction directional modes, modeA and modeB, derived in the "prediction mode generator" process and between corresponding weights, WeightA and WeightB.

Referring to FIG. 18, i) when the absolute value difference between ModeA and ModeB is less than a predetermined threshold value (Tmode1, e.g., 10) and when WeightA is less than a predetermined threshold value (Tweight1, e.g., 0.7), an optimal DIMD combination for the current block may be a combination of modeA and modeB, and a decoder may generate a prediction sample by combining ii) when i) does not apply and when modeA and modeB. WeightA is equal to or greater than a predetermined threshold value (Tweight2, e.g., 0.85), an optimal DIMD combination for the current block may be to use only modeA, and the decoder may generate a prediction sample by using only modeA. iii) when ii) does not apply and when the absolute value difference between modeA and modeB is equal to or greater than a predetermined threshold value (Tmode2, e.g., 15), an optimal DIMD combination for the current block may be a combination of modeA and some or all of the encoding modes (e.g., the planar mode, the DC mode, and the MIP mode) derived in the "other prediction" process, and the decoder may generate a prediction sample by combining modeA and some or all of the encoding modes (e.g., the planar mode, the DC mode, and the MIP mode) derived in the "other Prediction" process. iv) when iii) does not apply, an optimal DIMD combination for the current block may be a combination of modeA and modeB with some or all of the encoding modes (e.g., the planar mode, the DC mode, and the MIP mode) derived in the "other prediction" process, and the decoder may generate a prediction sample by combining modeA and modeB with some or all of the encoding modes (e.g., the planar mode, the DC mode, and the MIP mode) derived e "other prediction" process.

Hereinafter, a description will be made of a method for determining optimal DIMD combination information by using the difference between the intra-prediction directional modes (modeA and modeB) derived by the decoder and between the corresponding weights (WeightA and WeightB).

The decoder may obtain DIMD combination information by comparing the weights of modeA and mode with the sum of all weights in a histogram (see FIG. 11). Specifically, the DIMD combination information may be obtained by comparing the weights of modeA and modeB with a total of weights (including the weights of modeA and modeB) (e.g., the sum of weights) in directional information of neighboring blocks of the current block.

For example, when there is one intra-prediction directional mode (modeA or modeB), and when the proportion of a weight of the corresponding prediction directional mode among the total weights is greater than a specific proportion, the corresponding prediction directional mode may be selected. On the other hand, when the proportion of a weight of the derived intra-prediction directional mode among the total weights is equal to or less than the specific proportion, DIMD combination information may be a combination of at least one of the derived intra-prediction directional mode, the planar mode, the DC mode, and the MIP mode. The specific proportion may be ½, ⅔, ¾, ⅜, etc.

In another example, when there are two derived intra-prediction directional modes (modeA and modeB), and when the proportion of the sum of weights of the intra-prediction directional modes among the total weights is greater than a specific proportion, the two intra-prediction directional modes may be selected. On the other hand, when the proportion of the sum of the weights of the two derived intra-prediction directional modes among the total weights is equal to or less than the specific proportion, at least one among the derived intra-prediction directional modes, the planar mode, the DC mode, and MIP mode may be selected as DIMD combination information. For example, modeA, modeB, and the planar mode may be selected. Alternatively, modeA and modeB may be selected. The specific proportion may be ½, ⅔, ¾, ⅜, etc.

FIG. 19 illustrates a method for generating a prediction sample by using intra-prediction directional mode information and weights.

Specifically, FIG. 19 illustrates the "intra prediction" and "weighted prediction" processes in FIG. 14. Referring to FIG. 19, when there are multiple intra-prediction directional modes derived by the decoder, the decoder may perform weighted prediction using weight information of each of the multiple intra-prediction directional modes, thereby obtaining a prediction sample. The weight information may be reset based on at least one among the horizontal length of the current block, the vertical length of the current block, quantization parameter information of the current block, and information about whether the current block is luma or chroma (additional information).

Figure 20:
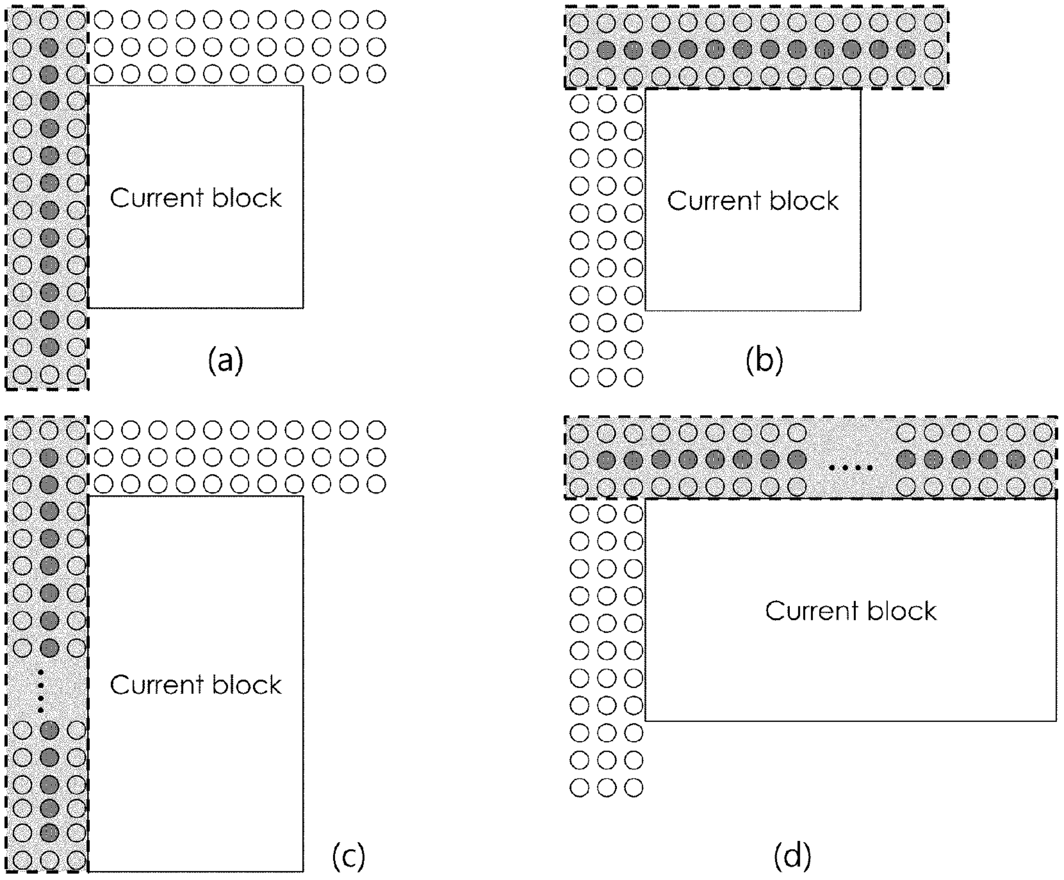
FIGS. 20 and 21 illustrate pixel values of neighboring blocks used to derive intra-prediction directional modes.
Figures 21, 22:
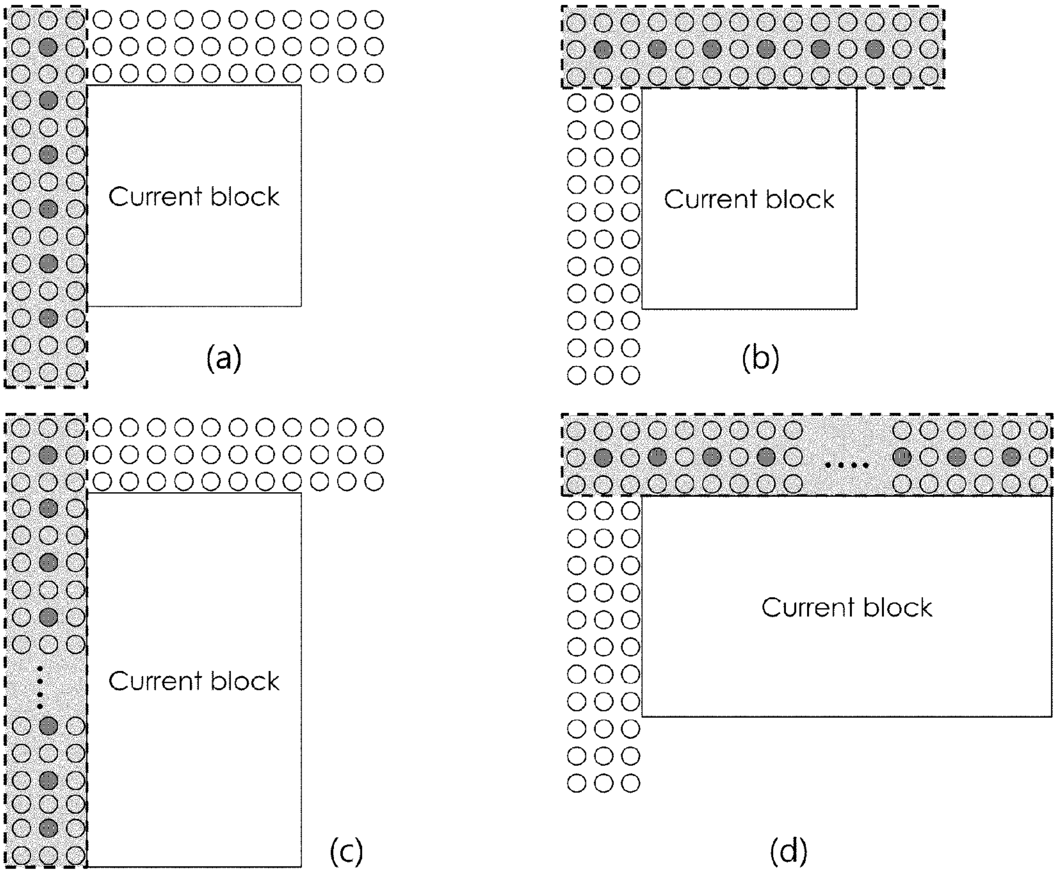
FIG. 22 illustrates a method for constructing an MPM list including an intra-prediction directional mode of a current block.

FIGS. 20 and 21 illustrate pixel values of neighboring blocks used to derive intra-prediction directional modes.

FIGS. 20 and 21 show the pixel values of neighboring blocks used to derive the intra-prediction directional modes in the "histogram analysis" process in FIG. 14. When deriving the intra-prediction directional mode, a filtering calculation is required for all neighboring pixels located to the left of and above a current block. In this case, the neighboring pixels may pixels on lines adjacent to or spaced apart from the edge of the current block. In order to drive intra-prediction directional modes, filtering computations must be performed on all neighboring pixels on lines adjacent to or spaced apart from the left and top edges of the current block, thus causing a delay due to computational complexity. To address the above problem, a decoder may separate the filtering computations on the neighboring pixels located to the left of and above the current block and derive intra-prediction directional modes for the left-located and above-located neighboring pixels in parallel. The decoder may also derive directional information by performing a filtering computation only on neighboring pixels corresponding to any predetermined positions.

FIGS. 20A and 20C illustrate neighboring pixels located to the left of the current block and used in a filtering computation for deriving intra-prediction directional modes. FIGS. 20B and 20D illustrate neighboring pixels located above the current block and used in a filtering computation for deriving intra-prediction directional modes.

Mappable intra directional information may vary depending on the position of reference pixels used by the decoder to obtain the histogram illustrated in FIG. 11.

For example, the horizontal and vertical lengths of the current block may be the same. At this time, in FIG. 20A, in the case of intra-prediction directional modes mapped when deriving directional information of neighboring pixels located to the left of the current block, only indexes −14 to 34 may be used. In FIG. 20B, in the case of intra-prediction directional modes mapped when deriving directional information for neighboring pixels located above the current block, only indexes 34 to 80 may be used.

On the other hands, the horizontal and vertical lengths of the current block may be different, and the position of neighboring pixels used to derive directional information may vary depending on the horizontal and vertical lengths of the current block. For example, when the vertical length of the current block is longer than the horizontal length, the decoder may derive directional information by using only neighboring pixels located to the left of the current block without using neighboring pixels located above the current block. This has the effect of reducing computational complexity by using only the left-located neighboring pixels without using the above-located neighboring pixels. When the horizontal length of the current block is longer than the vertical length, the decoder may derive directional information by applying greater weights to neighboring pixels located above the current block than to neighboring pixels located to the left of the current block. Specific predetermined values may be used as the weights. For example, when the current block has a horizontal length longer than a vertical length, a weight of 1 may be used for the neighboring pixels to the left of the current block, and a weight of 2 may be used for the neighboring pixels above the current block. In other words, because the current block has a horizontal length longer than a vertical length, it is more effective to drive the intra-prediction directional mode by using directional information of the neighboring pixels located above the current block rather than the neighboring pixels located to the left of the current block.

The decoder may perform a filtering computation on only a specific number of neighboring pixels among neighboring pixels located around the current block. The specific number may be a multiple of N, wherein N may be 2, 3, 4, etc. Information about N may be included in picture header information. Referring to FIG. 21, the decoder may derive directional information by performing filtering computation only at positions corresponding to multiples of "2", based on positions moved by (−2, −2) along the x and y axes from the top left of the current block. In addition, the decoder may derive directional information when the current block is a luma block, and may not derive directional information when the current is a chroma block. The decoder may apply the directional information found in the luma block to the chroma block. Meanwhile, directional information for the luma block and directional information for the chroma block may be obtained separately. The chroma block may not use the directional information found in the luma block, but may use information obtained using at least one among a planar mode, a DC mode, a horizontal mode, a vertical mode, and a MIP mode.

The intra-prediction directional mode of the current block is likely to be similar to intra-prediction directional modes of neighboring blocks. Therefore, to encode the intra-prediction directional mode of the current block, a most probable mode (MPM) list may be constructed using the intra-prediction directional modes of the neighboring blocks, and information about whether the intra-prediction directional mode of the current block is present in the MPM list and information about a position at which the intra-prediction directional mode of the current block is present may be included in a bitstream. That is, information about the intra-prediction directional mode of the current block may not be included in the bitstream separately. Therefore, the intra-prediction directional mode of the current block is determined based on the information about whether the intra-prediction directional mode of the current block is present in the MPM list and the information about the position at which the intra-prediction directional mode of the current block is present, and thus information (i.e., a bit rate) for driving the intra-prediction directional mode of the current block may vary depending on whether the MPM list is effectively constructed.

The method for deriving an intra-prediction directional mode by using the directional characteristics of neighboring pixels of the current block may also be used in the process of constructing the MPM list. The decoder may add the intra-prediction directional mode of the current block, derived using the directional characteristics of the neighboring pixels of the current block, to the MPM list and use the list to encode the intra-prediction directional mode of the current block. This may be used when the neighboring blocks of the current block have not been encoded using an intra-prediction mode or when there is no intra-prediction directional mode, such as a matrix intra prediction (MIP) mode.

The neighboring blocks adjacent to the current block may include both blocks without intra-prediction directional modes and blocks with intra-prediction directional modes. When neighboring blocks located to the left of the current block are blocks without intra-prediction directional modes, the decoder may compute the directional characteristics by using only neighboring pixels located above the current block to derive the intra-prediction directional mode of the current block. Alternatively, when there are intra-prediction directional modes in neighboring blocks located above the current block and when there are no intra-prediction directional modes in neighboring blocks to the left of the current block, the decoder may include the intra-prediction directional modes of the neighboring block located above the current block in the MPM list, and may include an intra-prediction directional mode derived by the directional characteristics of neighboring pixels to the left of the current block in the MPM list.

FIG. 22 illustrates a method for constructing an MPM list including an intra-prediction directional mode of a current block.

Referring to FIG. 22, a DIMD mode may be preferentially included in the MPM list. Multiple intra-prediction directional modes of the current block may be derived through the DIMD mode. Therefore, a decoder may acquire a prediction sample through multiple prediction. When there are blocks, which have intra-prediction directional modes, among neighboring blocks of the current block, the intra-prediction directional modes may be added to the MPM list. When there are empty spaces in the MPM list, modes resulting from modifying modeA by +1 or −1 may be added to the list, and a DC mode, a horizontal mode, a vertical mode, and an MIP mode may be added. A template based intra mode derivation (TIMD) mode, instead of the DIMD mode, may be preferentially included in the MPM list. In addition, both the DIMD and TIMD modes may be included in the MPM list. In addition, at least one among two intra directional prediction modes derived using the DIMD mode and two intra directional prediction modes derived using the TIMD mode may be included in the MPM list. In addition, when an intra-prediction directional mode has been used in a first region of one of GPM blocks each divided into two regions, the MPM list may be used to derive the intra-prediction directional mode for the first region. The MPM list may include at least one among the two intra-prediction directional modes derived using the DIMD mode and the two intra-prediction directional modes derived using the TIMD mode.

When the MPM list includes the DIMD mode, information about whether the current block has been encoded using the DIMD mode may be derived through a syntax element (mpm_idx). Therefore, additional information related to DIMD may not need to be signaled. At this time, when the current block is encoded in the DIMD mode, a reference line index may be 0 (mrl_ref_idx may be 0). In addition, when the DIMD mode is used, mrl_ref_idx may not be parsed and the value of mrl_ref_idx may be inferred as 0. In addition, the MPM list may include an intra-prediction directional mode derived using the DIMD mode. When the intra-prediction directional mode derived from DIMD is selected, mrl_ref_idx may be reset. For example, the value of mrl_ref_idx may be reset to one of 0, 1, 2 . . . . Based on the value of mrl_ref_idx obtained by parsing mrl_ref_idx, the decoder determines whether to add the intra-prediction directional mode derived using the DIMD mode in the MPM list or the priority of the intra-prediction directional mode derived using the DIMD mode in the MPM list. For example, when the value of mrl_ref_idx is not 0, the decoder may not include the intra-prediction directional mode derived using the DIMD mode in the MPM list. Alternatively, when the value of mrl_ref_idx is not 0, the decoder may include an intra-prediction directional mode derived using DIMD mode in the MPM list.

The intra-prediction directional mode derived from the DIMD mode may be used to resort intra-prediction mode candidates in the MPM list. The decoder may construct an MPM list of neighboring blocks of the current block and then derive intra-prediction directional mode by using the DIMD mode. The decoder may use the derived intra-prediction directional mode to resort intra-prediction mode candidates in the MPM list. At this time, the decoder may resort the MPM list by using at least one among the derived intra-prediction directional mode, the horizontal or vertical length of the current block, quantization parameter information, information about an intra-prediction mode available among neighboring blocks of the current block, information about whether there are residual signals in the neighboring blocks of the current block, and information about whether the current block is a luma block or a chroma block.

The decoder may resort the MPM list by using the differences between the derived intra-prediction directional mode and the intra-prediction mode candidates in the MPM list. For example, the decoder may calculate the difference between the derived intra-prediction directional mode and each of the intra-prediction mode candidates in the MPM list and sort the MPM list in ascending order of difference (including 0). An intra-prediction mode candidate with the smallest difference in the MPM list may be set to have the smallest index value in the MPM list. In addition, the derived intra-prediction directional mode may be set to have the highest priority in the MPM list and may be set to have the smallest index value. After the derived intra-prediction directional mode, the decoder may compute the difference between the derived intra-prediction directional mode and each of the intra-prediction mode candidates in the MPM list and sort the MPM list in ascending order of difference (including 0). Furthermore, when two MPM lists are used, the first MPM list may be constructed in the order of intra-prediction mode candidates that are similar to the derived intra-prediction directional mode. The MPM list may be constructed in ascending order of the differences between the derived intra-prediction directional mode and the intra-prediction mode candidates in the MPM list. The second MPM list may be constructed using candidates that are not highly similar to the derived intra-prediction directional mode. For example, the second MPM list may be constructed in descending order of the differences between the derived intra-prediction directional mode and the intra-prediction mode candidates in the MPM list. When the size of the MPM list is fixed, there may be an unfilled empty space in the MPM list. In this case, the empty space may be filled with a new prediction candidate derived using at least one of candidates already included in the MPM list or frequently occurring candidates. For example, the new prediction candidate may be a candidate that corresponds to a number obtained by adjusting a mode number (index) of an already included candidate by a predetermined value in the "+" or "−" direction. In this case, the predetermined value may be a natural number such as "1", "2", "3", . . . , and information about the predetermined value may be included in picture header information. Further, when two MPM lists are used, the first MPM list may include prediction modes obtained with reference to prediction modes of neighboring blocks of the current block, and the second MPM list may include prediction modes derived through DIMD. In this case, when the number of prediction modes included in the MPM list is smaller than the number of prediction modes that can be included in a predefined MPM list, prediction modes derived by applying an offset to the prediction modes included in the MPM list may be added.

The intra-prediction directional modes derived by the DIMD mode may be used to recombine intra-prediction mode candidates in the MPM list. After constructing the MPM list based on the prediction modes of the neighboring blocks of the current block, the decoder may derive an intra-prediction directional mode through the DIMD mode. The decoder may use the derived intra-prediction directional mode to recombine the intra-prediction mode candidates in the MPM list, thereby reconstructing the intra-prediction mode candidates into multiple prediction candidates. In this case, the decoder may recombine the MPM list by using at least one among the derived intra-prediction directional mode, the horizontal or vertical length of the current block, quantization parameter information, information about an intra-prediction mode available among neighboring blocks of the current block, information about whether there are residual signals in the neighboring blocks of the current block, and information about whether the current block is a luma block or a chroma block. Hereinafter, a method for recombining the MPM list will be described.

The decoder may recombine the MPM list by using the differences between the derived intra-prediction directional mode and the candidate intra-prediction modes in the MPM list. For example, the decoder may select candidates with differences less than or equal to a predetermined value, and may include, in the MPM list, multiple prediction candidates constructed by combining a derived intra-prediction mode and the directional candidates (the existing intra-prediction modes in the MPM list). In this case, the decoder may include the candidates in the MPM list in ascending order of differences. Next, the decoder may insert candidates with difference greater than the predetermined value into the MPM list in sequence. The predetermined value may be a natural number such as 1, 2, 3, . . . , etc. For example, it may be assumed that the index of the derived intra-prediction mode is "18", and the indexes of candidates in the MPM list are "16", "21", "34", "1", and "66", and the predetermined value is 5. In this case, the indexes "16" and "21" may be changed to multiple prediction candidates, wherein the difference between each of the indexes "16" and "21" and the derived intra-prediction mode is within "5", and the candidates in the MPM list may be changed to prediction modes of indexes "16, 18", "21, 18", "34", "1", and "66". That is, "16, 18" and "21, 18" may be multiple prediction candidates. For example, when the decoder selects "16, 18" which is a multiple prediction candidate in the MPM list, the decoder may generate a final prediction block by performing weighted averaging of a prediction sample generated by the prediction mode of index 16 and a prediction sample generated by the prediction mode of index 18. In this case, when the number of MPM lists is limited to 5, the MPM lists may be "16, 18", "21, 18", "16", "21", and "34". In addition, when two MPM lists are used, the first MPM list may include candidates that are recombined using candidates similar to the derived intra-prediction directional mode. The second MPM list may include candidates that are not highly similar to the candidates in the first MPM list and the derived intra-prediction directional mode. Thus, the first MPM list may include multiple prediction candidates and the second MPM candidates may include single-prediction candidates. Alternatively, the first MPM list may include both single-prediction candidates and multiple prediction candidates, and the second MPM candidates may include only single-prediction candidates. For example, a derived intra-prediction mode may be indexed "18", prediction mode candidates in the first MPM list may be indexes "16", "21", "34", "1", and "66", prediction mode candidates in the second MPM list may be indexes "50", "2", "8", "30", and "40", and a predetermined value may be 5. In this case, indexes "16" and "21" may be changed to multiple prediction candidates, wherein the difference between each of indexes "16" and "21" and the derived intra-prediction mode index 18 is within 5. In this case, the first MPM list may include indexes "16, 18", "21, 18", "16", "18", and "34", and the second MPM list may include indexes "1", "66", "50", "2", "8", "30", and "40".

An intra-prediction directional mode may be encoded based on whether the intra-prediction directional mode is present in the MPM list and, if present, the position of the intra-prediction directional mode in the MPM list. When there is no intra-prediction directional mode in the MPM list, the intra-prediction directional mode may be encoded based on a value obtained by subtracting the total number of prediction modes in the MPM list from the total number of intra-prediction directional modes. Specifically, there are a total of 67 intra-prediction directional modes, and encoding may be performed for 61 intra-prediction directional modes, excluding a total of 5 prediction modes in the MPM list and a planar mode. In this case, the 61 intra-prediction directional modes may be encoded using fixed length coding, and thus a total of 6 bins need to be encoded.

An intra-prediction directional mode of the current block, which is derived using the directional characteristics of neighboring pixels of the current block, is likely to be similar to an optimal intra-prediction directional mode of the current block. Therefore, an encoder may use the derived intra-prediction directional mode of the current block as a prediction value and generate a bitstream including only the difference value between the intra-prediction directional mode of the current block and the derived intra-prediction directional mode, thereby reducing the bit rate of the bitstream.

FIG. 23 illustrates a method for transmitting a difference value of an intra-prediction directional mode by using a directional mode derived by a DIMD mode as a prediction value. As reference samples used for the DIMD mode, all or some of the black pixels in FIG. 23 may be used, and the reference samples may be pixels at predesignated positions or pixels at regular intervals. When a current block may be encoded by the DIMD mode, a decoder may additionally parse a difference value to determine the final intra-prediction directional mode of the current block. In addition, when the DIMD mode generates a prediction block by using multiple intra-prediction directional modes, the decoder may need to parse at least one difference value of the DIMD mode. For example, when only one difference value of the DIMD mode is parsed and when the DIMD mode uses multiple intra-prediction directional modes, the difference value may be applied to one intra-prediction directional mode or to all multiple intra-prediction directional modes. Information about an intra-prediction directional mode, to which the difference value is applied, among the multiple intra-prediction directional modes may be included in the bitstream. When the current block is predicted using an intra-prediction mode, the decoder may parse information about the difference value to obtain the difference value, and may apply the difference value to a mode which has the highest weight or highest frequency and used by the DIMD mode, thereby determining the final intra-prediction directional mode.

FIG. 24 illustrates a syntax structure for parsing a difference value when a DIMD mode is applied.

Referring to FIG. 24, when a DIMD mode is used as a prediction mode, a decoder may parse dimd_distance_idx to obtain a difference value and may parse dimd_sign_flag to obtain a sign (+or −). When the value of dimd_distance_idx is "0", dimd_sign_flag may not be parsed. When not parsed, dimd_distance_idx and dimd_sign_flag may be set to "0".

The range of difference values may vary depending on intra-prediction modes. For example, there are 67 intra-prediction modes (corresponding to indexes 0 to 66), and the intra-prediction directional modes correspond to indexes 2 through 66. Therefore, the difference value may have a value between +1 to +64. For example, when the index of an intra-prediction directional mode is 2 and when the index (optimal value) of an optimal intra-prediction directional mode is 66, the difference value may be +64. However, the intra-prediction directional modes correspond to indexes 2 to 66, and thus it may be more effective to encode a difference value of −1 in the opposite direction than to encode +64. After parsing a prediction value of 2 (the index of the intra-prediction directional mode) and the difference value of −1, the decoder may perform the calculation of adding the prediction value and the difference value, and the calculated value will be 1. However, index 1 is a DC mode, and thus when calculation is performed by using an intra-prediction directional mode, an intra-prediction directional mode of index 66 in the opposite direction may be a final intra-prediction directional mode. That is, the difference value may be determined as a value that results in the smallest difference between the forward and reverse directions. In addition, when it is assumed that the difference between the prediction value and the optimal value is not large, the range of difference values may be fixed. For example, the difference value may be fixed to one of 1, 2, and 3. Specifically, the difference value may be set to 1 when the value of dimd_distance_idx is 0, 2 when the value of dimd_distance_idx is 1, and 3 when the value of dimd_distance_idx is 2. In addition, the difference value may be set to be a positive number when the value of dimd_sign_flag is 0 and a negative number when the value of dimd_sign_flag is 1. For example, when the difference value is −2, the value of dimd_distance_idx may be encoded as 1 and the value of dimd_sign_flag may be encoded as 1.

The description in the present specification may be applied to each of a luma block and a chroma block corresponding to a current block. Alternatively, an intra-prediction directional mode of a chroma block may be the same as an intra-prediction directional mode for a luma block. For example, when intra-prediction directional modes of a luma block is modeA, modeB, and a plane mode, intra-prediction directional modes of the chroma block may also be modeA, modeB, and the plane mode. The decoder may obtain a prediction sample of the chroma block by applying a weighted average to modeA, modeB, or the planar mode. In another example, when derived intra-prediction directional modes for a luma block are modeA, modeB, and a planar mode, the decoder may use either modeA or modeB to generate a prediction sample for a chroma block. In another example, when a prediction sample for a luma block was generated using a DIMD mode, the decoder may generate prediction samples for a chroma block by using the planar mode. In another example, when a prediction sample for a luma signal was generated using DIMD, the decoder may use the DC mode to generate a prediction sample for a chroma block.

The DIMD mode may also be applied in intra sub-partition (ISP). The ISP mode is a method in which the current block is partitioned horizontally or vertically into two or four sub-blocks, based on the size of the current block, and encoded. The following describes a method for applying DIMD when sub-prediction blocks are generated in the ISP mode.

When a coding block is encoded using the ISP mode, DIMD may be applied based on neighboring pixels of the coding block. In this case, intra-prediction directional modes derived using the DIMD mode at the coding block level may be applied equally to all sub-blocks resulting from partitioning using the ISP mode. In this case, the decoder may generate prediction samples for the sub-blocks by using a mode with the highest weight among the derived intra-prediction direction modes. In addition, when the coding block is encoded using the ISP mode, the DIMD mode may be applied based on neighboring pixels of the sub-blocks resulting from the partitioning. In this case, the decoder may acquire an intra-prediction directional mode derived by the DIMD mode for each sub-block, and generate a prediction sample for each sub-block by using the acquired intra-prediction directional mode. The DIMD applied when the above-described coding block is encoded using the ISP mode may be applied based on the comparison of a reference value and the horizontal or vertical length of each transform block resulting from partitioning using the ISP mode. For example, the DIMD may be applied when the horizontal or vertical length of each transform block is equal to or longer than, longer than, equal to or shorter than, or shorter than the reference value, wherein the reference value may be 4, 8, 16, 32, 64, 128 . . . .

Figure 25:
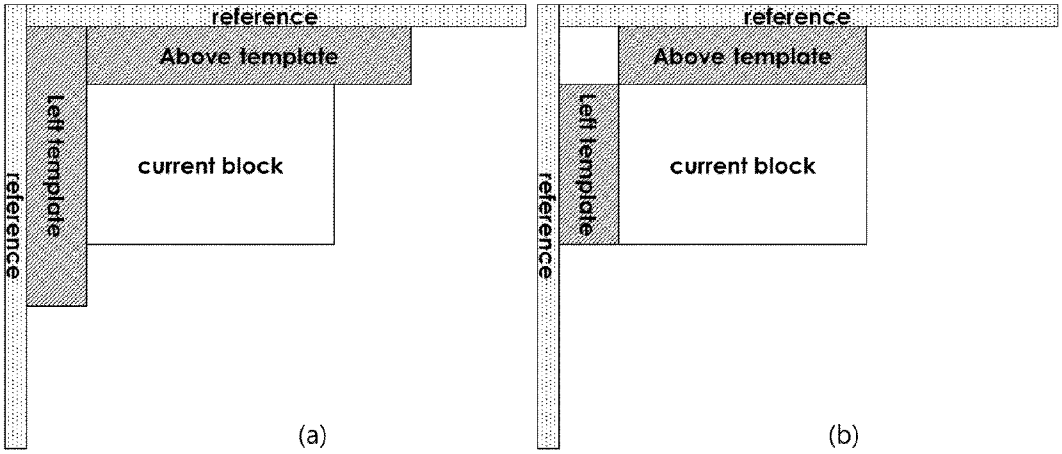
FIGS. 25 and 26 illustrate templates used to derive the intra-prediction mode of a current block.
Figure 26:
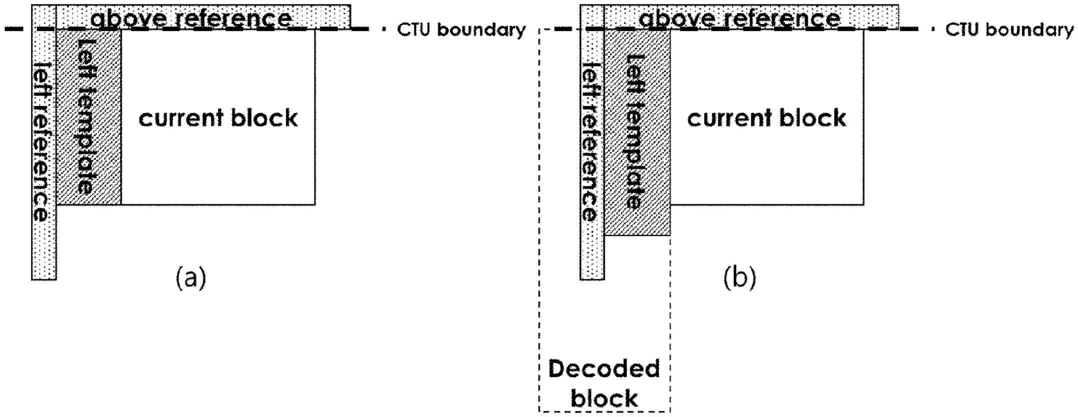

FIGS. 25 and 26 illustrate templates used to derive an intra-prediction mode of a current block.

Referring to FIG. 25, a decoder may use a template, which is a reconstructed random region (pixel(s)) adjacent to a current block, to derive an intra-prediction mode of the current block. First, the decoder may use a neighboring pixel (reference) adjacent to a template to generate a prediction template for the template. The decoder may use the intra-prediction mode for a prediction template, which is most similar to an already restored template, to reconstruct the current block. A method of deriving intra-prediction modes of the current block by using the above-described template may be described as template intra mode derivation (TIMD). In this case, the intra-prediction modes may be modes of indexes 0 to 67, and may be only intra-prediction modes in an MPM list derived from neighboring blocks of the current block. In this case, the intra-prediction modes may be the intra-prediction modes in the MPM list derived from the neighboring blocks of the current block and modes that differ by a predetermined number from the corresponding intra-prediction modes. The predetermined number may be 1, 2, 3, . . . . Alternatively, the intra-prediction modes for the template may include only directional modes, but not non-directional modes (a plane mode and a DC mode).

Hereinafter, a description will be made of a method for deriving intra-prediction directional modes by using a TIMD mode.

i) The decoder may set the size of a template. The horizontal or vertical size (length) of the template may be 4, and when the horizontal or vertical size (length) of the current block is 8 or less, the horizontal or vertical size (length) of the template may be set to 2. ii) The decoder may set the type of template. The type of template may be categorized as a type in which only a left sample is used, a type in which only an above sample is used, or a type in which left, above, and left-above samples all are used. The decoder may determine the type of template based on whether a neighboring block is valid or whether the neighboring block can be used to drive an intra-prediction directional mode. On the other hand, when the neighboring block cannot be used to derive the intra-prediction directional mode, the TIMD mode may be set to a planer mode, and weighted averaging may not be performed. iii) The decoder may construct a template for the current block. iv) The decoder may derive intra-prediction directional modes for neighboring blocks located to the left of, above, left above, right above, and left below the current block to determine whether the current block has directionality. v) when none of the neighboring blocks of the current block have directionality (e.g., non-directional modes (a DC mode, a planar mode, an MIP mode, etc.)), the decoder may select one intra-prediction directional mode with minimum cost, and may not perform the TIMD mode. In this case, weighted averaging using multiple prediction blocks may not be performed. vi) when at least one block having directionality is present among the neighboring blocks of the current block, the following process may be performed. The following process may be performed based on the intra-prediction directional modes present in the MPM list. This is because checking all 67 intra-prediction directional modes may increase complexity. a. The decoder may construct an MPM list. b. Next, when a DC mode, a horizontal mode, and a vertical mode are not present in the MPM list, the decoder may modify the MPM list by adding the DC mode, the horizontal mode, and the vertical mode to the MPM list. c. The decoder may evaluate all intra-prediction directional modes in the modified list to compare costs. The decoder may select a first mode with the smallest cost and a second mode with the second smallest cost. d. The decoder may additionally evaluate, in order to increase accuracy, an intra-prediction directional mode corresponding to an index that is less or greater by 1 than the index of an intra-prediction directional mode of the first mode and the index of the intra-prediction directional mode of the second mode. The decoder may perform additional evaluation to reselect a third mode having the smallest cost and a fourth mode having the second smallest cost. The first and third modes may be identical to each other, and the second and fourth modes may be identical to each other. e. The decoder may determine whether to perform weighted averaging based on the costs of the third mode and the fourth mode. When the difference between the cost of the third mode and the cost of the fourth mode is less than a specific value, the decoder may perform weighted averaging, and weights of the third mode and the fourth mode may be determined based on the cost of the third mode and the cost of the fourth mode. When the difference between the cost of the third mode and the cost of the fourth mode is greater than the specific value, the decoder may generate a prediction block by using only the third mode without performing weighted averaging. In this case, the specific value may be a predefined value.

The size of the template may vary depending on the horizontal or vertical length of the current block. For example, as shown in FIG. 25A, an above template that is longer than the horizontal length of the current block may be constructed. In this case, the vertical length of the above template may be a predefined length. Likewise, a left template that is longer than the vertical length of the current block may be configured. In this case, the horizontal length of the left template may be a predefined length. The predefined lengths may be 1, 2, 3, . . . .

When the current block is located on the boundary of a CTU (when one of the top, bottom, left, and right edges of the current block is included in the boundary of the CTU), a reference pixel for deriving/predicting a template to be used for the TIMD mode may be changed. Referring to FIG. 26, when the top edge of the current block is included in the boundary of the CTU, there may be one reference line located above the current block and used for template construction. This is for the purpose of minimizing line buffer memory usage. Therefore, the decoder may perform the TIMD mode by constructing only the left template of the current block without constructing the above template of the current block. In this case, as reference pixels for predicting the left template, an above reference pixel (above reference) and a left reference pixel (left reference) of the current block may be used. In this case, as shown in FIG. 26A, the height of the left template may be equal to the height of the current block. Furthermore, as shown in FIG. 26B, the decoder may identify whether a left neighboring block of the current block is a block for which reconstruction has already been completed, and when the neighboring is a block for which reconstruction has already been completed, may configure the height of the left template to be greater than the height of the current block.

In general, the accuracy of a prediction sample for the current block may be increased as the decoder refers to more neighboring pixels adjacent to the current block. On the other hand, referring to more neighboring pixels increases required memory. In addition, when a block which has not yet been reconstructed is present among the neighboring blocks adjacent to the current block, the corresponding region may not be used as a template. To effectively address the memory increase and the unrestored region, as shown in FIG. 25B, the length of the above template may be set equal to the horizontal length of the current block and the length of the left template may be set equal to the vertical length of the current block.

The decoder may use an intra-prediction mode derived through a template to obtain a prediction sample for the current block. The decoder may generate a prediction sample by using neighboring pixels adjacent to the current block, and may adaptively select which neighboring pixels are to be used to generate the prediction sample. In addition, the decoder may use multiple reference lines to generate a prediction sample, wherein index information of the multiple reference lines may be included in a bitstream.

For entropy coding, a context for the index of multiple reference lines for TIMD mode may be newly defined. The increase in context types may be related to memory and context switching complexity. Therefore, as a context used for coding and decoding indexes of multiple reference lines used in the TIMD mode, the existing context for the index of multiple reference lines may be reused.

The transform of a residual signal of the current block may be performed in two stages. A primary transform may be an adaptive horizontal and vertical application of a DCT-II, DST-VII, DCT-VIII, DCT5, DST4, DST1, identity transform (IDT), or the like. A secondary transform may be additionally applied to a transform coefficient of which the primary transform has been completed, and the secondary transform may be calculated through matrix multiplication between the primarily transformed transform coefficient and a predefined matrix. The secondary transform may be described as a low frequency non-separable transform (LENST). A matrix transform set for the secondary transform may vary depending on intra-prediction modes of the current block. Coefficient information of a transform matrix used for the secondary transform may be included in a bitstream.

When the secondary transform is applied to the current block to which the DIMD mode or the TIMD mode is applied, the transform set for the secondary transform may be determined based on intra-prediction modes derived by the DIMD mode or the TIMD mode. The coefficient information of the transform matrix used for the secondary transform may be included in the bitstream. The decoder may parse the coefficient information included in the bitstream to set matrix coefficient information of the secondary transform for the DIMD mode or the TIMD mode. In this case, one of two intra-prediction modes derived from the TIMD mode may be used to select a primary transform or secondary transform set. By comparing costs of the two intra-prediction directional modes, the intra-prediction directional mode having the smallest cost may be used to select the primary transform or secondary transform set. In addition, one of two intra-prediction directional modes derived from the DIMD may be used to select a primary transform or secondary transform set. By comparing weights of the two intra-prediction modes, the intra-prediction directional mode having the highest weight may be used to select the primary transform or secondary transform set.

The TIMD mode is as high-complexity mode because the TIM mode predicts a template of the current block and uses an intra-prediction mode derived from the template to generate a prediction block of the current block. Therefore, when the decoder generates a prediction template for a template region, the decoder may not perform the existing reference sample filtering process. In addition, when an ISP mode is applied to the current block or when a CIIP mode is applied to the current block, the TIMD mode may not be applied. The ISP mode or the CIIP mode may not be applied to the current block to which the TIMD mode has been applied, or syntax related to ISP or CIIP may not be parsed. In this case, the value of the unparsed syntax related to ISP or CIIP may be inferred as a predesignated value.

Template prediction may be performed separately for a left template region and a above template region adjacent to the current block, and an intra-prediction mode may be derived each template. Furthermore, two or more intra-prediction modes may be derived for each template, and there may be four or more intra-prediction modes for the current block. When there are two or more intra-prediction modes, the prediction samples for the current block may be generated using all of the derived intra-prediction modes, and the decoder may perform weighted averaging of the generated prediction samples to generate a final prediction block of the current block. In this case, at least three of the two or more intra-prediction modes derived from the template prediction, the planar mode, the DC mode, and the MIP mode may be used to generate the prediction samples. For example, when the decoder generates (acquires) prediction samples for the current block, the decoder may generate a final prediction sample by performing weighted averaging of the prediction samples generated using the intra-prediction modes derived from the template prediction and the planar mode.

Even when the CIIP mode is applied, prediction samples may be generated using the above-described methods. The CIIP mode is a method that uses both intra prediction and inter prediction to generate prediction samples (blocks) for the current block. The prediction samples for the current block may be generated by weighted averaging between intra-prediction samples and inter-prediction samples.

When CIIP mode is applied to generate intra-prediction samples, either the DIMD mode or the TIMD mode may be used. When the DIMD mode is used, the intra-prediction samples may be generated based on DIMD combination information. For example, the decoder may generate a first prediction sample by using an intra-prediction mode having the highest weight and generate a second prediction sample using an intra-prediction mode highest weight. The decoder may having the second generate a final intra-prediction block by performing weighted averaging of the first prediction sample and the second prediction sample. In this case, the decoder may generate a final intra-prediction block by performing weighted averaging of a total of three prediction samples, i.e., a sample predicted using the planar mode, the first prediction sample, and the second prediction sample, among neighboring blocks of the current block. When the TIMD mode is used, intra-prediction samples may be generated based on TIMD combination information. For example, the decoder may generate two prediction samples by using two intra-prediction modes, respectively. Then, the decoder may generate a final intra-prediction sample by performing weighted averaging of the two prediction samples. In this case, the decoder may generate a final intra-prediction sample by performing weighted averaging of the two prediction samples and a sample predicted using the planar mode.

The accuracy of intra-prediction samples may vary depending on position. That is, pixels located far from neighboring pixels used for prediction within a prediction sample may include more residual signals than pixels located close to the neighboring pixel. Thus, the decoder may divide the prediction samples into vertical, horizontal, and diagonal directions depending on the direction of an intra-prediction mode, and may set different weight values depending on the distance to the neighboring pixels used for prediction. This may be applied to an intra-prediction block generated using the CIIP mode or an intra-prediction block generated using two or more intra-prediction modes, where the weight may be set differently for each pixel in the prediction block, depending on the distance between the position of a reference pixel and the position of pixels in the prediction block. In one example, when the intra-prediction mode of the current block has a vertical or near-vertical direction, higher weights may be set for pixel positions in the prediction block that are closer to the top pixels, and lower weights may be set for pixel positions that are farther away from the top pixels.

When the current block is encoded using the CIIP mode, the decoder may generate a final prediction block by performing weighted averaging of intra-prediction samples and inter-prediction samples. Per-pixel weights in the inter-prediction samples may be set by considering per-pixel weights in the intra-prediction samples. For example, the per-pixel weights in the inter-prediction samples may be values resulting from subtracting and the per-pixel weights of the intra-prediction samples from the sum of the total weights. In this case, the sum of the total weights may be a value of the sum of the per-pixel weights in the intra-prediction samples and the per-pixel weights in the inter-prediction samples.

When two or more intra-prediction modes are used to generate prediction samples, the decoder may generate prediction samples based on the intra-prediction modes, respectively, and may generate a final prediction sample by performing weighted averaging of the generated prediction samples. When generating the prediction sample for each intra-prediction mode, a per-pixel weight based on the intra-prediction mode may be applied.

The per-pixel weight may be set based on at least one among the intra-prediction mode, the horizontal length of the current block, the vertical length of the current block, quantization parameters of the current block, information about whether the current block is luma or chroma, information about whether a neighboring block is intra-coded, and information about the presence or absence of a residual transform coefficient of the neighboring block.

Figures 27, 28, 29:
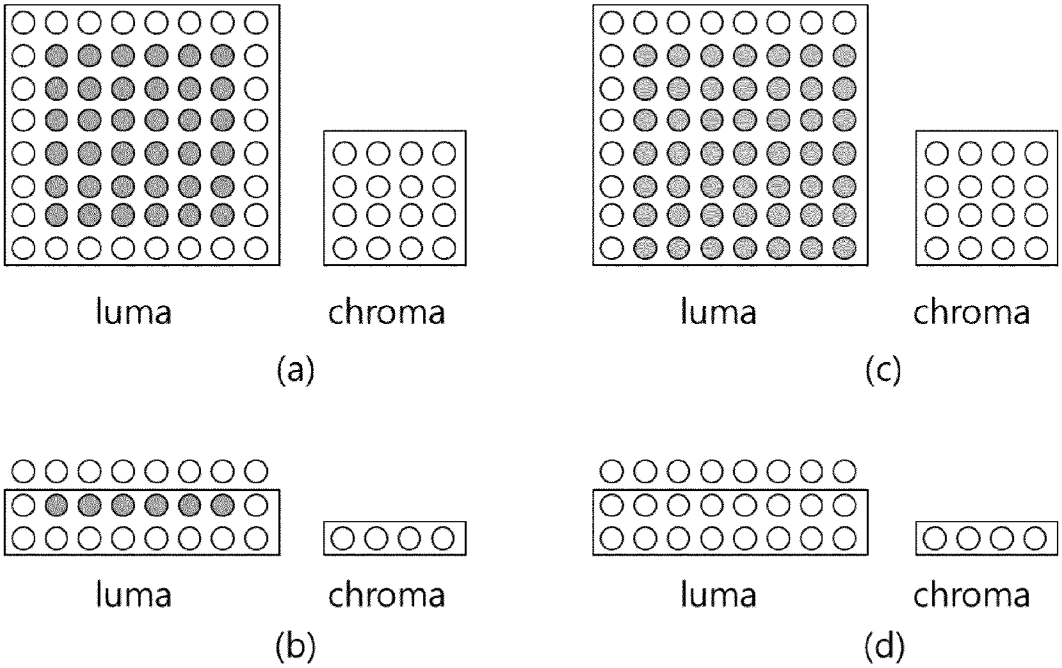
FIG. 27 illustrates pixels used to derive intra-prediction modes from a DIMD chroma mode and a TIMD chroma mode.
FIGS. 28 to 30 illustrate a method for signaling an intra-prediction mode.

FIG. 27 illustrates pixels used to derive intra-prediction modes from a DIMD chroma mode and a TIMD chroma mode.

A DIMD mode may be applied to each of a luma block and a chroma block, and a TIMD mode may also be applied to each of the luma block and the chroma block. For example, when a current block is a luma block, intra-prediction modes may be derived using the DIMD mode and the TIMD mode described above. When the current block is a chroma block, there is a corresponding reconstructed luma block, and thus intra-prediction modes may be derived using the DIMD mode and TIMD mode in the reconstructed luma block. When the current block is a luma block, a decoder may derive directional information. When the current block is a chroma block, the decoder does not derive directional information, and directional information derived in a luma block may be used for the chroma block. The method of using directional information derived using the DIMD mode/TIMD mode derived in a luma block with respect to a chroma block may be described as DIMD chroma mode/TIMD chroma mode.

Referring to FIG. 27A, the decoder may apply the DIMD mode by using a pre-reconstructed luma block. The decoder may compute directionality for gray pixels in FIG. 27A, derive an intra-prediction mode from the computed directionality, and use the derived intra-prediction mode as an intra-prediction mode of a chroma block. Referring to FIG. 27B, the height of a luma block may be 2. In this case, the decoder may not perform the DIMD chroma mode. In other words, when the height of a chroma block is 1, the DIMD chroma mode may not be performed. That is, in order for the decoder to perform the DIMD chroma mode, the length of the width or height of the luma block may have to be greater than or equal to the length of a width or height at which filtering can be performed. Whether the DIMD chroma mode is performed may depend on the type of filtering. The decoder may use reconstructed pixels located above the current block to improve the directionality of gay pixels, as shown in FIG. 27B. Referring to FIG. 27C, the decoder may construct a template with gray pixels in reconstructed luma blocks, and may predict the template with reference to white pixels. The white pixels may have a predetermined size. For example, the predetermined size may be a natural number greater than or equal to 1. Referring to FIG. 27D, the height of a luma block may be 2, and when the height of the luma block is 2, the TIMD chroma mode may not be available because even when the TIMD chroma mode is applied, the TIMD chroma mode is equivalent to the DM mode. That is, when the width or height of the luma block is within a predetermined value, the TIMD chroma mode may not be allowed or available. In this case, when the TIMD mode is applied to the current block, the decoder can use the TIMD mode to generate prediction samples for a luma block using a derived intra-prediction directional mode for the luma block, and the chroma block can use the DM mode to generate prediction samples for the chroma block. The DM mode may refer to a mode that uses an intra-prediction mode of a luma block for a chroma block.

Figures 30, 31:
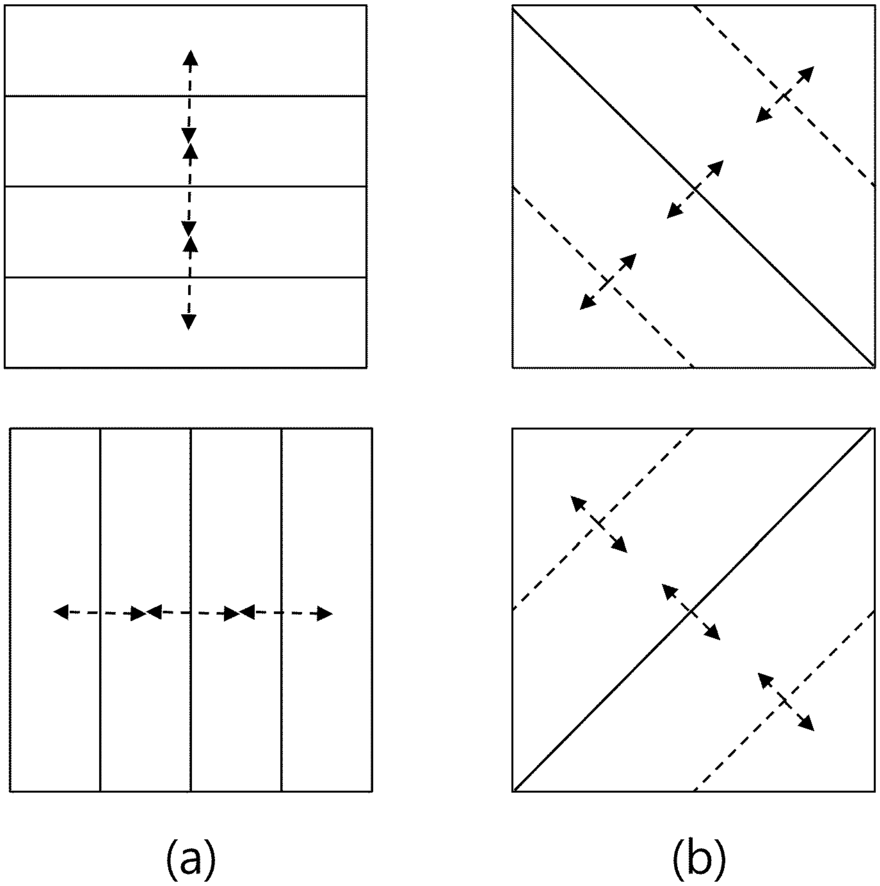
FIG. 31 illustrates methods by which a current block is partitioned in horizontal, vertical, and diagonal directions.

FIGS. 28 to 30 illustrate a method for signaling an intra-prediction mode.

FIG. 28 illustrates a method for configure bits of an intra-prediction mode for a chroma block. Chroma intra-prediction modes may be set based on values of intra_chroma_pred_mode in FIG. 28. Intra_chroma_pred_mode equal to a value of 0 indicates a planar mode, intra_chroma_pred_mode equal to a value of 1 indicates a horizontal mode, intra_chroma_pred_mode equal to a value of 2 indicates a vertical mode, intra_chroma_pred_mode equal to a value of 3 indicates a diagonal mode, intra_chroma_pred_mode equal to a value of 4 indicates a DM mode, and intra_chroma_pred_mode equal to a value of 5 indicates a DIMD chroma mode or a TIMD chroma mode. When the value of intra_chroma_pred_mode is 5, whether the chroma intra-prediction mode is the DIMD chroma mode or the TIMD chroma mode may be determined based on a luma block encoding mode. For example, when the DIMD mode is applied to a current luma block, the chroma intra-prediction mode may be the DIMD chroma mode. Likewise, when the TIMD mode is applied to a luma block, the chroma intra-prediction mode may be the TIMD chroma mode. When the luma block is in a directional mode, a non-directional mode, or an MIP mode, the chroma intra-prediction mode may be the DIMD chroma mode. In addition, regardless of the encoding mode of the luma block, the chroma intra-prediction mode may be the DIMD chroma mode. When an encoder and a decoder are capable of performing a CCLM method, signaling for the DIMD/TIMD chroma modes shown in FIG. 29 may be possible.

When the ISP mode is applied to the current block, or when the current block has a size that does not allow directionality to be derived, the range of allowable (usable) chroma intra-prediction modes may change. For example, when at least one of the horizontal or vertical length of a block is less than a predetermined value (e.g., an integer greater than or equal to 1), only the planar mode, the horizontal mode, the vertical mode, the diagonal mode, and the M mode may be uses as chroma intra-prediction modes. That is, the value of intra_chroma_pred_mode may be one of 0 to 4. On the other hand, when there is a separate flag indicating whether a mode is the DIMD or the TIMD chroma mode, the separate flag may not be parsed.

The DIMD mode and the TIMD mode may be similar to CCLM in terms of using a reconstructed luma block. That is, prediction modes for a chroma block may be integrated and signaled based on the characteristics of an algorithm. Criteria for integration may be whether there is directionality or whether a reconstructed luma block is used to derive prediction modes. For example, the DIMD mode and the TIMD mode are not directional or non-directional modes, and may thus be constructed as one mode of CCLM as shown in FIG. 30. Referring to FIG. 30, cclm_mode_idx equal to a value of 3 indicates that a chroma block is encoded using the DIMD chroma mode or the TIMD chroma mode. That is, the decoder may parse cclm_mode_idx, and when the value colm_mode_idx is 3, may predict a chroma block by using the DIMD chroma mode or the TIMD chroma mode.

FIG. 31 illustrates methods by which a current block is partitioned in horizontal, vertical, and diagonal directions.

Weights may be set differently for each pixel in a prediction sample. In terms of computational complexity, the weights may be set differently for sub-blocks into which a current block is partitioned and which have predetermined sizes. In this case, the predetermined sizes may vary depend on the horizontal or vertical length of the current block, and may be multiples of 2. Based on the predetermined sizes, the current block may be partitioned into multiple (e.g., two or four) sub-blocks. When the direction of an intra-prediction mode is f diagonal, the current block may be split in the diagonal direction. FIG. 31A shows that the current block is partitioned in the horizontal and vertical directions, and FIG. 31B shows that the current block is partitioned in the diagonal direction. When the angle of an intra-prediction mode is greater than a specific value, a prediction sample may have been generated using pixels above the current block. When the current block is partitioned in the horizontal direction, the highest weight may be set for the topmost sub-block among the partitioned sub-blocks, and the lowest weight may be set for the bottommost sub-block. In this case, the specific value may be a value between 0 and 67. For example, the specific value may be 34. As shown in FIG. 31A, the current block may be partitioned into four sub-blocks in the horizontal direction. In this case, the value of the topmost sub-block may be set to 6, the value of the second topmost sub-block may be set to 5, the value of the third topmost sub-block may be set to 3, and the value of the bottommost sub-block may be set to 2. Likewise, as shown in FIG. 31A, when the current block is partitioned in the vertical direction, the highest weight may be set for the leftmost sub-block among partitioned sub-blocks, and the lowest weight may be set for the rightmost sub-block. When the direction of an intra-prediction mode is diagonal, the current block may be partitioned in the diagonal direction. As shown in FIG. 31B, the current block may be partitioned in the diagonal direction. For example, the current block may be partitioned diagonally into two (based on solid line) or four (based on solid and dashed line) sub-blocks. When the angle of an intra-prediction mode is within a specific range, the current block may be predicted in the diagonal direction, and the highest weight may be set for a sub-block adjacent to a prediction pixel.

The current block may be partitioned vertically, horizontally, or diagonally at equal intervals. The intervals at which the current block is partitioned may be determined based on at least one among a horizontal length of the current block, a vertical length of the current block, an intra-prediction mode of the current block, and information about whether the current block is luma or chroma. For example, when the current block has a longer horizontal length than a vertical length and is partitioned horizontally, the intervals at which the current block is partitioned may be wider than when the current block has the same horizontal and vertical lengths. Information related to the partitioning may be included in a bitstream. A decoder may parse the information the partitioning obtain information about the vertical, horizontal, and diagonal partitioning of the current block, and to obtain a weight of each sub-block in a prediction sample of the current block, regardless of the intra-prediction mode.

Generally, an intra-prediction block for the current block is derived from neighboring pixels, and one intra-prediction mode is used to generate the prediction block. While the characteristics of the neighboring pixels of the current block may have single directionality, there may be the case where the directionality is ambiguous. IN this case, the decoder may use multiple intra-prediction modes to generate prediction samples, and may generate a final prediction block by performing weighted averaging of the generated prediction samples. In this case, the information about the multiple intra-prediction modes may be included in the bitstream. The decoder may generate prediction samples based on each intra-prediction mode acquired by parsing the information about the multiple intra-prediction modes, and may generate a final prediction block by performing weighted averaging of the generated prediction samples.

When the multiple intra-prediction modes are encoded, the first intra-prediction mode may apply existing encryption and decryption methods. The second intra-prediction mode may be similar to the first intra-prediction mode. Thus, information about the second intra-prediction mode may not directly indicate the intra-prediction mode, and only the difference value between the second intra-prediction mode and the first intra-prediction mode may be included in the bitstream and signaled to the decoder. On the other hand, when the second intra-prediction mode is not similar to the first intra-prediction mode, only the difference value may be included in the bitstream and signaled to the decoder, or information about whether existing encoding and decoding methods are applied may also be included in the bitstream and signaled to the decoder. In addition, information about whether the second intra-prediction mode is within an MPM list may be included in the bitstream and signaled. When the second intra-prediction mode is not in the MPM list, a residual sign for the second intra-prediction mode may be included in the bitstream and signaled. When encoding and decoding the residual sign for the second intra-prediction mode, a number resulting from subtracting the number of intra-prediction modes in the MPM list and the first prediction mode from the total number of intra-prediction modes may be the maximum number of syntax elements.

Reference pixels used for derivation of intra-prediction modes may be included in one of multiple reference lines. Reference lines used for derivation of the first intra-prediction mode and the second intra-prediction mode may be the same or different. Identical same reference lines may be efficient in terms of computational complexity, while different reference lines may be efficient in terms of prediction accuracy. When the reference lines are different, information about the reference line used for derivation of the second intra-prediction mode may exclude the index of the reference line used for derivation of the first intra-prediction mode. For example, when the number of multiple reference lines is 3, the index of the reference line used to derive the second intra-prediction mode may be an index that two reference lines, excluding a indicates one of reference line used to derive the first intra-prediction mode.

Whether the methods described in the present specification are applied may be determined based on at least one among slice type information (e.g., an I slice, a P slice, or a B slice), a tile or not, a sub-picture or not, the size of the current block, the depth of a coding unit, information about whether the current block is a luma block or a chroma block, information about whether a frame is a reference frame or a non-reference frame, and information about a temporal layer based on reference order and hierarchy. The information used to determine whether the methods described in the present specification will be applied may be predefined between the decoder and encoder. Further, the information may be determined based on a profile and a level. The information may be represented as variable values, and the bitstream may include information about the variable values. That is, the decoder may parse the information about the valuable values included the bitstream to determine whether the above-described methods are applied. For example, whether the above-described methods will be applied may be determined based on the horizontal or vertical length of a coding unit. When the horizontal or vertical length is 32 or more (e.g., 32, 64, 128, etc.), the above-described methods may be applied. In addition, the above-described methods be applied when the horizontal or vertical length is less than 32 (e.g., 2, 4, 8, or 16). Furthermore, the above-described methods may be applied when the horizontal or vertical length is 4 or 8.

FIGS. 32 to 34 illustrate syntax structures related to a DIMD mode and a TIMD mode.

Referring to FIG. 32, syntax elements related to a DIMD mode and syntax elements related to a TIMD mode may be parsed based on a CTU boundary. Whether the top edge of the current block is the boundary of the CTU may be determined based on the remainder obtained by dividing the vertical-axis coordinate (y0) of top-left coordinates of a current block by CtbSizeY. For example, when the remainder is greater than 0, the top edge boundary of the current block is not the boundary of the CTU, and when the remainder value is 0, the top edge of the current block may be the boundary of the CTU. Referring to 32-1 of FIG. 32, when the top edge of the current block is not the boundary of a CTU, a decoder may identify whether the DIMD mode is applied. That is, if y0% CtbSizeY>0, the decoder may parse intra_dimd_flag. The intra_dimd_flag is a syntax element that indicates whether the DIMD mode is used for reconstruction of the current block. Intra_dimd_flag equal to a value of 0 indicates that the DIMD mode is not used, and intra_dimd_flag equal to a value of 1 indicates that DIMD mode is used. In addition, intra_dimd_flag may be parsed when sps_dimd_enable_flag has a value of 1. The sps_dim_nable_flag s a syntax element that is signaled/parsed in sequence parameter set syntax, and may indicate whether the DIMD mode is enabled/disabled on a per-sequence basis. For example, sps_dimd_enable_flag equal to a value of 1 may indicate that the DIMD mode is enabled, and sps_dimd_enable_flag equal to a value of 0 may indicate that the DIMD mode is disabled. Referring to 32-2 of FIG. 32, when the DIMD mode is not used and when the top edge of the current block is not the boundary of the CTU, the decoder may determine whether the TIMD mode is applied. That is, if intra_dimd_flag has a value of 0 and (!intra_dimd_flag), and if y0% CtbSizeY>0, the decoder may parse intra_timd_flag. The intra_timd_flag is a syntax element that indicates whether the TIMD mode is used to reconstruct the current block. Intra_timd_flag equal to a value of 0 may indicate that the TIMD mode is not used, and intra_timd_flag equal to a value of 1 may indicate that the TIMD mode is used. On the other hand, when the top edge of the current block is a CTU boundary, the DIMD mode and the TIMD mode may not be applied. This is for the purpose of minimizing the usage of line buffer memory. When intra_dimd_flag and intra_timd_flag are not parsed, each of the values of intra_dimd_flag and intra_timd_flag may be inferred to be zero. CtbSizeY may be the size of a coding tree unit of a luma block. The number of reference samples for the DIMD mode and the TIMD mode may be 2 or 4, and thus CtbSizeY may be greater than 2 or greater than 4. CtbSizeY may be greater than a predetermined value and may be set differently for the DIMD mode and the TIMD mode. In this case, the predetermined value may be a positive integer. For example, when the DIMD mode is applied, CtbSizeY may be greater than 2 or greater than a predetermined value (e.g., 1). When the TIMD mode is applied, CtbSizeY may be greater than 4 or greater than a predetermined value (e.g., 2).

FIG. 33 illustrates a syntax structure in which a DIMD mode, a TIMD mode, and existing general intra-prediction mode are separately parsed.

Referring to 33-1 of FIG. 33, an intra-prediction mode may be determined based on whether the existing general intra-prediction mode is used or whether an intra-prediction mode derived by the decoder is used (i.e., the DIMD mode or the TIMD mode). Sps_dimd_timd_enable_flag may be a syntax element parsed at an SPS level, and may be a syntax element that indicates whether the intra-prediction mode derived by the decoder is used. Sps_dimd_timd_enable_flag equal to a value of 1 may indicate that the DIMD mode and the TIMD mode are enabled, and sps_dimd_timd_enable_flag equal to a value of 0 may indicate that the DIMD mode and the TIMD mode are disabled. Non_general_intra_mode_flag may be a syntax element that indicates whether the existing general intra-prediction mode is used. The non_general_intra_mode_flag may be parsed and set when the value of intra_mip_flag is "0". Non_general_intra_mode_flag equal to a value of 1 may indicate that the DIMD and TIMD modes are used, and non_general_intra_mode_flag equal to a value of 0 may indicate that the existing general intra-prediction mode is used. In addition, a condition regarding whether the top edge of the current block is the boundary of a CTU may be added. Referring to 33-1 of FIG. 33, if sps_dimd_timd_enabled_flag has a value of 1, if non_general_intra_mode_flag has a value of 1, and if y0% CtbSizeY>0, the decoder may identify conditions in 33-2 of FIG. 33. The three conditions are all disclosed in 33-1 of FIG. 33, but only some of the conditions may be used. Referring to 33-2 of FIG. 33, in order for intra_timd_flag to be parsed, (sh_slice_type!=I | | (sh_slice_type==I && cbWidth*cbHeight<=1024)) must be satisfied. That is, in relation to parsing of intra_timd_flag, when the slice type is not type I or when the slice type is I and the product of the horizontal and vertical lengths of the coding block is 1024 or less, intra_timd_flag may be parsed. Intra_timd_flag equal to a value of 1 may indicate that the TIMD mode is used, and intra_timd_flag equal to a value of 0 may indicate that the DIMD mode is used.

On the other hand, when the conditions in 33-1 of FIG. 33 are not satisfied, the decoder may parse syntax elements in 33-3 of FIG. 33. That is, syntax elements regarding the method for using the existing general intra-prediction mode may be parsed.

A profile tier level syntax may include information related to a profile, a tier, and a level. The profile tier level syntax may include a syntax "general_constraint_info( ) regarding general constraint information (GCI). The syntax regarding GCI (hereinafter, the GCI syntax) may control tools and/or functions, which are included in the GCI syntax and/or other syntaxes (e.g., DPS RBSP syntax, VPS RBSP syntax, SPS RBSP syntax, PPS RBSP syntax, Sliceheader syntax, etc.), to be disabled for interoperability. When the GCI syntax instructs tools and/or functions to be disabled, tools and/or functions declared in a sub-syntax may be disabled.

A general constraint flag for sps_dimd_timd_enable_flag may be included in the general constraint information (GCI) syntax. The general constraint flag for sps_dimd_timd_enable_flag may be no_dimd_timd_constraint_flag. no_dimd_timd_constraint_flag equal to 1 specifies that sps_dimd_timd_enable_flag for all pictures in OlsInScope shall be equal to 0. No_dimd_timd_constraint_flag equal to 0 does not impose such a constraint. The GCI syntax may be included in the profile tier level syntax. The GCI syntax may control tools and/or functions, which are included in the GCI syntax and/or other syntaxes (e.g., DPS RBSP syntax, VPS RBSP syntax, SPS RBSP syntax, PPS RBSP syntax, Sliceheader syntax, etc.), to be disabled for interoperability. When the GCI syntax instructs tools and/or functions to be disabled, tools and/or functions declared in a sub-syntax may be disabled.

FIG. 34 illustrates a syntax structure showing a method by which intra_timd_flag in 33-2 of FIG. 33 is parsed without any conditions for parsing intra_timd_flag.

Referring to 34-1 of FIG. 34, if sps_dimd_timd_enabled_flag has a value of 1, if non_general_intra_mode_flag has a value of 1, and if y0% 1 CtbSizeY>0, the decoder may parse intra_timd_flag. When the conditions in 34-1 of FIG. 34 are not satisfied, the decoder may parse syntax elements regarding a method using a prediction mode (Referring to 34-2 of FIG. 34).

Figure 35:
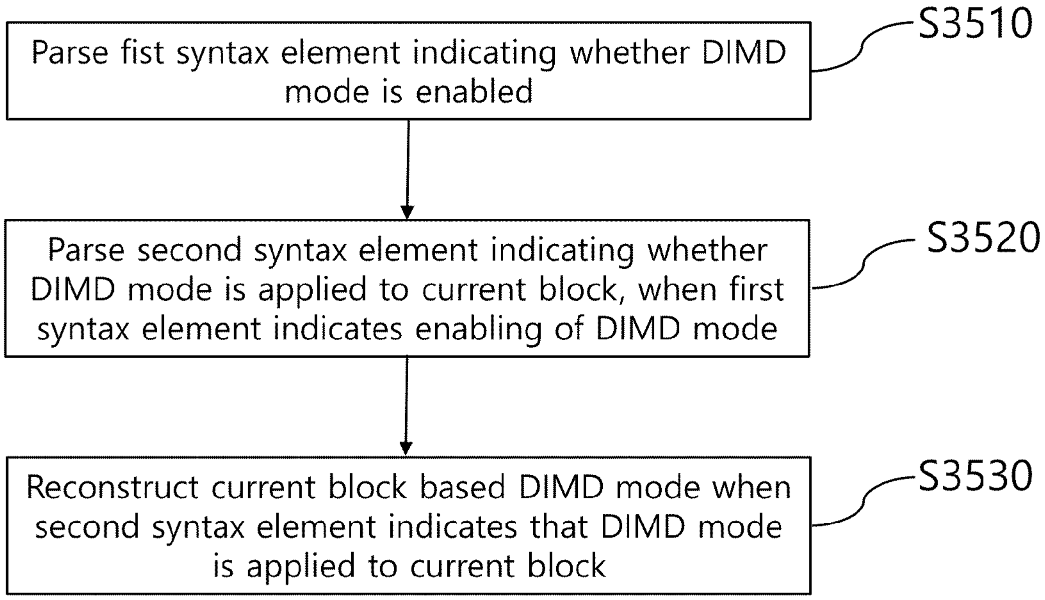
FIG. 35 is a flowchart illustrating a video signal processing method according to an embodiment of the present disclosure.

FIG. 35 is a flowchart illustrating a video signal processing method according to an embodiment of the present disclosure.

Specifically, FIG. 35 illustrates a method for reconstructing a current block based on the DIMD mode described with reference to FIGS. 1 to 34.

Referring to FIG. 35, the decoder may parse a first syntax element indicating whether a DIMD mode is enabled (S3510). The first syntax element may be signaled on a sequence parameter set (SPS) raw byte sequence payload (RBSP) syntax. When the first syntax element indicates enabling of the DIMD mode, the decoder may parse a second syntax element indicating whether the DIMD mode is applied to a current block (S3520). When the second syntax element indicates that the DIMD mode is applied to the current block, the decoder may reconstruct the current block based on the DIMD mode (S3530).

Specifically, the decoder may perform step S3530 as follows. The decoder may obtain directional information of neighboring blocks of the current block. The decoder may select, from among the directional information, first directional information, which most frequently occurs, and second directional information, which the second most frequently occurs. The decoder may reconstruct the current block based on the first directional information and the second directional information.

The current block may be reconstructed based on a weight value corresponding to the first directional information and a weight value corresponding to the second directional information.

The current block may be reconstructed using a first prediction mode and a derived intra-prediction mode generated based on the first directional information and the second directional information. In this case, the first prediction mode may be a planar mode.

The second syntax element may be parsed when the current block is a luma component block and when intra prediction is not applied to the current block.

The current block may be reconstructed based on prediction modes included in an MPM list. In this case, the MPM list may be constructed based on directional information of neighborhood blocks of the current block. Furthermore, the current block may be reconstructed based on a combination of the derived intra-prediction mode and one of the prediction modes included in the MPM list.

The video signal processing method described above with reference to FIG. 35 may be performed by a processor in the decoder or encoder. Further, the encoder may generate a bitstream that is decoded by the video signal processing method. Furthermore, the bitstream generated by the encoder may be stored on a non-transitory computer-readable storage medium (recording medium).

The present specification has been described primarily from the perspective of a decoder, but may function equally in an encoder. The term "parsing" in the present specification has been described in terms of the process of obtaining information from a bitstream, but in terms of the encoder, may be interpreted as configuring the information in a bitstream. Thus, the term "parsing" is not limited to operations of the decoder, but may also be interpreted as the act of configuring a bitstream in the encoder. Furthermore, the bitstream may be configured to be stored in a computer-readable recording medium.

The above-described embodiments of the present invention may be implemented through various means. For example, embodiments of the present invention may be implemented by hardware, firmware, software, or a combination thereof.

For implementation by hardware, the method according to embodiments of the present invention may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In the case of implementation by firmware or software, the method according to embodiments of the present invention may be implemented in the form of a module, procedure, or function that performs the functions or operations described above. The software code may be stored in memory and driven by a processor. The memory may be located inside or outside the processor, and may exchange data with the processor by various means already known.

Some embodiments may also be implemented in the form of a recording medium including computer-executable instructions such as a program module that is executed by a computer. Computer-readable media may be any available media that may be accessed by a computer, and may include all volatile, nonvolatile, removable, and non-removable media. In addition, the computer-readable media may include both computer storage media and communication media. The computer storage media include all volatile, nonvolatile, removable, and non-removable media implemented in any method or technology for storing information such as computer-readable instructions, data structures, program modules, or other data. Typically, the communication media include computer-readable instructions, other data of modulated data signals such as data structures or program modules, or other transmission mechanisms, and include any information transfer media.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

The invention claimed is:

1. A video signal decoding device comprising
a processor,
wherein the processor is configured to:
parse a first syntax element indicating whether a decoder side intra mode derivation (DIMD) mode is enabled, the first syntax element being signaled on a sequence parameter set (SPS) raw byte sequence payload (RBSP) syntax;
when the first syntax element indicates the DIMD mode is enabled,
when a color component of a current block is a luma component and an inter prediction is not applied to the current block, parse a second syntax element indicating whether the DIMD mode is applied to the current block; and
when the second syntax element indicates the DIMD mode is applied to the current block, reconstruct the current block based on the DIMD mode.

2. The video signal decoding device of claim 1, wherein the processor is configured to:
obtain directional information of neighboring blocks of the current block;
select, from the directional information, first directional information which most frequently occurs and second directional information which second most frequently occurs; and
reconstruct the current block based on the first directional information and the second directional information.

3. The video signal decoding device of claim 2, wherein the current block is reconstructed based on a weight value corresponding to the first directional information and a weight value corresponding to the second directional information.

4. The video signal decoding device of claim 2, wherein the current block is reconstructed using a first prediction mode and a derived intra-prediction mode generated based on the first directional information and the second directional information, and
the first prediction mode is a planar mode.

5. The video signal decoding device of claim 4, wherein the current block is reconstructed based on prediction modes included in a most probable mode (MPM) list, and
the MPM list is constructed based on the directional information of the neighboring blocks of the current block.

6. The video signal decoding device of claim 5, wherein the current block is reconstructed based on a combination of the derived intra-prediction mode and one of the prediction modes included in the MPM list.

7. A video signal encoding device comprising
a processor,
wherein the processor is configured to;
obtain a bitstream to be decoded by a decoder using a decoding method, the decoding method comprising:
parsing a first syntax element indicating whether a decoder side intra mode derivation (DIMD) mode is enabled, the first syntax element being signaled on a sequence parameter set (SPS) raw byte sequence payload (RBSP) syntax;
when the first syntax element indicates the DIMD mode is enabled,
when a color component of a current block is a luma component and an inter prediction is not applied to the current block, parsing a second syntax element indicating whether the DIMD mode is applied to the current block; and
when the second syntax element indicates the DIMD mode is applied to the current block, reconstructing the current block based on the DIMD.

8. The video signal encoding device of claim 7, wherein the reconstructing of the current block based on the DIMD mode comprises:
obtaining directional information of neighboring blocks of the current block;
selecting, from the directional information, first directional information which most frequently occurs and second directional information which second most frequently occurs; and reconstructing the current block based on the first directional information and the second directional information.

9. The video signal encoding device of claim 7, wherein the current block is reconstructed based on a weight value corresponding to the first directional information and a weight value corresponding to the second directional information.

10. The video signal encoding device of claim 7, wherein the current block is reconstructed using a first prediction mode and a derived intra-prediction mode generated based on the first directional information and the second directional information, and the first prediction mode is a planar mode.

11. The video signal encoding device of claim 10, wherein the current block is reconstructed based on prediction modes included in a most probable mode (MPM) list, and the MPM list is constructed based on the directional information of the neighboring blocks of the current block.

12. The video signal encoding device of claim 11, wherein the current block is reconstructed based on a combination of the derived intra-prediction mode and one of the prediction modes included in the MPM list.

13. A method for obtaining a bitstream, the method comprising:

obtaining a first syntax element indicating whether a decoder side intra mode derivation (DIMD) mode is enabled, the first syntax element being signaled on a sequence parameter set (SPS) raw byte sequence payload (RBSP) syntax;

when the DIMD mode is enabled, when a color component of a current block is a luma component and an inter prediction is not applied to the current block, obtaining a second syntax element indicating whether the DIMD mode is applied to the current block; and when the DIMD mode is applied to the current block, reconstructing the current block based on the DIMD mode, obtaining the bitstream including at least one of the first syntax element or the second syntax element.

14. The method of claim 13, wherein the reconstructing of the current block based on the DIMD mode comprises:

obtaining directional information of neighboring blocks of the current block;

selecting, from the directional information, first directional information which most frequently occurs and second directional information which second most frequently occurs; and reconstructing the current block based on the first directional information and the second directional information.

15. The method of claim 14, wherein the current block is reconstructed based on a weight value corresponding to the first directional information and a weight value corresponding to the second directional information.

16. The method of claim 14, wherein the current block is reconstructed using a first prediction mode and a derived intra-prediction mode generated based on the first directional information and the second directional information, and the first prediction mode is a planar mode.

17. A video signal processing method comprising:

parsing a first syntax element indicating whether a decoder side intra mode derivation (DIMD) mode is enabled, the first syntax element being signaled on a sequence parameter set (SPS) raw byte sequence payload (RBSP) syntax;

when the first syntax element indicates the DIMD mode is enabled, when a color component of a current block is a luma component and an inter prediction is not applied to the current block, parsing a second syntax element indicating whether the DIMD mode is applied to the current block; and when the second syntax element indicates the DIMD mode is applied to the current block, reconstructing the current block based on the DIMD mode.

* * * * *